US010419665B2

(12) United States Patent
Ou et al.

(10) Patent No.: US 10,419,665 B2
(45) Date of Patent: Sep. 17, 2019

(54) VARIABLE-ILLUMINATION FOURIER PTYCHOGRAPHIC IMAGING DEVICES, SYSTEMS, AND METHODS

(71) Applicant: California Institute of Technology, Pasadena, CA (US)

(72) Inventors: Xiaoze Ou, Mountain View, CA (US); Roarke W. Horstmeyer, Palo Alto, CA (US); Guoan Zheng, Vernon, CT (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/963,966

(22) Filed: Apr. 26, 2018

(65) Prior Publication Data

US 2018/0316855 A1 Nov. 1, 2018

Related U.S. Application Data

(63) Continuation of application No. 15/209,604, filed on Jul. 13, 2016, now Pat. No. 9,998,658, which is a (Continued)

(51) Int. Cl.
| | |
|---|---|
| *G02B 21/06* | (2006.01) |
| *H04N 5/232* | (2006.01) |
| *H04N 5/225* | (2006.01) |
| *H04N 5/32* | (2006.01) |
| *G02B 21/36* | (2006.01) |

(Continued)

(52) U.S. Cl.
CPC ......... *H04N 5/23232* (2013.01); *G02B 21/06* (2013.01); *G02B 21/084* (2013.01); *G02B 21/086* (2013.01); *G02B 21/125* (2013.01); *G02B 21/361* (2013.01); *G02B 21/367* (2013.01); *G02B 27/1066* (2013.01);
(Continued)

(58) Field of Classification Search
CPC ............ G01B 9/02043; G01B 9/02085; G01B 2290/50
See application file for complete search history.

(56) References Cited

U.S. PATENT DOCUMENTS

| | | | |
|---|---|---|---|
| 5,475,527 A | 12/1995 | Hackel et al. | |
| 6,144,365 A | 11/2000 | Young et al. | |

(Continued)

FOREIGN PATENT DOCUMENTS

| | | | |
|---|---|---|---|
| CN | 1688254 A | 10/2005 | |
| CN | 1932565 A | 3/2007 | |

(Continued)

OTHER PUBLICATIONS

Preliminary Amendment dated Mar. 17, 2014 filed in U.S. Appl. No. 14/065,280.

(Continued)

*Primary Examiner* — Jonathan M Hansen
(74) *Attorney, Agent, or Firm* — Sheila Martinez-Lemke; Weaver Austin Villeneuve & Sampson LLP

(57) ABSTRACT

Certain aspects pertain to Fourier ptychographic imaging systems, devices, and methods such as, for example, high NA Fourier ptychographic imaging systems and reflective-mode NA Fourier ptychographic imaging systems.

24 Claims, 17 Drawing Sheets

Related U.S. Application Data continuation of application No. 14/466,481, filed on Aug. 22, 2014, now Pat. No. 9,497,379.

(60) Provisional application No. 62/000,722, filed on May 20, 2014, provisional application No. 61/899,715, filed on Nov. 4, 2013, provisional application No. 61/868,967, filed on Aug. 22, 2013.

(51) Int. Cl.
| G02B 27/10 | (2006.01) |
| G02B 21/08 | (2006.01) |
| G02B 21/12 | (2006.01) |
| G02B 27/58 | (2006.01) |

(52) U.S. Cl.
CPC ........... *G02B 27/58* (2013.01); *H04N 5/2256* (2013.01); *H04N 5/32* (2013.01)

(56) References Cited

U.S. PATENT DOCUMENTS

| | | | |
|---|---|---|---|
| 6,154,196 A | 11/2000 | Fleck et al. | |
| 6,320,174 B1 | 11/2001 | Tafas et al. | |
| 6,320,648 B1 | 11/2001 | Brueck et al. | |
| 6,747,781 B2 | 6/2004 | Trisnadi | |
| 6,905,838 B1 | 6/2005 | Bittner | |
| 7,436,503 B1 | 10/2008 | Chen et al. | |
| 7,460,248 B2 | 12/2008 | Kurtz et al. | |
| 7,706,419 B2 | 4/2010 | Wang et al. | |
| 7,738,095 B2 * | 6/2010 | Gardner, Jr. ............... | G01J 3/02 356/300 |
| 7,787,588 B1 | 8/2010 | Yun et al. | |
| 8,271,251 B2 | 9/2012 | Schwartz et al. | |
| 8,313,031 B2 | 11/2012 | Vinogradov | |
| 8,497,934 B2 | 7/2013 | Milnes et al. | |
| 8,624,968 B1 | 1/2014 | Hersee et al. | |
| 8,942,449 B2 | 1/2015 | Maiden | |
| 9,029,745 B2 | 5/2015 | Maiden | |
| 9,426,455 B2 | 8/2016 | Horstmeyer et al. | |
| 9,497,379 B2 * | 11/2016 | Ou ........................ | G02B 21/084 |
| 9,829,695 B2 | 11/2017 | Kim et al. | |
| 9,864,184 B2 | 1/2018 | Ou et al. | |
| 9,892,812 B2 | 2/2018 | Zheng et al. | |
| 9,983,397 B2 | 5/2018 | Horstmeyer et al. | |
| 9,993,149 B2 | 6/2018 | Chung et al. | |
| 9,998,658 B2 | 6/2018 | Ou et al. | |
| 10,162,161 B2 | 12/2018 | Horstmeyer et al. | |
| 10,168,525 B2 | 1/2019 | Kim et al. | |
| 10,222,605 B2 | 3/2019 | Kim et al. | |
| 10,228,550 B2 | 3/2019 | Ou et al. | |
| 2001/0055062 A1 | 12/2001 | Shioda et al. | |
| 2002/0141051 A1 | 10/2002 | Vogt et al. | |
| 2003/0116436 A1 | 6/2003 | Amirkhanian et al. | |
| 2003/0118223 A1 | 6/2003 | Rahn et al. | |
| 2004/0057094 A1 | 3/2004 | Olszak et al. | |
| 2004/0146196 A1 | 7/2004 | Van Heel | |
| 2004/0190762 A1 | 9/2004 | Dowski, Jr. et al. | |
| 2005/0211912 A1 | 9/2005 | Fox | |
| 2006/0098293 A1 | 5/2006 | Garoutte et al. | |
| 2006/0158754 A1 | 7/2006 | Tsukagoshi et al. | |
| 2006/0173313 A1 | 8/2006 | Liu et al. | |
| 2006/0291707 A1 | 12/2006 | Kothapalli et al. | |
| 2007/0057184 A1 | 3/2007 | Uto et al. | |
| 2007/0133113 A1 | 6/2007 | Minabe et al. | |
| 2007/0159639 A1 | 7/2007 | Teramura et al. | |
| 2007/0171430 A1 | 7/2007 | Tearney et al. | |
| 2007/0189436 A1 | 8/2007 | Goto et al. | |
| 2007/0206200 A1 | 9/2007 | Lindner et al. | |
| 2008/0101664 A1 | 5/2008 | Perez | |
| 2008/0182336 A1 | 7/2008 | Zhuang et al. | |
| 2009/0046164 A1 | 2/2009 | Shroff et al. | |
| 2009/0079987 A1 | 3/2009 | Ben-Ezra et al. | |
| 2009/0125242 A1 | 5/2009 | Choi et al. | |
| 2009/0284831 A1 | 11/2009 | Schuster et al. | |
| 2009/0316141 A1 | 12/2009 | Feldkhun | |
| 2010/0135547 A1 | 6/2010 | Lee et al. | |
| 2010/0271705 A1 | 10/2010 | Hung | |
| 2011/0075928 A1 | 3/2011 | Jeong et al. | |
| 2011/0181869 A1 | 7/2011 | Yamaguchi et al. | |
| 2011/0192976 A1 | 8/2011 | Own et al. | |
| 2011/0235863 A1 | 9/2011 | Maiden | |
| 2011/0255163 A1 | 10/2011 | Merrill et al. | |
| 2012/0069344 A1 | 3/2012 | Liu | |
| 2012/0099803 A1 | 4/2012 | Ozcan et al. | |
| 2012/0105618 A1 | 5/2012 | Brueck et al. | |
| 2012/0118967 A1 | 5/2012 | Gerst | |
| 2012/0157160 A1 | 6/2012 | Ozcan et al. | |
| 2012/0176673 A1 | 7/2012 | Cooper | |
| 2012/0218379 A1 | 8/2012 | Ozcan et al. | |
| 2012/0248292 A1 | 10/2012 | Ozcan et al. | |
| 2012/0250032 A1 | 10/2012 | Wilde et al. | |
| 2012/0281929 A1 | 11/2012 | Brand et al. | |
| 2013/0057748 A1 | 3/2013 | Duparre et al. | |
| 2013/0083886 A1 | 4/2013 | Carmi et al. | |
| 2013/0093871 A1 | 4/2013 | Nowatzyk et al. | |
| 2013/0094077 A1 | 4/2013 | Brueck et al. | |
| 2013/0100525 A1 | 4/2013 | Chiang et al. | |
| 2013/0170767 A1 | 7/2013 | Choudhury et al. | |
| 2013/0182096 A1 | 7/2013 | Boccara et al. | |
| 2013/0223685 A1 | 8/2013 | Maiden | |
| 2014/0007307 A1 | 1/2014 | Routh, Jr. et al. | |
| 2014/0029824 A1 | 1/2014 | Shi et al. | |
| 2014/0043616 A1 | 2/2014 | Maiden et al. | |
| 2014/0050382 A1 | 2/2014 | Adie et al. | |
| 2014/0085629 A1 | 3/2014 | Bodkin et al. | |
| 2014/0118529 A1 | 5/2014 | Zheng et al. | |
| 2014/0126691 A1 | 5/2014 | Zheng et al. | |
| 2014/0133702 A1 | 5/2014 | Zheng et al. | |
| 2014/0152801 A1 | 6/2014 | Fine et al. | |
| 2014/0153692 A1 | 6/2014 | Larkin et al. | |
| 2014/0160236 A1 | 6/2014 | Ozcan et al. | |
| 2014/0160488 A1 | 6/2014 | Zhou | |
| 2014/0217268 A1 | 8/2014 | Schleipen et al. | |
| 2014/0267674 A1 | 9/2014 | Mertz et al. | |
| 2014/0347672 A1 | 11/2014 | Pavillon et al. | |
| 2014/0368812 A1 | 12/2014 | Humphry et al. | |
| 2015/0036038 A1 | 2/2015 | Horstmeyer et al. | |
| 2015/0054979 A1 | 2/2015 | Ou et al. | |
| 2015/0160450 A1 | 6/2015 | Ou et al. | |
| 2015/0264250 A1 | 9/2015 | Ou et al. | |
| 2015/0286042 A1 | 10/2015 | Hilbert et al. | |
| 2015/0331228 A1 | 11/2015 | Horstmeyer et al. | |
| 2016/0088205 A1 | 3/2016 | Horstmeyer et al. | |
| 2016/0110584 A1 | 4/2016 | Remiszewski et al. | |
| 2016/0178883 A1 | 6/2016 | Horstmeyer et al. | |
| 2016/0202460 A1 | 7/2016 | Zheng | |
| 2016/0210763 A1 | 7/2016 | Horstmeyer et al. | |
| 2016/0216208 A1 | 7/2016 | Kim et al. | |
| 2016/0216503 A1 | 7/2016 | Kim et al. | |
| 2016/0266366 A1 | 9/2016 | Chung et al. | |
| 2016/0320595 A1 | 11/2016 | Horstmeyer et al. | |
| 2016/0320605 A1 | 11/2016 | Ou et al. | |
| 2016/0341945 A1 | 11/2016 | Ou et al. | |
| 2017/0061599 A1 | 3/2017 | Remiszewski et al. | |
| 2017/0178317 A1 | 6/2017 | Besley et al. | |
| 2017/0188853 A1 | 7/2017 | Nakao et al. | |
| 2017/0273551 A1 | 9/2017 | Chung et al. | |
| 2017/0299854 A1 | 10/2017 | Kim et al. | |
| 2017/0354329 A1 | 12/2017 | Chung et al. | |
| 2017/0363853 A1 | 12/2017 | Besley | |
| 2017/0371141 A1 | 12/2017 | Besley | |
| 2018/0048811 A1 | 2/2018 | Waller et al. | |
| 2018/0088309 A1 | 3/2018 | Ou et al. | |
| 2018/0231761 A1 | 8/2018 | Dai et al. | |
| 2018/0307017 A1 | 10/2018 | Horstmeyer et al. | |
| 2019/0049712 A1 | 2/2019 | Kim et al. | |
| 2019/0056578 A1 | 2/2019 | Horstmeyer et al. | |
| 2019/0137753 A1 | 5/2019 | Chan et al. | |

FOREIGN PATENT DOCUMENTS

| | | |
|---|---|---|
| CN | 1311392 C | 4/2007 |
| CN | 101408623 A | 4/2009 |

(56) References Cited

FOREIGN PATENT DOCUMENTS

| | | | |
|---|---|---|---|
| CN | 101680848 A | 3/2010 | |
| CN | 101743519 A | 6/2010 | |
| CN | 101868740 A | 10/2010 | |
| CN | 101872033 A | 10/2010 | |
| CN | 101957183 A | 1/2011 | |
| CN | 102608597 A | 7/2012 | |
| CN | 102753935 A | 10/2012 | |
| CN | 103096804 A | 5/2013 | |
| CN | 103154662 A | 6/2013 | |
| CN | 103201648 A | 7/2013 | |
| CN | 103377746 A | 10/2013 | |
| CN | 104181686 A | 12/2014 | |
| CN | 104200449 A | 12/2014 | |
| JP | 2007-299604 A | 11/2007 | |
| JP | 2008-147629 A | 6/2008 | |
| JP | 2010-012222 A | 1/2010 | |
| KR | 10-1998-0075050 | 11/1998 | |
| TW | 201428339 A | 7/2014 | |
| WO | WO 99/53469 A1 | 10/1999 | |
| WO | WO 2002/102128 A1 | 12/2002 | |
| WO | WO 2003/062744 A1 | 7/2003 | |
| WO | WO 2008/116070 A1 | 9/2008 | |
| WO | WO 2011/093043 A1 | 8/2011 | |
| WO | WO 2012/037182 A1 | 3/2012 | |
| WO | WO 2014/070656 A1 | 5/2014 | |
| WO | WO 2015/017730 A1 | 2/2015 | |
| WO | WO 2015/027188 A1 | 2/2015 | |
| WO | WO 2016/090331 A1 | 6/2016 | |
| WO | WO 2016/106379 A1 | 6/2016 | |
| WO | WO 2016/118761 A1 | 7/2016 | |
| WO | WO 2016/123156 A1 | 8/2016 | |
| WO | WO 2016/123157 A1 | 8/2016 | |
| WO | WO 2016/149120 A1 | 9/2016 | |
| WO | WO 2016/187591 A1 | 11/2016 | |
| WO | WO 2017/066198 A1 | 4/2017 | |
| WO | WO 2017081539 A1 | 5/2017 | |
| WO | WO 2017081540 A1 | 5/2017 | |
| WO | WO 2017081542 A2 | 5/2017 | |

OTHER PUBLICATIONS

Preliminary Amendment dated Apr. 25, 2016 filed in U.S. Appl. No. 14/710,947.
U.S. Office Action dated Aug. 16, 2016 in U.S. Appl. No. 14/065,280.
U.S. Final Office Action dated Apr. 3, 2017 in U.S. Appl. No. 14/065,280.
U.S. Office Action dated Jan. 25, 2018 in U.S. Appl. No. 14/065,280.
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Office Action dated Sep. 16, 2016 in U.S. Appl. No. 14/065,305.
U.S. Notice of Allowance dated Jan. 13, 2017 in U.S. Appl. No. 14/065,305.
U.S. Notice of Allowance dated Jun. 9, 2017 in U.S. Appl. No. 14/065,305.
U.S. Notice of Allowance dated Dec. 4, 2017 in U.S. Appl. No. 14/065,305.
U.S. Notice of Allowance dated Jan. 22, 2016 in U.S. Appl. No. 14/466,481.
U.S. Notice of Allowance dated Apr. 22, 2016 in U.S. Appl. No. 14/466,481.
U.S. Notice of Allowance dated Aug. 23, 2016 in U.S. Appl. No. 14/466,481.
U.S. Notice of Allowance dated Aug. 16, 2017 in U.S. Appl. No. 15/209,604.
U.S. Notice of Allowance dated Jan. 26, 2018 in U.S. Appl. No. 15/209,604.
U.S. Notice of Allowance dated Jan. 14, 2016 in U.S. Appl. No. 14/448,850.
U.S. Notice of Allowance dated Apr. 13, 2016 in U.S. Appl. No. 14/448,850.
U.S. Notice of Allowance dated Jun. 9, 2017 in U.S. Appl. No. 15/206,859.
U.S. Notice of Allowance dated Sep. 1, 2017 in U.S. Appl. No. 15/206,859.
U.S. Notice of Allowance dated Jan. 23, 2018 in U.S. Appl. No. 15/206,859.
U.S. Notice of Allowance dated Nov. 2, 2016 in U.S. Appl. No. 14/572,493.
U.S. Notice of Allowance dated Mar. 8, 2017 in U.S. Appl. No. 14/572,493.
U.S. Notice of Allowance dated Mar. 31, 2017 in U.S. Appl. No. 14/572,493.
U.S. Notice of Allowance dated Jun. 20, 2017 in U.S. Appl. No. 14/572,493.
U.S. Notice of Allowance dated Oct. 11, 2017 in U.S. Appl. No. 14/572,493.
U.S. Office Action dated Mar. 13, 2017 in U.S. Appl. No. 14/658,019.
U.S. Final Office Action dated Jan. 17, 2018 in U.S. Appl. No. 14/658,019.
U.S. Office Action dated Mar. 24, 2017 in U.S. Appl. No. 14/710,947.
U.S Final Office Action dated Dec. 28, 2017 in U.S. Appl. No. 14/710,947.
U.S. Office Action dated Feb. 21, 2017 in U.S. Appl. No. 14/960,252.
U.S. Final Office Action dated Dec. 14, 2017 in U.S. Appl. No. 14/960,252.
U.S. Office Action dated Jul. 14, 2016 in U.S. Appl. No. 15/007,196.
U.S. Final Office Action dated Jan. 23, 2017 in U.S. Appl. No. 15/007,196.
U.S. Notice of Allowance dated Mar. 22, 2017 in U.S. Appl. No. 15/007,196.
U.S. Notice of Allowance dated Jun. 9, 2017 in U.S. Appl. No. 15/007,196.
U.S. Office Action dated Aug. 31, 2017 in U.S. Appl. No. 15/636,494.
U.S. Notice of Allowance dated Sep. 20, 2017 in U.S. Appl. No. 15/007,196.
U.S. Office Action dated Nov. 30, 2017 in U.S. Appl. No. 15/007,159.
U.S. Office Action dated Nov. 22, 2016 in U.S. Appl. No. 15/003,559.
U.S. Final Office Action dated Jul. 27, 2017 in U.S. Appl. No. 15/003,559.
U.S. Office Action dated Apr. 4, 2018 issued in U.S. Appl. No. 15/003,559.
U.S. Office Action dated Nov. 3, 2017 in U.S. Appl. No. 15/068,389.
U.S. Office Action dated May 19, 2017 in U.S. Appl. No. 15/081,659.
U.S. Notice of Allowance dated Oct. 20, 2017 in U.S. Appl. No. 15/081,659.
U.S. Office Action dated Apr. 13, 2018 issued in U.S. Appl. No. 15/160,941.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.
European Extended Search Report dated Mar. 31, 2016 in EP Application No. 13851670.3.
Japanese Office Action dated Oct. 17, 2017 issued in Application No. 2015-539884.
Australian Examination Report No. 1, dated Jan. 18, 2018 issued in AU 2014308673.
Chinese Second Office Action dated Oct. 26, 2017 issued in CN 201480057911.6.
International Preliminary Report on Patentability dated Mar. 3, 2016 issued in PCT/US2014/052351.
International Search Report and Written Opinion dated Dec. 5, 2014 issued in PCT/US2014/052351.
International Search Report and Written Opinion dated Nov. 13, 2014 issued in PCT/US2014/049297.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated May 4, 2016 issued in PCT/US2016/015001.

(56) References Cited

OTHER PUBLICATIONS

Chinese First Office Action dated Feb. 24, 2018 issued in CN 201680003937.1.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
International Search Report and Written Opinion dated Sep. 5, 2016 issued in PCT/US2016/033638.
Chinese Office Action [Description in English] dated May 31, 2016 issued in Application No. CN 201380068831.6.
Chinese First Office Action dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Application No. 14832857.8.
Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Search Report and Written Opinion dated Apr. 19, 2016 issued in PCT/US2015/067498.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
International Preliminary Report on Patentability dated Nov. 30, 2017 issued in PCT/US2016/033638.
About Molemap, About Us—Skin Cancer Mole Check NZ, pp. 1-2. [retrieved Oct. 23, 2015 ] <URL:http://molemap.net.au/about-us/>.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Abramowitz, M. et al., "Immersion Media," Olympus Microscopy Resource Center: Microscope Optical Components, Published 2012, pp. 1-6.[retrieved on Feb. 6, 2012] <URL: http://www.olympusmicro.com/primer/anatomy/immersion.html>.
Abramowitz, M., et al, "Field Curvature," Olympus Microscopy Resource Center, 2012 Olympus America Inc., pp. 1-3. [retrieved on Feb. 24, 2016] <URL:http://www.olympusmicro.com/primer/anatomy/fieldcurvature.html>.
Age-Related Macular Degeneration (AMD) | National Eye Institute. 2010 Table, pp. 1-8. [retrieved Apr. 5, 2016] <URL: https://www.nei.nih.gov/eyedata/amd#top>.
Alexandrov, S., et al, "Spatial information transmission beyond a system's diffraction limit using optical spectral encoding of the spatial frequency," Journal of Optics A: Pure and Applied Optics 10, Feb. 4, 2008, 025304, pp. 1-5. <doi:10.1088/1464-4258/10/2/025304> [retrieved Dec. 2, 2015] <URL: http://www.stacks.iop.org/JOptA/10/025304>.

Alexandrov, S.A., et al, "Synthetic Aperture Fourier Holographic Optical Microscopy," Physical Review Letters, vol. 97, No. 16, Oct. 20, 2006, pp. 168102-1-168102-4. <doi: 0.1103/PhysRevLett.97.168102>.
Arimoto, H., et al, "Integral three-dimensional imaging with digital reconstruction," Optics Letters, Optical Society of America, Feb. 1, 2001, vol. 26, No. 3, pp. 157-159. <doi: 10.1364/OL.26.000157>.
Balan, R., et al, "On signal reconstruction without phase," Applied and Computational Harmonic Analysis, vol. 20, Issue 3, May 2006, pp. 345-356. <doi:10.1016/j.acha.2005.07.001>.
Balan, R., et al, "Painless Reconstruction from Magnitudes of Frame Coefficients," Journal Fourier Analysis and Applications, vol. 15, Issue 4, Mar. 25, 2009, pp. 488-501. <doi:10.1007/s00041-009-9065-1>.
Bauschke, H., et al, "Phase retrieval, error reduction algorithm, and Fienup variants: a view from convex optimization," Journal of the Optical Society America, A., vol. 19, No. 7, Jul. 2002, pp. 1334-1345. <doi: 10.1364/JOSAA.19.001334>.
Becker, S.R., et al, "Templates for Convex Cone Problems with Applications to Sparse Signal Recovery," Mathematical Programming Computation, Sep. 2010, vol. 3, No. 3, pp. 1-49. <doi: 10.1007/s12532-011-0029-5>.
Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. <doi: 10.1111/jdv.12395>.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.
Bian, L., et al, "Fourier ptychographic reconstruction using Wirtinger flow optimization," Optics Express, vol. 23, No. 4, Feb. 23, 2015, pp. 4856-4866. <doi: 10.1364/OE.23.004856>.
Bian, Z., et al, "Adaptive system correction for robust Fourier ptychographic imaging," Optics express, Dec. 30, 2013, vol. 21, No. 26, pp. 32400-32410. <doi: 10.1364/OE.21.032400>.
BioTek® Brochure: BioTek's Multi-Mode Microplate Reading Technologies, BioTek Instruments, Inc. pp. 2. [retrieved on Mar. 14, 2016] <URL: http://www.biotek.com>.
Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. <doi:10.1039/c01c00684j>).
Bishara, W., et al, "Lensfree on-chip microscopy over a wide field-of-view using pixel super-resolution," Optics Express, vol. 18, No. 11, May 24, 2010, pp. 11181-11191. <doi: 10.1364/OE.18.011181>.
Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. <doi:10.1111/j.1610-0387.2006.06128.x>.
Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) <doi: 10.1007/978-3-642-57446-7_4>.
Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].
Brady, D. et al., "Multiscale gigapixel photography," Nature, vol. 486, Jun. 21, 2012, pp. 386-389. <doi:10.1038/nature11150>.
Bunk, O., et al, "Influence of the overlap parameter on the convergence of the ptychographical iterative engine," Ultramicroscopy, vol. 108, (2008), pp. 481-487. <doi: 10.1016/j.ultramic.2007.08.003>.
Burer, S., et al, "A nonlinear programming algorithm for solving semidefinite programs via low-rank factorization," Mathematical Programming, Series B., vol. 95, No. 2, Feb. 2003, pp. 329-357. <doi:10.1007/s10107-002-0352-8>.

(56) References Cited

OTHER PUBLICATIONS

Burer, S., et al, "Local Minima and Convergence in Low-Rank Semidefinite Programming," Mathematical Programming, Series A., vol. 103, Issue 3, Jul. 1, 2005, pp. 427-444. <doi:10.1007/s10107-004-0564-1>.

Candes, E.J., et al, "Phase Retrieval via Wirtinger Flow: Theory and Algorithms," IEEE Transaction on Information Theory, vol. 61, No. 4, Apr. 2015, pp. 1985-2007. <doi: 10.1109/TIT.2015.2399924>.

Candes, E.J., et al, pre-published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] <URL:.arXiv:1109.0573v2 [cs.IT] Sep. 20, 2011>.

Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] <URL: arXiv:1109.4499v1 [cs.IT] Sep. 21, 2011>.

Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] <doi:10.1001/archopht.126.6.857>.

Chai, A., et al, "Array imaging using intensity-only measurements," IOP Publishing: Inverse Problems, vol. 27, No. 1, Jan. 2011, pp. 1-16. <doi:10.1088/0266-5611/27/1/015005>.

Chao, W. et al, "Soft X-ray microscopy at a spatial resolution better than 15 nm," Nature Letters, vol. 435, Jun. 30, 2005, pp. 1210-1213. <doi:10.1038/nature03719>.

Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. <doi:10.1109/CVPR.2007.383209>.

Chin, L., et al, "Malignant melanoma: genetics and therapeutics in the genomic era," CSH Press: Genes & Development, Aug. 15, 2006, vol. 20, pp. 2149-2182. <doi:10.1101/gad.1437206> [retrieved Sep. 9, 2015] <URL:http://genesdev.cshlp.org/content/20/16/2149>.

Choi, W., et al, "Tomographic phase microscopy," NPG: Nature Methods | Advance Online Publication, Aug. 12, 2007, pp. 1-3. <doi:10.1038/NMETH1078>.

Chung, J., et al, "Counting White Blood Cells from a Blood Smear Using Fourier Ptychographic Microscopy," PLoS One, vol. 10, No. 7, Jul. 17, 2015, pp. 1-10. <doi:10.1371/journal.pone.0133489>.

Chung, J., et al, "Wide field-of-view fluorescence image deconvolution with aberration-estimation from Fourier ptychography," Biomedical Optics Express, vol. 7, No. 2, Feb. 1, 2016, pp. 352-368. <doi: 10.1364/BOE.7.000352>.

Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] <URL:arXiv:1602.02901v2 [physics. Optics] Mar. 23, 2016>.

Colomb, T., et al, "Automatic procedure for aberration compensation in digital holographic microscopy and applications to specimen shape compensation," Applied Optics, vol. 45, No. 5, Feb. 10, 2006, pp. 851-863. <doi: 10.1364/AO.45.000851>.

De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015]<URL: https://arxiv.org/abs/1411.1134>.

Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. <doi:10.1364/OL.34.000079>.

Denis, L., et al, "Inline hologram reconstruction with sparsity constraints," Optics Letters, Optical Society of America, vol. 34, No. 22, Oct. 12, 2009, pp. 3475-3477. <doi:10.1364/OL.34.003475> <ujm-00397994v2>.

Di, J., et al, "High resolution digital holographic microscopy with a wide field of view based on a synthetic aperture technique and use of linear CCD scanning," Applied Optics, vol. 47, No. 30, Oct. 20, 2008, pp. 5654-5659. <doi:10.1364/AO.47.005654>.

Dierolf, M., et al, "Ptychographic X-ray computed tomography at the nanoscale," Nature Letter, vol. 467, Sep. 23, 2010, pp. 436-439. <doi:10.1038/nature09419>.

Dierolf, M., et al, "Ptychographic coherent diffractive imaging of weakly scattering specimens," New Journal of Physics, vol. 12, Mar. 31, 2010, 035017, pp. 14. <doi:10.1088/1367-2630/12/3/035017>.

Doctor Mole—Skin Cancer App, App to check skin cancer by Dr. Mole, p. 1. (Webpage) [retrieved on Oct. 23, 2015] <URL: http://www.doctormole.com>.

Dong, S., et al, "FPscope: a field-portable high-resolution microscope using a cellphone lens," Biomedical Optics Express, vol. 5, No. 10, Oct. 1, 2014, pp. 3305-3310. <doi:10.1364/BOE.5.003305>.

Dong, S., et al, "High-resolution fluorescence imaging via pattern-illuminated Fourier ptychography," Optics Express, vol. 22, No. 17, Aug. 25, 2014, pp. 20856-20870. <doi:10.1364/OE.22.020856>.

Dong, S., et al, "Aperture-scanning Fourier ptychography for 3D refocusing and super-resolution macroscopic imaging," Optics Express, vol. 22, No. 11, Jun. 2, 2014, pp. 13586-13599. <doi:10.1364/OE.22.013586>.

Eldar, Y.C., et al, "Sparse Phase Retrieval from Short-Time Fourier Measurements," IEEE Signal Processing Letters, vol. 22, No. 5, May 2015, pp. 638-642. <doi:10.1109/LSP.2014.2364225>.

Emile, O., et al, "Rotating polarization imaging in turbid media," Optics Letters, vol. 21, No. 20, Oct. 15, 1996, pp. 1706-1708. <doi:10.1364/OL.21.001706>.

Essen BioScience, "Real-time, quantitative live-cell analysis, IncuCyte® Zoom System," IncuCyte Zoom System Brochure 2016, pp. 1-4. [retrieved Feb. 25, 2016] [URL:http://www.essenbioscience.com/IncuCyte].

Faulkner, H.M.L., et al, "Error tolerance of an iterative phase retrieval algorithm for moveable illumination microscopy," Ultramicroscopy, vol. 103, No. 2, May 2005, pp. 153-164. <doi:10.1016/j.ultramic.2004.11.006>.

Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. <doi:10.1103/PhysRevLett.93.023903>.

Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] <URL:http://faculty.washington.edu/mfazel/thesis-final.pdf>.

Feng, P., et al, "Long-working-distance synthetic aperture Fresnel off-axis digital holography," Optics Express, vol. 17, No. 7, Mar. 30, 2009, pp. 5473-5480. <doi:10.1364/OE.17.005473>.

Fienup, J. R., "Invariant error metrics for image reconstruction," Applied Optics, vol. 36, No. 32, Nov. 10, 1997, pp. 8352-8357. <doi: 10.1364/AO.36.008352>.

Fienup, J. R., "Lensless coherent imaging by phase retrieval with an illumination pattern constraint," Optics Express, vol. 14, No. 2, Jan. 23, 2006, pp. 498-508. <doi: 10.1364/OPEX.14.000498>.

Fienup, J. R., "Phase retrieval algorithms: a comparison," Applied Optics, vol. 21, No. 15, Aug. 1, 1982, pp. 2758-2769. <doi:10.1364/AO.21.002758>.

Fienup, J. R., "Reconstruction of a complex-valued object from the modulus of its Fourier transform using a support constraint," Journal of the Optical Society of America A, vol. 4, No. 1, Jan. 1987, pp. 118-123. <doi:10.1364/JOSAA.4.000118>.

Fienup, J. R., "Reconstruction of an object from the modulus of its Fourier transform," Optics Letter, vol. 3, No. 1, Jul. 1978, pp. 27-29. <doi: 10.1364/OL.3.000027>.

Gan, X., et al, "Image enhancement through turbid media under a microscope by use of polarization gating methods," Journal of the Optical Society of America A, vol. 16, No. 9, Sep. 1999, pp. 2177-2184. <doi: 10.1364/JOSAA.16.002177>.

Gerke T.D., et al, "Aperiodic volume optics," Nature Photonics, vol. 4, Feb. 7, 2010, pp. 188-193. <doi:10.1038/nphoton.2009.290>.

Ghosh, A., et al, pre-published manuscript of"Multiview Face Capture using Polarized Spherical Gradient Illumination," via USC

(56) References Cited

OTHER PUBLICATIONS

Institute for Creative Technologies; To appear in ACM Transactions on Graphics (TOG), vol. 30, No. 6, Dec. 2011, pp. 1-10. [Retrieved Sep. 28, 2011] <URL:http://doi.acm.org/10.1145/2024156.2024163>.
Godara, P., et al, "Adaptive Optics Retinal Imaging: Emerging Clinical Applications," *NIH-PA Author Manuscript*; available in PMC Dec. 1, 2011. Published in final edited form as: Optom. Vis. Sci.. Dec. 2010; 87(12): 930-941. <doi:10.1097/OPX.0b013e3181ff9a8b>.
Goodman, J.W., "Introduction to Fourier Optics," Third Ed., Roberts & Company Publishers (Englewood, Colorado 2005) pp. 1-172. <ISBN 0-9747077-2-4>.
Goodson, A.G., et al, "Comparative analysis of total body vs. dermatoscopic photographic monitoring of nevi in similar patient populations at risk for cutaneous melanoma," NIH-PA *Author Manuscript*; available in PMC Jul. 1, 2011. Published in final edited form as: Dermatol. Surg. Jul. 2010; 36(7): 1087-1098. <doi:10.1111/j.1524-4725.2010.01589.x>.
Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. <doi:10.1364/AO.49.000845>.
Grant, M., et al, "CVX: Matlab Software for Disciplined Convex Programming," CVX Research Inc., pp. 1-3. [Webpage] [retrieved on Dec. 18, 2015] <URL:http://cvxr.com/cvx>.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] <URL:http://dx.doi.org/10.1039/C2LC21072J>.
Greenbaum, A., et al, "Increased space-bandwidth product in pixel super-resolved lensfree on-chip microscopy," Scientific Reports, vol. 3, No. 1717, Apr. 24, 2013, pp. 1-8. [doi: 10.1038/srep01717].
Gruev, V., et al, "Dual-tier thin film polymer polarization imaging sensor," Optics Express, vol. 18, No. 18, Aug. 30, 2010, pp. 19292-19303. <doi: 10.1364/OE.18.019292>.
Guizar-Sicairos, M., and Fienup, J.R.,"Phase retrieval with transverse translation diversity: a nonlinear optimization approach," Optics Express, vol. 16, No. 10, May 12, 2008, pp. 7264-7278. <doi: 10.1364/OE.16.007264>.
Gunturk, B.K., et al, "Restoration in the Presence of Unknown Spatially Varying Blur," Ch. 3, in *Image Restoration: Fundamentals and Advances* (CRC Press 2012), pp. 63-68. <ISBN 978-1-4398-6955-0>.
Guo, K., et al, "Optimization of sampling pattern and the design of Fourier ptychographic illuminator," Optics Express, vol. 23, No. 5, Mar. 9, 2015, pp. 6171-6180. <doi: 10.1364/OE.23.006171>.
Gustafsson, M.G.L., "Surpassing the lateral resolution limit by a factor of two using structured illumination microscopy," Journal of Microscopy, vol. 198, Pt. 2, May 2000, pp. 82-87. <doi:10.1046/j.1365-2818.2000.00710.x>.
Gutzler, T., et al, "Coherent aperture-synthesis, wide-field, high-resolution holographic microscopy of biological tissue," Optics Letters, vol. 35, No. 8, Apr. 15, 2010, pp. 1136-1138. <doi:10.1364/OL.35.001136>.
Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. <doi:10.1103/PhysRevLett.103.126101>.
Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. <doi:10.1021/ac303356v>.
Hillman, T.R., et al, "High-resolution, wide-field object reconstruction with synthetic aperture Fourier holographic optical microscopy," Optics Express, vol. 17, No. 10, May 11, 2009, pp. 7873-7892. <doi:10.1364/OE.17.007873>.
Hofer, H., et al, "Dynamics of the eye's wave aberration," Journal of Optical Society of America A., vol. 18, No. 3, Mar. 2001, pp. 497-506. <doi:10.1364/JOSAA.18.000497>.
Hofer, H., et al, "Organization of the Human Trichromatic Cone Mosaic," The Journal of Neuroscience, vol. 25, No. 42, Oct. 19, 2005, pp. 9669-9679. <doi:10.1523/JNEUROSCI.2414-05.2005>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Hong, S.-H., et al, "Three-dimensional volumetric object reconstruction using computational integral imaging," OSA Publishing: Optics Express, vol. 12, No. 3, Feb. 9, 2004, pp. 483-491. <doi:10.1364/OPEX.12.000483>.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Hoppe, W., "Diffraction in inhomogeneous primary wave fields. 1. Principle of phase determination from electron diffraction interference," Acta Crystallogr. A25, 495-501 1969.
Horstmeyer, R., et al, "A phase space model of Fourier ptychographic microscopy," Optics Express, vol. 22, No. 1, Jan. 13, 2014, pp. 338-358. <doi:10.1364/OE.22.000338>.
Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.
Horstmeyer, R., et al, "Digital pathology with Fourier Ptychography," Computerized Medical Imaging and Graphics, vol. 42, Jun. 2015, pp. 38-43. <doi:10.1016/j.compmedimag.2014.11.005>.
Horstmeyer, R., et al, "Overlapped Fourier coding for optical aberration removal," Optics Express, vol. 22, No. 20, Oct. 6, 2014, pp. 24062-24080. <doi:10.1364/OE.22.024062>.
Horstmeyer, R., et al, "Solving ptychography with a convex relaxation," New Journal of Physics, vol. 17, May 27, 2015, pp. 1-14. <doi: 10.1088/1367-2630/17/5/053044> [URL: http://iopscience.iop.org/1367-2630/17/5/053044].
Horstmeyer, R., et al, "Standardizing the resolution claims for coherent microscopy," Nature Photonics | Commentary, vol. 10, No. 2, Feb. 2016, pp. 68-71. <doi:10.1038/nphoton.2015.279> [URL:http://dx.doi.org/10.1038/nphoton.2015.279].
Hüe, F., et al, "Wave-front phase retrieval in transmission electron microscopy via ptychography," Rapid Communications: Physical Review B, vol. 82, No. 12, Sep. 15, 2010, pp. 121415-1-121415-4. <doi:10.1103/PhysRevB.82.121415>.
Humphry, M., et al, "Ptychographic electron microscopy using high-angle dark-field scattering for sub-nanometre resolution imaging," Nature Communications, vol. 3, Mar. 6, 2012, pp. 1-7. <doi: 10.1038/ncomms1733>.
Jaganathan, K., et al, "Recovery of sparse 1-D signals from the magnitudes of their Fourier transform," *2012 IEEE International Symposium on Information Theory Proceedings*, Cambridge, MA, 2012, pp. 1473-1477. <doi: 10.1109/ISIT.2012.6283508.>.
Jaganathan, K., et al, "Phase retrieval with masks using convex optimization," 2015 IEEE International Symposium on Information Theory (ISIT), Hong Kong, 2015, pp. 1655-1659. <doi: 10.1109/ISIT.2015.7282737>.
Jaganathan, K., et al, pre published manuscript of "STFT Phase retrieval: uniqueness guarantees and recovery algorithms," ArXiv e-prints, 10 pages, (Submitted on Aug. 12, 2015 (v1). <doi: 10.1109/JSTSP.2016.2549507> [retrieved Nov. 9, 2015] <URL: https://arxiv.org/abs/1508.02820v1>.
Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].
Jung, J.H., et al, Author Manuscript of "Microfluidic-integrated laser-controlled microactuators with on-chip microscopy imaging functionality," Published in final edited form as: Lab Chip, Oct. 7, 2014, vol. 14, No. 19, pp. 3781-3789. <doi: 10.1039/c4lc00790e>.

(56) References Cited

OTHER PUBLICATIONS

Kawata, S. et al, "Optical microscope tomography. I. Support constraint," Journal Optical Society America A, vol. 4, No. 1, Jan. 1987, pp. 292-297. <doi:10.1364/JOSAA.4.000292>.

Kay, D. B., et al, Author Manuscript of "Outer Retinal Structure in Best Vitelliform Macular Dystrophy," Published in final edited form as: JAMA Ophthalmol., Sep. 2013, vol. 131, No. 9, pp. 1207-1215. <doi: 10.1001/jamaophthalmol.2013.387>.

Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. <doi: 10.1364/BOE.7.003097>.

Kim, M., et al, "High-speed synthetic aperture microscopy for live cell imaging," Optics Letters, vol. 36, No. 2, Jan. 15, 2011, pp. 148-150. <doi:10.1364/OL.36.000148>.

Kim, M., et al, "High-speed synthetic aperture microscopy for live cell imaging," NIH-PA, Author Manuscript available in PMC Mar. 30, 2011. Published in final edited form as: Opt Lett. Jan. 15, 2011; 36(2): pp. 148-150. <PMCID: PMC3068016>.

Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro. a023486].

Kirkland, A.I., et al, "Super-resolution by aperture synthesis: tilt series reconstruction in CTEM," Elsevier Science B.V., Ultramicroscopy 57, Mar. 1995, pp. 355-374. <doi:10.1016/0304-3991(94)00191-O>.

Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. <doi: 10.1016/S0190-9622(99)70437-8>.

Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.

Kozak, I., "Retinal imaging using adaptive optics technology," Saudi Journal of Ophthalmology, vol. 28, No. 2, Feb. 25, 2014, pp. 117-122. <doi:10.1016/j.sjopt.2014.02.005>.

Lauer, V., "New Approach to optical diffraction tomography yielding a vector equation of diffraction tomography and a novel tomographic microscope," Journal of Microscopy, Feb. 2002, vol. 205, No. 2, pp. 165-176. <doi: 10.1046/j.0022-2720.2001.00980.x>.

Lee, K., et al, "Synthetic Fourier transform light scattering," Optics Express, vol. 21, No. 19, Sep. 23, 2013, pp. 22453-22463. <doi:10.1364/OE.21.022453>.

Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].

Levoy, M., et al, "Recording and controlling the 4D light field in a microscope using microlens arrays," Journal of Microscopy, vol. 235, Pt. 2, Aug. 2009, pp. 144-162. <doi:10.1111/j.1365-2818.2009.03195.x>.

Li, X., et al, "Sparse Signal Recovery from Quadratic Measurements via Convex Programming," SIAM Journal on Mathematical Analysis, vol. 45, No. 5, Sep. 26, 2013, pp. 3019-3033. [doi:10.1137/120893707] [retrieved Feb. 13, 2014] <URL: http://dx.doi.org/10.1137/120893707>.

Lohmann, A. W., et al, "Space—bandwidth product of optical signals and systems," Journal of the Optical Society of America A, vol. 13, No. 3, Mar. 1996, pp. 470-473. <doi: 10.1364/JOSAA.13.000470>.

Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.

Lue, N., et al, "Live Cell Refractometry Using Hilbert Phase Microscopy and Confocal Reflectance Microscopy," NIH-PA Author Manuscript, available in PMC Apr. 22, 2010. Published in final edited form as: J Phys Chem A. Nov. 26, 2009; 113(47); 13327-13330. <PMCID: PMC2858636>.

Luxexcel® Brochure, "Luxexcel: 3D Printing Service Description" pp. 1-5. [retrieved on Mar. 7, 2016] <URL: http://www.luxexcel.com>.

Lytro | Illum, Lytro—Products [webpages], pp. 1-6. [Online] [retrieved Oct. 23, 2015] <URL:https://www.lytro.com/>.

Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. <doi: 10.2312/EGWR/EGSR07/183-194>.

Mahajan, V.N., "Zernike Circle Polynomials and Optical Aberrations of Systems with Circular Pupils," Engineering Laboratory Notes: Supplemental to Applied Optics, vol. 33 No. 34, Dec. 1, 1994, pp. 8121-8124. <doi:10.1364/AO.33.008121>.

Maiden, A.M., et al, "A new method of high resolution, quantitative phase scanning microscopy," in Proceedings of SPIE, Jun. 2, 2010, vol. 7729, pp. 77291I-1-77291I-8. <doi: 10.1117/12.853339> [retrieved on Dec. 16, 2015] <URL: proceedings.spiedigitallibrary.org>.

Maiden, A.M., et al, "An improved ptychographical phase retrieval algorithm for diffractive imaging," Ultramicroscopy, vol. 109, No. 10, Sep. 2009, pp. 1256-1262. <doi:10.1016/j.ultramic.2009.05.012>.

Maiden, A.M., et al, "Superresolution imaging via ptychography," Journal of the Optical Society of America A. (JOSAA), vol. 28, No. 4, Apr. 1, 2011, pp. 604-612. <doi: 10.1364/JOSAA.28.000604>.

Maiden, A.M., et al, "Optical ptychography: a practical implementation with useful resolution," Optics Letters, vol. 35, No. 15, Aug. 1, 2010, pp. 2585-2587. <doi:10.1364/OL.35.002585>.

Marchesini S., "Invited Article: A unified evaluation of iterative projection algorithms for phase retrieval," Review of Scientific Instruments, vol. 78, No. 1, Apr. 19, 2007, pp. 011301-1-011301-10. <doi: 10.1063/1.2403783> [retrieved May 7, 2014] <URL: http://dx.doi.org/10.1063/1.2403783>.

Marchesini S., et al, pre published manuscript of "Augmented projections for ptychographic imaging," (Submitted on Sep. 21, 2012 (v1), last revised Aug. 29, 2013 (this version, v5)) pp. 1-18. Published in Inverse Problems vol. 29, No. 11 (2013). [retrieved on Nov. 9, 2015] <URL: https://arxiv.org/pdf/1209.4924>.

Marrison, J., et al, "Ptychography—a label free, high-contrast imaging technique for live cells using quantitative phase information," Scientific Reports, vol. 3, No. 2369, Aug. 6, 2013, pp. 1-7. <doi: 10.1038/srep02369>.

Medoff, B.P., et al, "Iterative convolution backprojection algorithms for image reconstruction from limited data," Journal of the Optical Society of America, vol. 73, No. 11, Nov. 1, 1983, pp. 1493-1500. <doi: 10.1364/JOSA.73.001493>.

Melafind, Optics by Carl Zeiss, MELA Sciences 2015, pp. 1-4. [Webpage] [retrieved Oct. 23, 2015] <URL: http://www.melafind.com/>.

Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. <doi: 10.1016/j.ultramic.2003.11.001>.

Miao, J., et al, "High Resolution 3D X-Ray Diffraction Microscopy," Physical Review Letters, vol. 89, No. 8, Aug. 19, 2002, pp. 088303-1-088303-4. <doi: 10.1103/PhysRevLett.89.088303>.

Mico, V., et al, "Synthetic aperture microscopy using off-axis illumination and polarization coding," Optics Communications, vol. 276, No. 2, Aug. 15, 2007, pp. 209-217. <doi:10.1016/j.optcom.2007.04.020>.

Mico, V., et al, "Synthetic aperture superresolution with multiple off-axis holograms," Journal of the Optical Society of America A, vol. 23, No. 12, Dec. 1, 2006, pp. 3162-3170. <doi:10.1364/JOSAA.23.003162>.

Mir, M. et al, "Optical measurement of cycle-dependent cell growth," Proceedings of the National Academy of Sciences (PNAS) vol. 108, No. 32, Aug. 9, 2011, pp. 13124-13129. <doi:10.1073/pnas.1100506108>.

Mir, M., et al, "Blood screening using diffraction phase cytometry," Journal of Biomedical Optics: vol. 15, No. 2, Mar./Apr. 2010, pp. 027016-1-027014-4. <doi:10.1117/1.3369965> [retrieved on Feb. 6, 2015] <URL:http://dx.doi.org/10.1117/1.3369965>.

(56) References Cited

OTHER PUBLICATIONS

Moreno, I., "Creating a desired lighting pattern with an LED array," Proceedings of SPIE, Eighth International Conference on Solid State Lighting, vol. 705811, Sep. 2, 2008, pp. 9. <doi:10.1117/12.795673>.

Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. <doi: 10.3928/23258160-20141118-12>.

Nayar, S. K., et al, pre-published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. <doi: http://dx.doi.org/10.1145/1179352.1141977>.

Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. <URL: https://classes.soe.ucsc.edu/cmps290b/Fall05/readings/lfcamera-150dpi.pdf>.

Nomura, H., et al., "Techniques for measuring aberrations in lenses used in photolithography with printed patterns," Applied Optics, vol. 38, No. 13, May 1, 1999, pp. 2800-2807. <doi: 10.1364/AO.38.002800>.

Ohlsson, H., et al, "Compressive Phase Retrieval From Squared Output Measurements Via Semidefinite Programming," arXiv:1111.6323, Technical Report; Nov. 28, 2011, pp. 6. <URL: http://cds.cern.ch/record/1402765>.

Ou, X., et al, "High numerical aperture Fourier ptychography: principle, implementation and characterization," Optics Express, vol. 23, No. 3, Feb. 9, 2015, pp. 3472-3491. <doi: 10.1364/oe.23.003472>.

Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.

Ou, X., et al, "Quantitative phase imaging via Fourier ptychographic microscopy," NIH-PA Author Manuscript; available in PMC Dec. 26, 2014. Published in final edited form as: Opt Lett. Nov. 15, 2013; 38(22): 4845-4848. <doi: 10.1364/OL.38.004845>.

Ou. X., et al, "Embedded pupil function recovery for Fourier ptychographic microscopy," Optics Express, vol. 22, No. 5, Mar. 10, 2014, pp. 4960-4972. <doi: 10.1364/OE.22.004960> Erratum Attached, dated Dec. 28, 2015, vol. 23, No. 26, p. 33027. <doi:10.1364/OE.23.033027>.

Ou. X., et al, pre published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. <doi: 10.1364/OE.22.004960>.

Pacheco, S., et al, "Reflective Fourier Ptychography," Journal of Biomedical Optics, vol. 21, No. 2, Feb. 18, 2016, pp. 026010-1-026010-7. <doi: 10.1117/1.JBO.21.2.026010> [retrieved on Mar. 8, 2016] <URL: http://biomedicaloptics.spiedigitallibrary.org>.

Phillips, Z., et al, "Multi-Contrast Imaging and Digital Refocusing on a Mobile Microscope with a Domed LED Array," PLoS One, vol. 10, No. 5, May 13, 2015, pp. 1-13. <doi:10.1371/journal.pone.0124938>.

Recht, B., et al, "Guaranteed Minimum-Rank Solutions of Linear Matrix Equations via Nuclear Norm Minimization," SIAM Review, vol. 52, No. 3, Aug. 5, 2010, pp. 471-501. <doi: 10.1137/070697835> [retrieved on Nov. 20, 2015] <URL: https://doi.org/10.1137/070697835>.

Reinhard, E. et al., "High Dynamic Range Imaging: Acquisition, Display, and Image-based Lighting," (Morgan Kaufmann, 2010).

Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.

Rodenburg, J. M., et al, "A phase retrieval algorithm for shifting illumination," Applied Physics Letters, vol. 85, No. 20, Nov. 15, 2004, pp. 4795-4797. <doi: 10.1063/1.1823034>.

Rodenburg, J. M., et al, "Hard-X-ray Lensless Imaging of Extended Objects," Physical Review Letters, vol. 98, No. 3, Jan. 19, 2007, pp. 034801-1-034801-4. <doi: 10.1103/PhysRevLett.98.034801>.

Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. <doi: 10.1098/rsta.1992.0050>.

Rodenburg, J.M., "Ptychography and related Diffractive Imaging Methods," Adv. Imaging Electron Phys., vol. 150, Dec. 31, 2008, pp. 87-184. <doi: 10.1016/S1076-5670(07)00003-1>.

Rossi, E.A., et al, "In vivo imaging of retinal pigment epithelium cells in age related macular degeneration," Biomedical Optics Express, vol. 4, No. 11, Nov. 1, 2013, pp. 2527-2539. <doi: 10./1364/BOE.4.0025271.

Rowe, M., et al, "Polarization-difference imaging: a biologically inspired technique for observation through scattering media," Optics Letters, vol. 20, No. 6, Mar. 15, 1995, pp. 608-610. <doi:10.1364/OL.20.000608>.

Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.

Schechner, Y., "Multiplexing for Optimal Lighting," IEEE Transactions on Pattern Analysis and Machine Intelligence, vol. 29, No. 8, Aug. 2007, pp. 1339-1354. <doi: 10.1109/TPAMI.2007.1151.>.

Schnars, U., et al, "Digital recording and numerical reconstruction of holograms," Measurement Science and Technology, vol. 13, No. 9, Aug. 7, 2002, pp. R85-R101. <doi:10.1088/0957-0233/13/9/201>.

Schwarz, C., et al, "Imaging interferometric microscopy," Optics letters, vol. 28, No. 16, Aug. 15, 2003, pp. 1424-1426. <doi: 10.1364/OL.28.001424>.

Shechner, Y., et al, "Polarization-based vision through haze," Applied Optics, vol. 42, No. 3, Jan. 20, 2003, pp. 511-525. <doi: 10.1364/AO.42.000511>.

Shechtman, Y., et al, "Sparsity based sub-wavelength imaging with partially incoherent light via quadratic compressed sensing," Optics Express, vol. 19, No. 16, Aug. 1, 2011, pp. 14807-14822. <doi:10.1364/OE.19.014807>.

Siegel, R., et al, "Cancer Statistics 2013," CA: A Cancer Journal for Clinicians, vol. 63, No. 1, Jan. 1, 2013, pp. 11-30. <doi:10.3322/caac.21166>.

Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. <doi:10.1001/jamadermatol.2013.4334>.

Sun, D., et al, "Estimating a signal from a magnitude spectrogram via convex optimization," arXiv preprint arXiv:1209.2076, Sep. 10, 2012, pp. 1-7. [retrieved Nov. 9, 2015] <URL: https://arxiv.org/abs/1209.2076>.

Sun, J., "Coded multi-angular illumination for Fourier ptychography based on Hadamard codes," In Proc. SPIE, vol. 9524, Jul. 17, 2015, pp. 95242C-1-94242C-5. <doi:10.1117/12.2189655> [retrieved Jul. 23, 2015] <URL: http://proceedings.spiedigitallibrary.org>.

Tam, K., et al, "Tomographical imaging with limited-angle input," Journal of the Optical Society of America, vol. 71, No. 5, May 1981, pp. 582-592. <doi:doi.org/10.1364/JOSA.71.000582>.

TFOCS: Templates for First-Order Conic Solvers, CVX Research, CVX Forum, http://cvxr.com/tfocs/.

Thibault, P. et al, "Probe retrieval in ptychographic coherent diffractive imaging," Ultramicroscopy, vol. 109, No. 4, Mar. 2009, pp. 338-343. <doi:10.1016/j.ultramic.2008.12.011>.

Thibault, P., et al, "High-resolution scanning X-ray diffraction microscopy," Science AAAS, vol. 321, No. 5887, Jul. 18, 2008, pp. 379-382. <doi:10.1126/science.1158573>.

Thomas, L., et al, "Semiological Value of ABCDE Criteria in the Diagnosis of Cutaneous Pigmented Tumors," Dermatology, vol. 197, No. 1, Jul. 13, 1998, p. 11-17. <doi:10.1159/000017969>.

Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.

(56) References Cited

OTHER PUBLICATIONS

Tian, L., et al, "Computational illumination for high-speed in vitro Fourier ptychographic microscopy," Optica: Research Article, vol. 2, No. 10, Oct. 14, 2015, pp. 904-911. <doi:10.1364/OPTICA.2. 000904>.
Tian, L., et al, "Multiplexed Coded Illumination for Fourier Ptychography with an LED Array Microscope," Biomedical Optics Express, vol. 5, No. 7, Jul. 1, 2014, pp. 14. <doi:10.1364/BOE.5. 002376>.
Tippie, A.E., et al, "High-resolution synthetic-aperture digital holography with digital phase and pupil correction," Optics Express, vol. 19, No. 13, Jun. 20, 2011, pp. 12027-12038. <doi:10.1364/OE.19. 012027>.
Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] <URL: http://dx.doi.org/10.1117/12.217378>.
Tyson, R., "Principles of Adaptive Optics" Third Ed., Series in Optics and Optoelectronics, CRC Press, Sep. 14, 2010, pp. 1-299. <ISBN: 13: 978-1-4398-0859-7>.
Vulovic, M., et al, "When to use the projection assumption and the weak-phase object approximation in phase contrast cryo-EM," Ultramicroscopy, vol. 136, Jan. 2014, pp. 61-66.<doi:10.1016/j. ultramic.2013.08.002>.
Waldspurger, I., et al, "Phase recovery, MaxCut and complex semidefinite programming," Mathematical Programming, vol. 149, No. 1-2, Feb. 2015, pp. 47-81. <doi:10.1007/s10107-013-0738-9>.
Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. <doi:10.1167/iovs.14-15576> [retrieved on Apr. 5, 2016] [URL: http://iovs.arvojournals.org].
Wang, Z., et al, "Tissue refractive index as marker of disease," Journal of Biomedical Optics, vol. 16, No. 11, Nov. 2011, pp. 116017-1-16017-7. <doi:10.1117/1.3656732>.
Watanabe, M., et al, "Telecentric optics for focus analysis," IEEE Transactions on Pattern Analysis and Machine Intelligence: Short Papers, vol. 19, No. 12, Dec. 1997, pp. 1360-1365. <doi:10.1109/ 34.643894>.
Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. <doi:10.1117/12.451320> [retrieved Dec. 16, 2015] <URL:http://proceedings.spiedigitallibrary.org>.
Williams, A., et al, "Fourier ptychographic microscopy for filtration-based circulating tumor cell enumeration and analysis," Journal of Biomedical Optics, vol. 19, No. 6, Jun. 20, 2014, pp. 066007.1-66007.8. <doi:10.1117/1.JBO.19.6.066007> [retrieved Feb. 10, 2016] <URL:http://biomedicaloptics.spiedigitallibrary.org>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/ 2017/april/synthetic_apertures_for_the_optical_domain/>.
Wolf, J., et al, "Diagnostic Inaccuracy of Smartphone Applications for Melanoma Detection," JAMA Dermatol. Author Manuscript; available in PMC May 13, 2014. Published in final edited form as: JAMA Dermatol. Apr. 2013; 149(4): 422-426. <doi:10.1001/ jamadermatol.2013.2382>.
Wu, J., et al, "Focal plane tuning in wide-field-of-view microscope with Talbot pattern illumination," Optics Letters, vol. 36, No. 12, Jun. 15, 2011, pp. 2179-2181. <doi:145985>.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.
Wu, J., et al, "Wide field-of-view microscope based on holographic focus grid illumination," Optics Letters, vol. 35, No. 13, Jul. 1, 2010, pp. 2188-2190. <doi:10.1364/OL.35.002188>.
Xu, W., et al, "Digital in-line holography for biological applications," Proceedings of the National Academy of Sciences of the USA (PNAS), vol. 98, No. 20, Sep. 25, 2001, pp. 11301-11305. <doi:10.1073/pnas.191361398>.
Yeh, et al., "Experimental robustness of Fourier ptychography phase retrieval algorithms," Optics Express, vol. 23, No. 26, Dec. 28, 2015, pp. 33214-33240. <doi:10.1364/OE.23.033214>.
Yuan, C., et al, "Angular multiplexing in pulsed digital holography for aperture synthesis," Optics Letters, vol. 33, No. 20, Oct. 15, 2008, pp. 2356-2358. <doi:10.1364/OL.33.002356>.
Zeiss, C., "Microscopy: Cells Need the Perfect Climate. System Solutions for Live Cell Imaging under Physiological Conditions," Zeiss Product Brochure, Carl Zeiss Microscopy GmbH Co., Feb. 2008, pp. 42. <URL: http://www.zeiss.de/incubation>.
Zhang, Y., et al, "Self-learning based Fourier ptychographic microscopy," Optics Express, vol. 23, No. 14, Jul. 13, 2015, pp. 18471-18486. <doi:10.1364/OE.23.018471>.
Zhang, Y., et al, "Photoreceptor perturbation around subretinal drusenoid deposits as revealed by adaptive optics scanning laser ophthalmoscopy," HHS Public Access, Am J Ophthalmol. Author Manuscript, Sep. 1, 2015, pp. 22. (Published in final edited form as: Am J Ophthalmol. 2014; 158(3): 584-96.e1.).
Zheng, G. "The ePetri dish, an on-chip cell imaging platform based on subpixel perspective sweeping microscopy (SPSM)," PNAS Early Edition, Published online before print Oct. 3, 2011, pp. 6. <doi:10.1073/pnas.1110681108>.
Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.
Zheng, G., et al, "Characterization of spatially varying aberrations for wide field-of-view microscopy," Optics Express, vol. 21, No. 13, Jul. 1, 2013, pp. 15131-15143. <doi:10.1364/0E.21.015131>.
Zheng, G., et al, "Microscopy refocusing and dark-field imaging by using a simple LED array," Optics Letters, vol. 36, No. 20, Oct. 15, 2011, pp. 3987-3989. <doi: 10.1364/OL.36.003987>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
Zheng, G., et al, "0.5 gigapixel microscopy using a flatbed scanner," Biomedical Optics Express, vol. 5, No. 1, Jan. 1, 2014, pp. 1-8. <doi: 10.1364/BOE.5.000001>.
Zheng, G., et al, "Sub-pixel resolving optofluidic microscope for on-chip cell imaging," Lab Chip, vol. 10, Sep. 29, 2010, pp. 3125-3129. <doi:10.1039/c0Lc00213e> [retrieved on Oct. 4, 2010] <URL: http://pubs.rsc.org>.
Zheng, G., et al, "Wide-field, high-resolution Fourier ptychographic microscopy," HHS Public Access, Nat. Photonics. Author Manuscript; available in PMC Sep. 19, 2014, pp. 1-16. (Published in final edited form as: Nat Photonics. Sep. 1, 2013; 7(9): 739-745. <doi:10. 1038/nphoton.2013.187>).
Preliminary Amendment dated Jun. 13, 2018 filed in U.S. Appl. No. 15/820,295.
U.S. Final Office Action dated Nov. 29, 2018 in U.S. Appl. No. 14/065,280.
U.S. Office Action dated Dec. 26, 2018 in U.S. Appl. No. 15/963,966.
U.S. Office Action dated Dec. 26, 2018 in U.S. Appl. No. 15/959,050.
U.S. Notice of Allowance dated Sep. 17, 2018 in U.S. Appl. No. 15/820,295.
U.S. Notice of Allowance dated Jan. 14, 2019 in U.S. Appl. No. 15/820,295.
U.S. Office Action dated Oct. 4, 2018 in U.S. Appl. No. 14/658,019.
U.S. Notice of Allowance dated Jul. 25, 2018 in U.S. Appl. No. 14/710,947.
U.S. Office Action dated Dec. 13, 2018 in U.S. Appl. No. 14/960,252.
U.S. Notice of Allowance dated Jun. 27, 2018 in U.S. Appl. No. 15/636,494.
U.S. Notice of Allowance dated Oct. 5, 2018 in U.S. Appl. No. 15/636,494.

(56) References Cited

OTHER PUBLICATIONS

U.S. Notice of Allowance dated Jul. 16, 2018 in U.S. Appl. No. 15/007,159.
U.S. Office Action dated Sep. 7, 2018 in U.S. Appl. No. 14/979,154.
U.S. Final Office Action dated Dec. 10, 2018 issued in U.S. Appl. No. 15/003,559.
U.S. Office Action Interview Summary dated May 3, 2018 in U.S. Appl. No. 15/068,389.
U.S. Final Office Action dated Jun. 6, 2018 issued in U.S. Appl. No. 15/068,389.
U.S. Office Action dated Jan. 17, 2019 issued in U.S. Appl. No. 15/068,389.
U.S. Notice of Allowance dated Feb. 9, 2018 in U.S. Appl. No. 15/081,659.
U.S. Notice of Allowance dated Oct. 19, 2018 issued in U.S. Appl. No. 15/160,941.
U.S. Notice of Allowance dated Jan. 15, 2019 issued in U.S. Appl. No. 15/620,674.
Chinese Third Office Action dated Jul. 13, 2018 issued in CN 201480057911.6.
Japanese First Office Action dated Jul. 31, 2018 issued in Application No. JP 2016-531919.
Chinese First Office Action dated Jan. 28, 2019 issued in CN 201580072950.8.
European Extended Search Report dated Jun. 6, 2018 issued in Application No. 15865492.1.
Extended European Search Report dated Aug. 8, 2018 issued in Application No. EP 16744002.3.
European Extended Search Report dated Aug. 14, 2018 issued in EP 16744003.1.
Chinese First Office Action dated Dec. 28, 2018 issued in Application No. CN 201680005491.6.
Chinese First Office Action dated Dec. 26, 2018 issued in Application No. CN 201580067354.0.
Extended European Search Report dated Jul. 3, 2018 issued in Application No. EP 15874344.3.
Extended European Search Report dated Sep. 12, 2018 issued in Application No. EP 16740769.1.
Chinese Second Office Action dated Jul. 3, 2018 issued in Application No. CN 201480054301.0.
Extended European Search Report dated Oct. 25, 2018 issued in Application No. EP 16765505.9.
International Search Report and Written Opinion dated Feb. 22, 2019 issued in PCT/US2018/059059.
Godden, T.M. et al., "Ptychographic microscope for three-dimensional imaging," Optics Express, vol. 22, No. 10, May 19, 2014, pp. 12513-12523.
Jacques, et al., "Imaging Superficial Tissues With Polarized Light," Lasers in Surgery and Medicine, vol. 26, No. 2, Apr. 25, 2000, pp. 119-129.
Jensen, et al. "Types of imaging, Part 2: An Overview of Fluorescence Microscopy." The Anatomical Record, vol. 295, No. 10, Oct. 1, 2012, pp. 1621-1627.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.
Sarder, et al. "Deconvolution Methods for 3-D Fluorescence Microscopy Images," IEEE Signal Processing Magazine, vol. 23, No. 3, May 2006, pp. 32-45.
U.S. Appl. No. 16/179,688, filed Nov. 2, 2018, Chan et al.
U.S. Appl. No. 16/242,934, filed Jan. 8, 2019, Kim et al.
U.S. Appl. No. 16/252,465, filed Jan. 18, 2019, Ou et al.
U.S. Office Action dated Mar. 8, 2019 in U.S. Appl. No. 16/171,270.
U.S. Office Action dated Apr. 4, 2019 in U.S. Appl. No. 16/162,271.
U.S. Notice of Allowance dated Apr. 16, 2019 in U.S. Appl. No. 15/820,295.
Chinese First Office Action dated Apr. 19, 2019 issued in Application No. CN 201680006738.6.
Chinese First Office Action dated Apr. 19, 2019 issued in Application No. CN 201680014898.5.
U.S. Office Action dated Jun. 26, 2019 issued in U.S. Appl. No. 14/065,280.
U.S. Final Office Action dated Jun. 3, 2019 in U.S. Appl. No. 15/959,050.
U.S. Final Office Action dated May 30, 2019 in U.S. Appl. No. 14/658,019.
U.S. Final Office Action dated May 30, 2019 in U.S. Appl. No. 14/979,154.
U.S. Office Action dated Jun. 26, 2019 issued in U.S. Appl. No. 15/003,559.
U.S. Final Office Action dated Jun. 19, 2019 issued in U.S. Appl. No. 15/068,389.
U.S. Notice of Allowance dated Apr. 29, 2019 issued in U.S. Appl. No. 15/620,674.

\* cited by examiner

VARIABLE-ILLUMINATION FOURIER PTYCHOGRAPHIC IMAGING DEVICES, SYSTEMS, AND METHODS

CROSS-REFERENCES TO RELATED APPLICATIONS

This application is a continuation of U.S. patent application Ser. No. 15/209,604, titled "VARIABLE-ILLUMINATION FOURIER PTYCHOGRAPHIC IMAGING DEVICES, SYSTEMS, AND METHODS" and filed on Jul. 13, 2016, which is a continuation of U.S. patent application Ser. No. 14/466,481 (issued as U.S. Pat. No. 9,497,379), titled "VARIABLE-ILLUMINATION FOURIER PTYCHOGRAPHIC IMAGING DEVICES, SYSTEMS, AND METHODS" and filed on Aug. 22, 2014, which claims benefit of and priority to U.S. Provisional Patent Application No. 61/899,715, titled "Increasing Numerical Aperture of Dry Objective to Unity via Fourier Ptychographic Microscopy" and filed on Nov. 4, 2013, U.S. Provisional Patent Application No. 61/868,967, titled "Alternative Optical Implementations for Fourier Ptychographic Microscopy" and filed on Aug. 22, 2013, and U.S. Provisional Patent Application No. 62/000,722, titled "Ultra-High NA Microscope via Fourier Ptychographic Microscopy" and filed on May 20, 2014; all of these applications are hereby incorporated by reference in their entireties and for all purposes.

FEDERALLY SPONSORED RESEARCH OR DEVELOPMENT

This invention was made with government support under Grant No. OD007307 awarded by the National Institutes of Health. The government has certain rights in the invention.

BACKGROUND

Certain embodiments described herein generally relate to imaging techniques. More specifically, certain aspects pertain to variable-illumination Fourier ptychographic imaging systems, devices, and methods that can be used in high resolution imaging applications such as, for example, pathology, haematology, semiconductor wafer inspection, and X-ray and electron imaging.

Imaging lenses ranging from microscope objectives to satellite-based cameras are physically limited in the total number of features they can resolve. These limitations are a function of the point-spread function (PSF) size of the imaging system and the inherent aberrations across its image plane field of view (FOV). Referred to as the space-bandwidth product, the physical limitation scales with the dimensions of the lens but is usually on the order of 10 megapixels regardless of the magnification factor or numerical aperture (NA). A discussion of space-bandwidth product of conventional imaging systems can be found in Lohmann, A. W., Dorsch, R. G., Mendlovic, D., Zalevsky, Z. & Ferreira, C., "Space-bandwidth product of optical signals and systems," J. Opt. Soc. Am. A. 13, pages 470-473 (1996), which is hereby incorporated by reference for this discussion. While conventional imaging systems may be able to resolve up to 10 megapixels, there is typically a tradeoff between PSF and FOV. For example, certain conventional microscope objectives can offer a sharp PSF (e.g., 0.5 µm) across a narrow FOV (e.g., 1 mm), while others imaging systems with wide-angle lenses can offer a wide FOV (e.g., 10 mm) at the expense of a blurry PSF (e.g., 5 µm).

Certain interferometric synthetic aperture techniques that try to increase spatial-bandwidth product are described in Di, J. et al., "High resolution digital holographic microscopy with a wide field of view based on a synthetic aperture technique and use of linear CCD scanning,"*Appl. Opt.* 47, pp. 5654-5659 (2008); Hillman, T. R., Gutzler, T., Alexandrov, S. A., and Sampson, D. D., "High-resolution, widefield object reconstruction with synthetic aperture Fourier holographic optical microscopy," *Opt. Express* 17, pp. 7873-7892 (2009); Granero, L., Micó, V., Zalevsky, Z., and García, J., "Synthetic aperture superresolved microscopy in digital lensless Fourier holography by time and angular multiplexing of the object information,"*Appl. Opt.* 49, pp. 845-857 (2010); Kim, M. et al., "High-speed synthetic aperture microscopy for live cell imaging," *Opt. Lett.* 36, pp. 148-150 (2011); Turpin, T., Gesell, L., Lapides, J., and Price, C., "Theory of the synthetic aperture microscope," pp. 230-240; Schwarz, C. J., Kuznetsova, Y., and Brueck, S., "Imaging interferometric microscopy," *Optics letters* 28, pp. 1424-1426 (2003); Feng, P., Wen, X., and Lu, R., "Long-working-distance synthetic aperture Fresnel off-axis digital holography," *Optics Express* 17, pp. 5473-5480 (2009); Mico, V., Zalevsky, Z., García-Martínez, P., and García, J., "Synthetic aperture superresolution with multiple off-axis holograms," JOSA A 23, pp. 3162-3170 (2006); Yuan, C., Zhai, H., and Liu, H., "Angular multiplexing in pulsed digital holography for aperture synthesis," *Optics Letters* 33, pp. 2356-2358 (2008); Mico, V., Zalevsky, Z., and Garcia, J., "Synthetic aperture microscopy using off-axis illumination and polarization coding," *Optics Communications, pp.* 276, 209-217 (2007); Alexandrov, S., and Sampson, D., "Spatial information transmission beyond a system's diffraction limit using optical spectral encoding of the spatial frequency," *Journal of Optics A: Pure and Applied Optics* 10, 025304 (2008); Tippie, A. E., Kumar, A., and Fienup, J. R., "High-resolution synthetic-aperture digital holography with digital phase and pupil correction," *Opt. Express* 19, pp. 12027-12038 (2011); Gutzler, T., Hillman, T. R., Alexandrov, S. A., and Sampson, D. D., "Coherent aperture-synthesis, widefield, high-resolution holographic microscopy of biological tissue," *Opt. Lett.* 35, pp. 1136-1138 (2010); and Alexandrov, S. A., Hillman, T. R., Gutzler, T., and Sampson, D. D., "Synthetic aperture Fourier holographic optical microscopy," *Phil. Trans. R. Soc. Lond. A* 339, pp. 521-553 (1992), all of which are hereby incorporated by reference for the discussion of attempts to increase spatial bandwidth. Most of the above-described interferometric synthetic aperture techniques include setups that record both intensity and phase information using interferometric holography such as off-line holography and phase-shifting holography. Interferometric holography has its limitations. For example, interferometric holography recordings typically use highly coherent light sources. As such, the constructed images typically suffer from coherent noise sources such as speckle noise, fixed pattern noise (induced by diffraction from dust particles and other optical imperfections in the beam path), and multiple interferences between different optical interfaces. Thus the image quality is typically worse than from a conventional microscope. On the other hand, using off-axis holography sacrifices spatial-bandwidth product (i.e., reduces total pixel number) of the image sensor. A discussion of certain off-axis holography methods can be found in Schnars, U. and Jüptner, W. P. O., "Digital recording and numerical reconstruction of holograms," *Measurement Science and Technology,* 13, R85 (2002), which is hereby incorporated by reference for this discussion. In addition, interferometric imaging techniques may subject to uncontrollable phase fluctuations between different measurements. Hence, accurate a priori knowledge of the sample location may be needed to set a reference point in the image recovery process. Another limitation is that many of these interferometric imaging systems require mechanical scanning to rotate the sample and thus precise optical alignments, mechanical control at a sub-micron level, and associated maintenances are required by these systems. In terms of spatial-bandwidth product, these interferometric imaging systems may present little to no advantage as compared with a conventional microscope.

Previous lensless microscopy such as in-line holography and contact-imaging microscopy also present drawbacks. For example, conventional in-line holography does not work well with contiguous samples and contact-imaging microscopy requires a sample to be in close proximity to the sensor. A discussion of certain digital in-line holography devices can be found in Denis, L., Lorenz, D., Thiebaut, E., Fournier, C. and Trede, D., "Inline hologram reconstruction with sparsity constraints," *Opt. Lett.* 34, pp. 3475-3477 (2009); Xu, W., Jericho, M., Meinertzhagen, I., and Kreuzer, H., "Digital in-line holography for biological applications," *Proc. Natl Acad. Sci. USA* 98, pp. 11301-11305 (2001); and Greenbaum, A. et al., "Increased space-bandwidth product in pixel super-resolved lensfree on-chip microscopy," *Sci. Rep.* 3, page 1717 (2013), which are hereby incorporated by reference for this discussion. A discussion of certain contact-imaging microscopy can be found in Zheng, G., Lee, S. A., Antebi, Y., Elowitz, M. B. and Yang, C., "The ePetri dish, an on-chip cell imaging platform based on subpixel perspective sweeping microscopy (SPSM)," *Proc. Natl Acad. Sci. USA* 108, pp. 16889-16894 (2011); and Zheng, G., Lee, S. A., Yang, S. & Yang, C., "Sub-pixel resolving optofluidic microscope for on-chip cell imaging," *Lab Chip* 10, pages 3125-3129 (2010), which are hereby incorporated by reference for this discussion.

A high spatial-bandwidth product is very desirable in microscopy for biomedical applications such as pathology, haematology, phytotomy, immunohistochemistry, and neuroanatomy. For example, there is a strong need in biomedicine and neuroscience to image large numbers of histology slides for evaluation. This need has prompted the development of sophisticated mechanical scanning and lensless microscopy systems. These systems increase spatial-bandwidth product using complex mechanisms with high precision to control actuation, optical alignment, and motion tracking. These complex mechanisms tend to be expensive to fabricate and difficult to use and maintain.

BRIEF SUMMARY

Certain embodiments described herein generally relate to imaging techniques. More specifically, certain aspects pertain to variable-illumination Fourier ptychographic imaging systems, devices, and methods that can be used in high resolution imaging applications such as, for example, pathology, haematology, semiconductor wafer inspection, and X-ray and electron imaging.

Certain embodiments are directed to an ultra-high NA Fourier ptychographic imaging system comprising a variable illuminator, an optical system, and a radiation detector. The variable illuminator is configured to illuminate a sample at a plurality of incidence angles at different times. The optical system comprises a lens with a high NA, the lens configured to filter light issuing from the sample. In one example, the high NA may be about 0.50, and in another example, the high NA may be in the range of about 0.40 to about 0.50, etc. The plurality of incidence angles and the high NA correspond to overlapping regions in the Fourier domain that cover an expanded NA of greater than 1.0. In one example, adjacent overlapping regions in the plurality of overlapping regions may have an overlapping area of at least about 20% to 90% of the area of one of the overlapping regions. In another example, the adjacent overlapping regions may have an overlapping area of at least about 70% of the area of one of the overlapping regions. In another example, the adjacent overlapping regions may have an overlapping area of at least about 75% of the area of one of the overlapping regions. In another example, the adjacent overlapping regions may have an overlapping area of at least about 2% and 99.5% of the area of one of the overlapping regions. The radiation detector is configured to acquire a plurality of intensity images, each intensity image corresponding to a different incidence angle of the plurality of incidence angles. In some aspects, the ultra-high NA Fourier ptychographic imaging system further comprises a processor configured to generate an image with a higher resolution than a resolution of the intensity images by iteratively updating the overlapping regions in the Fourier domain with intensity image measurements. In one aspect, the lens may be configured to filter light from the sample by passing light received within its acceptance angle. In one aspect, the lens may be configured to filter light from the sample by passing light received within its acceptance angle. In one aspect, the optical system comprises a collection optical element configured to receive light reflected from the sample and the variable illuminator and the collection optical element are located to the same side of the sample in an epi-illumination mode. In one aspect, the lens is configured to receive light reflected from the sample and the variable illuminator and the lens optical element are located to the same side of the sample in an epi-illumination mode.

In certain aspects, the ultra-high NA Fourier ptychographic imaging system of embodiments described herein may further comprise a variable illuminator comprising one or more circular rings of light elements. In one aspect, each outer ring may have a larger number of light elements than an adjacent smaller diameter ring. In one aspect, each concentric ring has at least 6 light elements. In one aspect, each concentric ring light elements separated by at least about 30 degrees. In one aspect, each concentric ring has a diameter of more than about 20 mm. In one aspect, each concentric ring has a diameter of more than about 40 mm.

Certain embodiments are directed to a reflective-mode Fourier ptychographic imaging system comprising a variable illuminator, an optical system and a radiation detector. The variable illuminator configured to illuminate a sample at a plurality of incidence angles at different times in an epi-illumination mode. The optical system comprises a filtering optical element having a filtering function. The optical system is configured to receive light reflected from the sample and filter the light reflected from the sample using the filtering optical element, wherein the plurality of incidence angles and the filtering function correspond to overlapping regions in the Fourier domain. The radiation detector is configured to acquire a plurality of intensity images, each intensity image corresponding to a different incidence angle of the plurality of incidence angles. In one aspect, the reflective-mode Fourier ptychographic imaging system further comprises a processor configured to generate an image with a higher resolution than a resolution of the intensity images by iteratively updating the overlapping regions in the Fourier domain with intensity image measurements. In one aspect, the filtering optical element is a lens configured to filter light by passing light received within its acceptance angle. In one aspect, the variable illuminator comprises a first set of circular rings of light elements centered about a central axis of the filtering optical element. In one aspect, the optical system further comprises a beam splitter placed at a 45 degree angle behind the filtering optical element and the filtering optical element is configured to filter light issued from the sample, the beam splitter is configured to receive light filtered by the filtering optical element and passes half the filtered light to the radiation detector. In one aspect, the optical system further comprises a secondary lens. In this case, the secondary lens is configured to receive illumination at a plurality of incidence angles from the variable illuminator and passes the illumination to the beam splitter and the beam splitter is configured to pass half the illumination to the sample through the filtering optical element.

In certain aspects, the reflective-mode Fourier ptychographic imaging system comprises a variable illuminator comprising a first set of circular rings of light elements centered about a central axis of the filtering optical element. In one aspect, the optical system further comprises a beam splitter placed at a 45 degree angle and behind the filtering optical element, and configured to pass about half the incident light and reflect about half the incident light, and the variable illuminator further comprises a second set of circular rings of light elements located to provide illumination reflected by the beam splitter and through the filtering optical element to the sample. In another aspect, the optical system further comprises a beam splitter placed at a 45 degree angle and behind the filtering optical element, and configured to pass about half the incident light and reflect about half the incident light, and the variable illuminator further comprises a second set of circular rings of light elements located to provide illumination reflected by the beam splitter and through the filtering optical element to the sample.

These and other features are described in more detail below with reference to the associated drawings.

DETAILED DESCRIPTION

Figure 1:
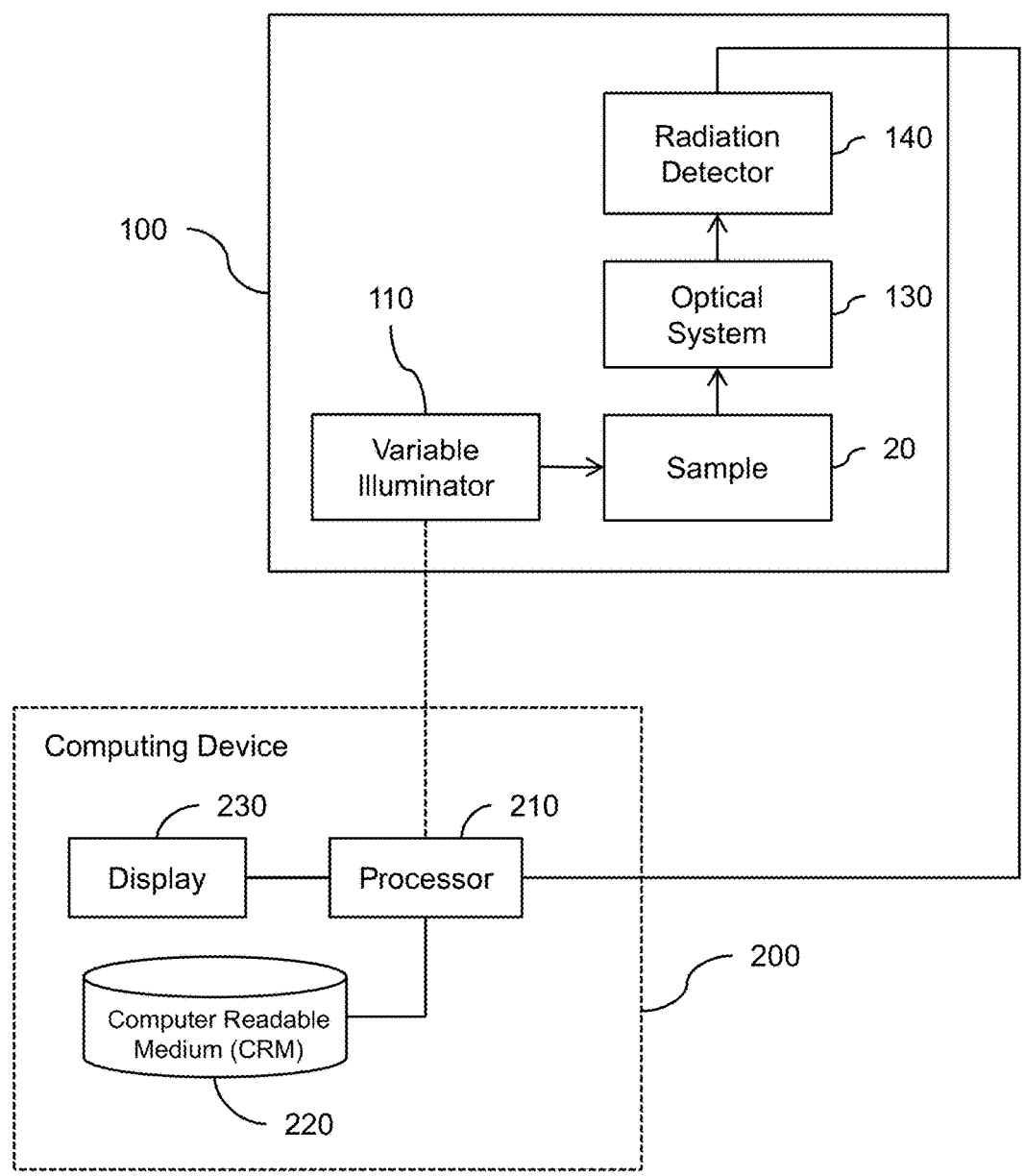
FIG. 1 is a block diagram of components of a variable-illumination Fourier ptychographic imaging system.

Certain embodiments described herein pertain to variable-illumination Fourier ptychographic imaging systems, devices, and methods.

I. Variable-Illumination Fourier Ptychographic Imaging Systems

In certain aspects, a variable-illumination Fourier ptychographic imaging system comprises a variable illuminator, an optical system, and a radiation detector. In some cases, the system may be in communication with a processor or further comprise a processor (e.g., microprocessor). The variable illuminator can illuminate (e.g., with plane wave illumination) a sample being imaged from a plurality of incidence angles. The optical system can receive light issuing from the sample and propagate it to the radiation detector. The optical system comprises at least one filtering optical element that can "filter" light typically based on its acceptance angle. The radiation detector receives filtered light from the optical system, and measures the light intensity distribution to capture a plurality of intensity images of the sample corresponding to different incidence angles. Each intensity image is associated with a region in Fourier space. In the case of a filtering optical element in the form of a lens, the diameter of the region corresponds to the NA of the lens and the center of the region corresponds to the incidence angle of the illumination at that sample time. The components of the Fourier ptychographic imaging system (e.g., variable illuminator and filtering optical element) are configured to acquire intensity images in the spatial domain that correspond to overlapping circular regions in the Fourier space to overlap by a certain amount and/or to cover a larger region (e.g., covering higher frequencies). For example, the NA of the filtering optical element and the number and locations of discrete light elements of a variable illuminator may be designed so that circular pupil regions in Fourier space overlap by a certain amount. In one case, these components may be designed so that the circular regions associated with adjacent incident angles overlap by a certain percentage (e.g., by about 70%, by about 80%, by about 90%, etc.) in the Fourier domain. The overlapping image data in Fourier space can be iteratively stitched together to generate a higher resolution image of the sample. In some cases, the variable illumination Fourier ptychographic imaging system can also correct for aberrations in the system including, for example, refocusing the higher-resolution image.

In certain aspects, a variable-illumination Fourier ptychographic imaging system comprises an optical system with a low NA filtering optical element (e.g., 2× lens with 0.08) for a wide field-of-view (e.g., 13 mm in diameter) of the sample. This system acquires intensity images with relatively low resolution due to the low NA optical element filtering light issuing from the sample. These intensity images correspond to smaller circular regions in Fourier space than if a higher NA optical element were used. In order to overlap these smaller circular regions in Fourier space by a certain amount (e.g., 70%, 75%, etc.), the variable illuminator in this system is configured to provide illumination with relatively short spacing (e.g., 0.05 rad) between adjacent incidence angles. Examples of variable-illumination Fourier ptychographic systems with low NA filtering optical element for wide field-of-view imaging can be found in U.S. patent application Ser. No. 14/065,280, titled "Fourier Ptychographic Imaging Systems, Devices, and Methods" and filed on Oct. 28, 2013 and in U.S. patent application Ser. No. 14/065,305, titled "Fourier Ptychographic X-ray Imaging Systems, Devices, and Methods," and in G. Zheng, R. Horstmeyer and C. Yang, "Wide-field, high-resolution Fourier ptychographic microscopy," Nature Photonics, 2013, which are both hereby incorporated by reference in their entirety for details of these systems.

In other aspects, an ultra-high NA (e.g., NA greater than 1.0) variable-illumination Fourier ptychographic imaging system is configured to achieve finer resolution of a sample image. In these aspects, the ultra-high NA variable-illumination Fourier ptychographic imaging system comprises an optical system with a higher NA filtering optical element (e.g., 20× lens with 0.5 NA) and a higher illumination NA for a combined increased system NA. The higher NA filtering optical element allows these systems to capture higher resolution intensity images than with the low NA system described above. These intensity images correspond to larger regions in Fourier space than intensity images captured with a lower NA filtering optical element. Since larger regions are covered, the variable illuminator can be configured with reduced spacing between adjacent incidence angles and with a reduced number N of incidence angles. In these systems, fewer intensity images may be needed to generate the same or higher resolution than with systems using a low NA filtering optical element. Since fewer intensity images may be needed, the image acquisition time is shorter and may require fewer resources to generate an image with the same or higher resolution than the low NA system. Also, the variable illuminator can be of a simpler design (e.g., less dense LED matrix) since fewer light elements are needed to provide illumination from the reduced number N of incidence angles. In some cases, the variable illuminator may be further configured so that the difference between extreme incidence angles is larger (i.e., higher illumination NA) than with the low NA system described above. That is, a higher illumination NA allows for capturing of high frequency data at the outer regions in Fourier space which also improves the resolution of the final images. Thus, these variable-illumination Fourier ptychographic imaging systems with an increased illumination NA and/or an increased optical system NA can provide for an increased system NA that can improve resolution of the images. That is, these systems may be able to illuminate the sample with incidence angles that allow for acquisition of images that cover larger overlapping regions in Fourier space and higher frequency data. When combined, these overlapping larger regions can result in a synthesized large system NA region that may, in certain cases, be close to unity. In certain cases, these systems have a high synthetized system NA (e.g., close to unity where the intrinsic NA of the filtering light element is lower such as, for example, about 0.75) while maintaining a large working distance, and without using needing an immersion medium.

In conventional microscopes, the highest system NA that can be achieved is limited by geometric principle (i.e. at most the entire upper hemisphere light cone of light from the sample is collected) and lens design technology, resulting in an upper bound of ~0.95 for dry microscope and ~1.40 for oil immersion microscope. Some conventional water or oil immersion objectives may provide NA>0.9 where an immersion media with refractive index greater than 1 improves collection of light from the sample. However, immersion objectives have several drawbacks that may make them unsuitable for some applications. Firstly, samples need to be immersed in media and typically the working distance is very short (0.1-0.2 mm), which presents an obstacle for micromanipulation of the sample. Secondly, common immersion media have inherently high absorption characteristics in the ultraviolet region (<375 nm) and near infrared region (>700 nm) of the spectrum, which brings some problem to the bright-field immersion microscopy in this region and also fluorescence immersion microscopy. A description of the relationship between oil immersion and numerical aperture can be found at: http://www.olympusmicro.com/primer/anatomy/immersion.html, which is hereby incorporated by reference for this description.

In certain cases, variable-illumination Fourier ptychographic imaging systems described herein may be configured to operate in a trans-illumination mode (i.e. directing illumination source through the sample and toward collection optical element) and/or in an epi-illumination mode (i.e., directing illumination source toward sample and away from collection optical element). In the epi-illumination mode, the collection optical elements received reflected light from the surface of the sample. In order to operate in the epi-illumination mode, the illumination source (e.g., illuminated element of the variable illuminator) may be configured to direct illumination to the sample from the same side as where the collection optical element is located. Some examples of variable-illumination Fourier ptychographic imaging devices shown operating in the epi-illumination mode are shown in FIGS. 5, 6, and 7A-7B. In trans-illumination mode, reflected light may not be captured by the collection optical element and it may be that only light transmitted through the sample is collected. Thus, an epi-illumination mode may be more effective for imaging thick and/or non-transparent samples than a trans-illumination mode. The variable-illumination Fourier ptychographic imaging systems operating in epi-illumination mode typically image reflective surfaces of the sample. Configuring variable-illumination Fourier ptychographic imaging systems for epi-illumination mode may be particularly useful in applications that involve metal or semiconductor surface inspection including, for example, semiconductor wafer, chip, and/or electronic circuit board inspection, among others. Some applications for these Fourier ptychographic imaging systems configured for epi-illumination mode may include hand-held cameras with a modified flash system or satellite imagery.

FIG. 1 is a block diagram of components of a variable-illumination Fourier ptychographic imaging system 10, according to certain embodiments. The variable-illumination Fourier ptychographic imaging system 10 comprises a variable-illumination Fourier ptychographic imaging device 100 and an optional (denoted by dashed line) computing device 200 in electronic communication with variable-illumination Fourier ptychographic imaging device 100. In certain illustrated examples, such as the one shown in FIG. 1, a sample is shown provided to the variable-illumination Fourier ptychographic imaging device for an image measurement process. It will be understood that the sample in not an essential component of the device, and is being shown for the purposes of illustrating an operation of the device. The optional computing device 200 can be in various forms such as, for example, a smartphone, laptop, desktop, tablet, etc. Various forms of computing devices would be contemplated by one skilled in the art.

The variable-illumination Fourier ptychographic imaging device 100 comprises a variable illuminator 110, an optical system 130, and a radiation detector 140. The variable illuminator 110 is configured to provide illumination at a plurality of N incidence angles at $(\theta_{i,j}, \theta y_{i,j})$, i=1 to n, j=1 to m to the sample 20. The variable illuminator 110 is configured to illuminate the sample 20 in a trans-illumination mode and/or in an epi-illumination mode. In the trans-illumination mode, the variable illuminator 110 directs illumination through the sample 20 and toward a collection optical element of the optical system 130. In an epi-illumination mode, the variable illuminator 110 directs illumination to the sample 20 and away from a collection optical element of the optical system 130.

The optical system 130 comprises components configured to receive light issuing from the sample 20 and propagate it to the radiation detector 140. A collection optical element of the optical system 130 receives light issued from the specimen 20. Either the collection optical element or another optical element of the optical system 130 filters the light it receives. For example, this filtering optical element may be in the form of an objective lens, which accepts light within its acceptance angle to act as a filter. The optical system 130 propagates the filtered light to the radiation detector 140, which measures (e.g., records) an intensity distribution at the radiation detector 140 at M sample times, $t_{q=1 \text{ to } M}$, to capture a plurality of M intensity images of the sample. In certain cases, M=N, i.e. an intensity measurement corresponds to each incidence angle.

In FIG. 1, the optional computing device 200 comprises a processor 210 (e.g., a microprocessor), a computer readable medium (CRM) 220 in communication with the processor 210, and a display 230 also in communication with the processor 210. The processor 210 is in electronic communication with the radiation detector 140 to receive signal(s) with image data corresponding to M intensity images. The image data may include, for example, intensity distributions, associated acquisition times, etc. The intensity images are of the sample 20 and/or the area around the sample 20.

The processor 210 is in electronic communication with CRM 220 (e.g., memory) to be able to transmit signals with image data in order to store to and retrieve image data from the CRM 220. Processor 210 is in electronic communication with display 230 to be able to send image data and instructions to display images and other output, for example, to a user of the system 10. As shown by a dotted line, the variable illuminator 110 may optionally be in electronic communication with processor 210 to send instructions for controlling variable illuminator 110. For example, in certain aspects these control instructions may be implemented to synchronize the illumination times at different incidence angles with the sample times of the radiation detector 140. The electronic communication between components of system 10 and other systems and devices described herein may be in wired or wireless form.

The processor 210 may also receive instructions stored on the CRM 220 and execute those instructions to perform one or more functions of variable-illumination Fourier ptychographic imaging system 10. For example, the processor 210 may execute instructions to perform one or more steps of the variable-illumination Fourier ptychographic imaging method. As another example, the processor 210 may execute instructions for illuminating light elements of the variable illuminator 110. As another example, the processor 210 may execute instructions stored on the CRM 220 to perform one or more other functions of the system such as, for example, 1) interpreting image data from the plurality of intensity images, 2) generating a higher resolution image from the image data, and 3) displaying one or more images or other output from the variable-illumination Fourier ptychographic imaging method on the display 230.

The CRM (e.g., memory) 220 can store instructions for performing certain functions of the system 10. These instructions are executable by the processor 220 or other processing components of the system 10. The CRM 220 can also store the (lower resolution) intensity and higher resolution image data, and other data produced by the system 10.

The variable-illumination Fourier ptychographic imaging system 10 also includes a display 230 in electronic communication with the processor 210 to receive data (e.g., image data) and provide display data to the display 230 for, for example, an operator of the variable-illumination Fourier ptychographic imaging system 10. The display 230 may be a color display or a black and white display. In addition, the display 230 may be a two-dimensional display or a three-dimensional display. In one embodiment, the display 230 may be capable of displaying multiple views.

In one operation, the variable-illumination Fourier ptychographic imaging system 10 performs a method comprising a measurement process, a recovery process, and an optional display process. During the measurement process, the sample is illuminated from a plurality of N incidence angles $(\theta x_{i,j}$, i=1 to n, j=1 to m, (N=n×m) using the variable illuminator 110. The optical system 130 has a filtering optical element that filters light issuing from the sample. The optical system 130 propagates the filtered light to the radiation detector 140. The radiation detector 140 receives the filtered light and acquires a plurality of M intensity images, $I_{k,l}$, k=1 to o and j=1 to p, where M=o×p. In certain cases, M may be N. The variable illuminator 110 is configured to generate illumination at incidence angles that will generate image data in Fourier space that overlaps by a certain amount. During the recovery process, the M intensity images are iteratively combined in Fourier space to generate a higher-resolution image data (intensity and/or phase). During the optional display process, an image (e.g., higher-resolution image, acquired intensity image, etc.) and/or other output may be provided on a display 230. In certain aspects, the system 10 may also be able to correct for any aberrations in the system 10, including re-focusing of the higher-resolution image. In one case, the system 10 may also be able to propagate the higher resolution image to one or more planes. The image data from these propagated images at different planes can be used to generate a three-dimensional image. In certain aspects, the system 10 may also be able to generate an image at different illumination wavelengths (RGB) to generate a color image.

Certain modifications, additions, or omissions may be made to the variable-illumination Fourier ptychographic imaging system 10 without departing from the scope of the disclosure. In addition, the components of the variable-illumination Fourier ptychographic imaging system 10 or the components of the variable-illumination Fourier ptychographic imaging devices described herein may be integrated or separated according to particular needs. For example, the computing device 200 or components thereof may be integrated into the variable-illumination Fourier ptychographic imaging device 100. In some embodiments, the processor 210 or other suitable processor may be part of the variable-illumination Fourier ptychographic imaging device 100. In some cases, the processor 210 may be integrated into a radiation detector so that the radiation detector performs the functions of the processor 210. As another example, the CRM 220 and/or display 230 may be omitted from the variable-illumination Fourier ptychographic imaging system 100 in certain cases.

In certain aspects, the variable-illumination Fourier ptychographic imaging systems and devices may further comprise a receptacle for receiving the sample at a sample surface. The sample surface may be part of a component of or a separate component of the systems and devices.

In certain aspects, one or more of the full field-of-view intensity images captured by a variable-illumination Fourier ptychographic imaging system 10 may be divided into one or more tile images. In these cases, the processor may construct a higher resolution complex image for each tile independently, and then combine the tile images to generate the full field-of-view image. This ability to process tile images independently allows for parallel computing. In these aspects, each tile may be represented by a two-dimensional area. In polar spatial coordinates, each tile may be a circular area or an oval area. In rectilinear spatial coordinates, the full field-of view low resolution image may be divided up into a two-dimensional matrix of tiles in a rectangular area. In some embodiments, the dimensions of a two-dimensional square matrix of tiles may be in powers of two when expressed in number of pixels of the radiation detector such as, for example, a 256 by 256 matrix, a 64×64 matrix, etc.

Figure 2:
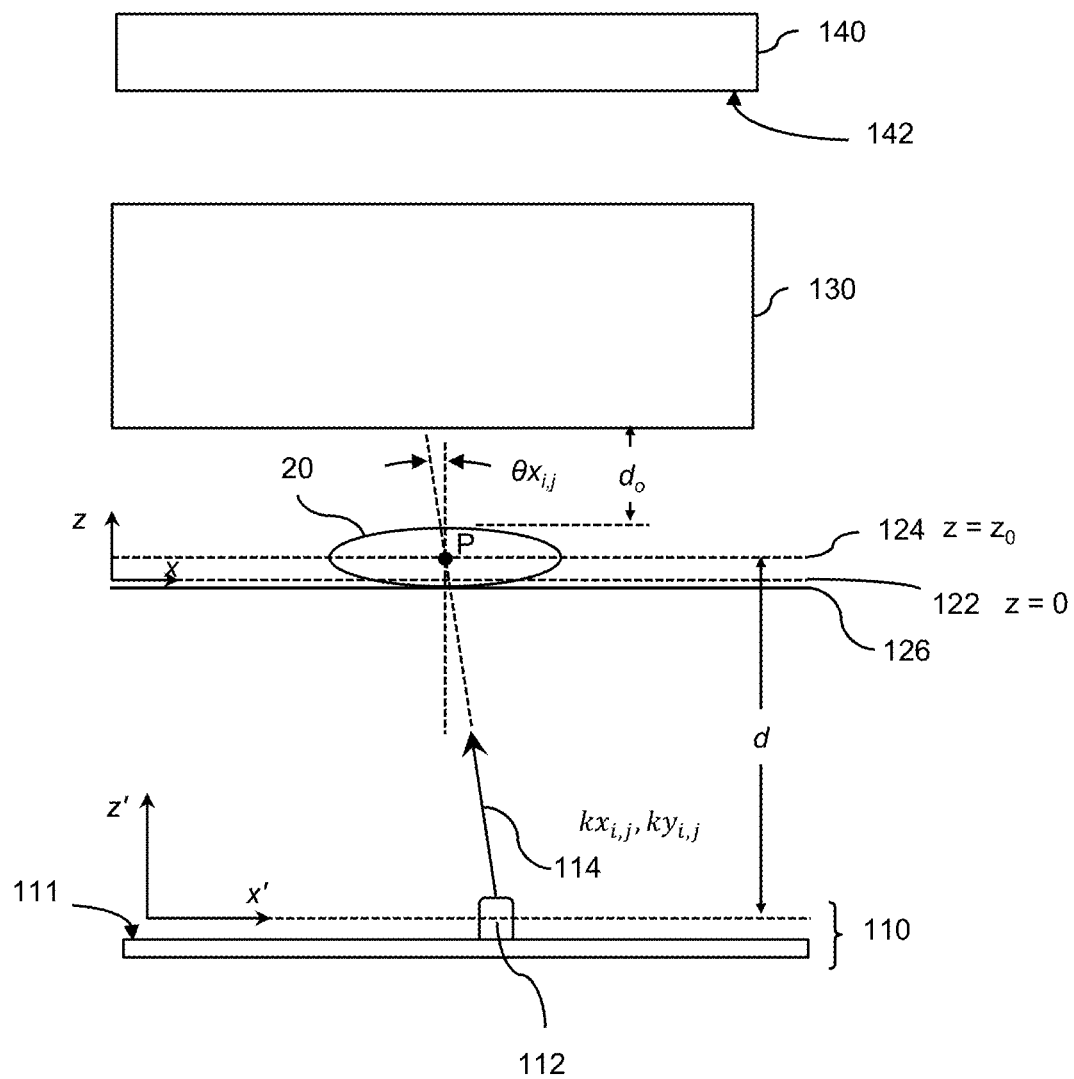
FIG. 2 depicts a schematic diagram of a side view of components of a variable-illumination Fourier ptychographic imaging device in trans-illumination mode.

FIG. 2 depicts a schematic diagram of a side view of components of a variable-illumination Fourier ptychographic imaging device 100(a) in trans-illumination mode, according to certain embodiments. The variable-illumination Fourier ptychographic imaging device 100(a) is an example of one configuration of the variable-illumination Fourier ptychographic imaging device 100 described with respect to FIG. 1.

In FIG. 2, the variable-illumination Fourier ptychographic imaging device 100(a) comprises a variable illuminator 110, an optical system 130, and a radiation detector 140 having a sensing surface 142. The variable illuminator 110 comprises a light element 112 and a surface 111. The variable illuminator 110 also comprises an x'-axis, a y'-axis (not shown) at a plane depicting the approximated plane from which the source of illumination is provided, and a z'-axis. Although FIG. 2 shows variable illuminator 110 comprising a single light element 112, the variable illuminator 110 may have additional light elements at different locations to provide incident light at a plurality of incidence angles. Although radiation detector 140 is shown at a distance away from optical system 130, radiation detector 140 may optionally be located at the optical system 130.

In the illustrated example, the sample 20 has been provided to a specimen surface 126 for the measurement process. The light element 112 is shown providing illumination 114 in a trans-illumination mode through the sample 20 where the illumination 114 has a wavevector $kx_{i,j}$, $ky_{i,j}$ for the measurement process. Also shown is an in-focus plane 122 at z=0 and a sample plane 124 at $z=z_0$. The variable-illumination Fourier ptychographic imaging device 100(a) further comprises an x-axis, a y-axis (not shown) at the in-focus plane 122, and a z-axis orthogonal to the in-focus plane 122. Also shown is a distance d between the variable illuminator 110 and the sample plane 124 and a working distance $d_o$ between the sample 20 and the optical system 130. Generally, a working distance, $d_0$, refers to the distance between the sample 20 and the collecting optical element of the optical system 130.

In FIG. 2, the light element 112 is shown providing illumination 114 at a single sample (acquisition) time in the measurement process. The optical system 130 receives and filters light issuing from specimen 20. Light filtered by the optical system 130 is received at the sensing surface 142 of the radiation detector 140. The radiation detector 140 measures the intensity distribution of incident light received at the sensing surface 142 and captures an intensity image at the sample time. Although the variable-illumination Fourier ptychographic imaging device 100(a) is shown at a single sample time, the device 100(a) may include N light elements 112 illuminating at, for example, N incidence angles ($\theta x_{i,j}$, $\theta y_{i,j}$), i=1 to n, j=1 to m, where N=n×m. In this case, the radiation detector 140 may acquire a plurality of M intensity images $I_{k,l}$, k=1 to o and j=1 to p at the M sample times, where each intensity image may be acquired while the illumination is at a different incidence angle of the plurality of N incidence angles ($\theta x_{i,j}$, $\theta y_{i,j}$). The incidence angles ($\theta x_{i,j}$, $\theta y_{i,j}$) are angles measured relative to an axis normal to the sample plane at $z=z_0$ and through point P. In the side view shown in FIG. 2, only the component $\theta x_{i,j}$ of the incidence angle in the x-z plane is shown.

A variable illuminator generally refers to a device that can be configured to provide incident radiation to the sample being imaged at different incidence angles at M image acquisition times. In many cases, the variable illuminator is designed to provide incident radiation at a plurality of N incidence angles ($\theta x_{i,j}$, $\theta y_{i,j}$), i=1 to n, j=1 to m. Generally, N has a value in a range from 2 to 1000. Each incidence angle corresponds to a location of the corresponding acquired image data in Fourier space. Adjacent incidence angles in the spatial domain correspond to neighboring regions in Fourier space. In certain aspects, the variable illuminator is designed to provide illumination at incidence angles that provide for an overlapping area of neighboring regions of image data in Fourier space where the overlapping area is of at least a certain minimum amount (e.g. 75% overlap, 70% overlap, 80% overlap, etc.). To provide this minimum amount of overlap of neighboring regions in Fourier space, the variable illuminator may be configured so that the difference between adjacent incidence angles in the plurality of N incidence angles is less than a certain maximum angular difference. That is, the variable illuminator may be configured with a maximum difference between adjacent incidence angles to provide the minimum amount of overlap in Fourier space. For example, the maximum angular difference may be about 0.05 rad for a 2×0.08 NA objective lens. In another case, the maximum angular difference may be about 0.1 rad.

In certain cases, the variable-illumination Fourier ptychographic imaging systems may include a filtering optical element in the form of a lens having an acceptance angle. This acceptance angle corresponds to the diameter of a circular pupil region in Fourier space. In these cases, the variable illuminator may be configured to have adjacent incidence angles that are separated by an angle of a value defined by the acceptance angle of the lens. In one case, the value of the difference between two adjacent incidence angles of the plurality of incidence angles may be in the range of about 10% to about 90% of the acceptance angle of the filtering optical element in the form of an objective lens. In another case, the value of the difference between two adjacent incidence angles of the plurality of incidence angles may be in the range of 33% and 66% of the acceptance angle of the filtering optical element in the form of an objective lens. In another case, the value of the difference between two adjacent incidence angles of the plurality of incidence angles may be less than about 76% of the acceptance angle of the filtering optical element in the form of an objective lens. In another case, the difference between adjacent incidence angles is about ⅓ of the acceptance angle defined the filtering optical element in the form of an objective lens. In another case, the range of incidence angles, defined by a difference between the largest and smallest incidence angles, may be about equal to the numerical aperture consistent with the spatial resolution of the final higher-resolution image. In one case, the acceptance angle is in the range of about −0.08 rad to about 0.08 rad, and the adjacent angle is 0.05 rad.

The variable illuminator comprises one or more radiation sources. Although the radiation source(s) are usually coherent radiation sources, incoherent radiation source(s) may also be used in some cases and computational corrections may be applied. The radiation sources may be visible light other forms of radiation. In cases that use visible light radiation, the radiation source(s) is a visible light source. Some examples of a radiation source of visible light include a liquid crystal display (LCD) pixel and a pixel of a light emitting diode (LED) display. In cases that use other forms of radiation, other sources of radiation may be used. For example, in embodiments that use X-ray radiation, the radiation source may comprise an X-ray tube and a metal target. As another example, in cases that use microwave radiation, the radiation source may comprise a vacuum tube. As another example, in embodiments that use acoustic radiation, the radiation source may be an acoustic actuator. As another example, in embodiments that use Terahertz radiation, the radiation source may be a Gunn diode. One skilled in the art would contemplate other sources of radiation. In one case that uses Terahertz radiation, the frequencies of the radiation provided by the illumination source may be in the range of about 0.3 to about 3 THz. In one case that uses microwave radiation, the frequencies of the radiation provided by the variable illuminator may be in the range of about 100 MHz to about 300 GHz. In one case that uses X-ray radiation, the wavelengths of the radiation provided by the variable illuminator may be in the range of about 0.01 nm to about 10 nm. In one case that uses acoustic radiation, the frequencies of the radiation provided by the variable illuminator may be in the range of about 10 Hz to about 100 MHz.

In certain cases, the variable illuminator may comprise a plurality of discrete light elements, each light element comprising at least one radiation source. For example, a variable illuminator that is configured to provide visible light typically includes a plurality of discrete light elements. Some examples of discrete light elements that can provide visible light are an LCD pixel and a pixel of an LED display. In many cases, the illumination provided by each light element may be approximated as plane wave illumination from the sample from a single incidence angle. For example, the light element 112 in FIG. 2 provides illumination 114 at an incidence angle that has a component $\theta x_{i,j}$ in the x-z plane.

In certain cases, the properties (e.g., wavelength, frequency, phase, amplitude, polarity, etc.) of illumination from the activated radiation source(s) of the variable illuminator at each acquisition time may be approximately uniform. In some cases, the illumination from the activated radiation source(s) at all acquisition times from all incidence angles may be approximately uniform. In other cases, the properties may vary at the different incidence angles, for example, by providing n different wavelengths $\lambda_1, \ldots, \lambda_n$ during the measurement process. In other cases, the variable illuminator may provide RGB illumination of three wavelengths $\lambda_1$, $\lambda_2$, and $\lambda_3$ corresponding to red, green, blue colors, respectively. In examples that use Terahertz radiation, the frequencies of the radiation provided by the variable illuminator may be in the range of about 0.3 to about 3 THz. In examples that use microwave radiation, the frequencies of the radiation provided by the variable illuminator may be in the range of about 100 MHz to about 300 GHz. In examples that use X-ray radiation, the wavelengths of the radiation provided by the variable illuminator may be in the range of about 0.01 nm to about 10 nm. In examples that use acoustic radiation, the frequencies of the radiation provided by the variable illuminator may be in the range of about 10 Hz to about 100 MHz.

Figure 3A:
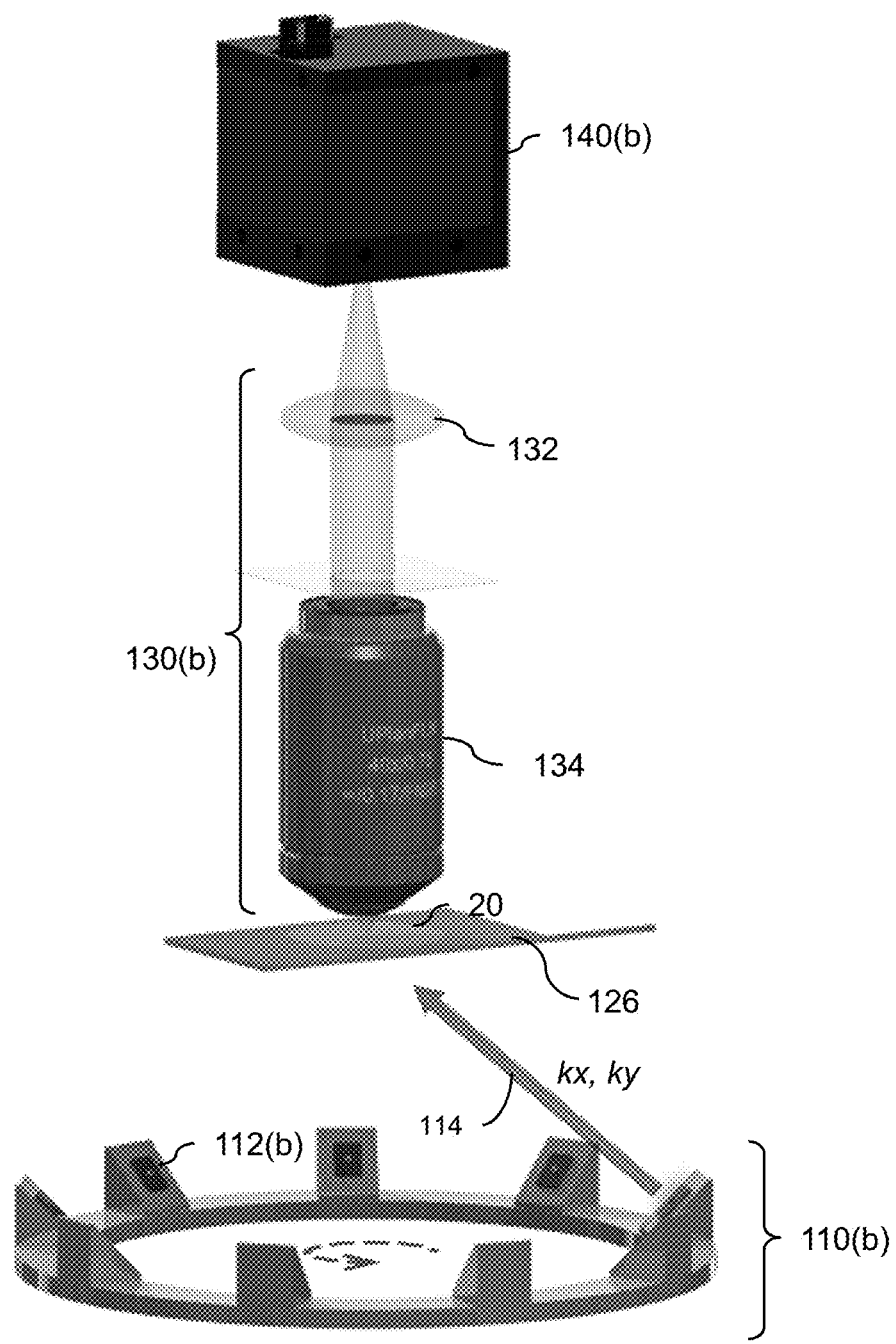
FIG. 3A depicts an orthogonal view of components of an ultra-high NA variable-illumination Fourier ptychographic imaging device with a circular variable illuminator.

In some cases, the variable illuminator comprises a plurality of N stationary discrete light elements at different spatial locations (e.g., variable illuminator 110(a) in FIG. 3A). These N stationary light elements may illuminate, individually or in groups of one or more, at different sample times (e.g., successively) to provide illumination from the plurality of N incidence angles. In other cases, the variable illuminator may comprise a moving light element. This moving light element may move relative to the optical system, the sample, and the radiation detector, which may be kept stationary. In these cases, the moving light element may be moved to a plurality of N different spatial locations using a mechanism such as a raster scanner. Based on the relative movement between the stationary components and the moving light element, the light element can provide illumination from the plurality of N incidence angles. In other cases, the variable illuminator comprises a stationary light element and the other components of system are moved to different spatial locations to provide the relative movement. Based on this relative movement between the stationary light element and the other components of the system, the light element can provide illumination from the plurality of N incidence angles.

Figure 4:
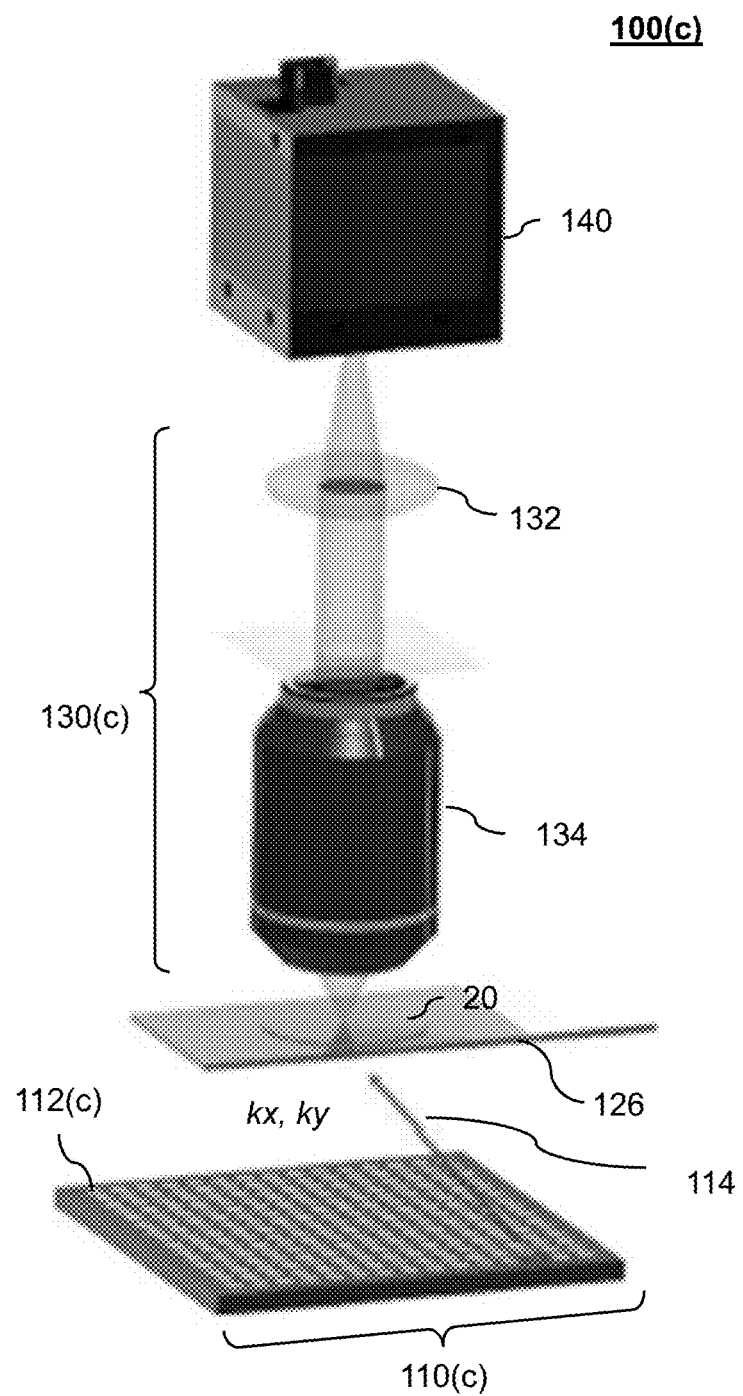
FIG. 4 depicts an orthogonal view of components of an ultra-high NA variable-illumination Fourier ptychographic imaging device with a rectangular array variable illuminator.

In cases having a variable illuminator comprising a plurality of light elements, the light elements may be in various arrangements such as a line grid, a rectangular grid, one or more concentric circles (rings), a hexagonal grid, curvilinear grid, or other suitable arrangement capable of providing the illumination from the plurality of incidence angles. An example of a circular variable illuminator 110(b) having light elements in the form a single ring is shown in FIG. 3A. An example of rectangular array variable illuminator 110(c) in the form of a rectilinear grid of light elements is shown in FIG. 4. Some examples of light elements are a pixel of a liquid crystal display (LCD) or a light emitting diode (LED). The arrangement of light elements may be configured with a spacing between adjacent elements and at particular locations that when activated can provide illumination at a plurality of incidence angles that correspond to overlapping regions in Fourier space, in some cases, with an overlap of a certain amount.

In cases with multiple light elements, the light elements locations may be represented by a one-dimensional or two-dimensional array (e.g., 1×9 array, 3×6 array, 10×10 array, 15×15 array, 32×32 array, 100×100 array, 50×10 array, 20×60 array, or other array with two dimensions). In some cases, such a two-dimensional array has dimensions n×m with light element locations $k_{i,j}$ (r, θ) or $X_{i,j}$ (x, y), i=1 to n, j=1 to m where the number of locations, where N=n×m.

In certain aspects, the variable illuminator comprises discrete light elements that are illuminated at different acquisition times in an order, for example, according to illumination instructions. For example, the order may define the illumination times of individual light elements or groups of light elements in a two-dimensional array of discrete light elements. In one example where the two-dimensional matrix of light elements is a rectangular array, a central light element may be determined. The illumination instructions may instruct to illuminate the central light element first, then illuminate the 8 light elements surrounding the central light element going counterclockwise, then illuminate the 16 light elements surrounding the previous light elements going counterclockwise, and so on until the variable illuminator has provided illumination from the plurality of N incidence angles ($\theta x_{i,j}$, $\theta y_{i,j}$), i=1 to N. In another example where the two-dimensional matrix of light elements is a polar matrix such as one or more concentric rings, the illumination instructions may instruct to illuminate the light elements at smallest radius first (e.g., in clockwise, counterclockwise, or random order), then illuminate any light element at a larger radius, and so on until all the variable illuminator has provided illumination from the plurality of N incidence angles ($\theta x_{i,j}$, $\theta_{i,j}$), i=1 to N. In another example where the two-dimensional array of light elements is a rectangular or a polar array, a light element closest to the specimen may be determined. The illumination instructions may instruct to illuminate the light element closest to the specimen, and then illuminate the light element next closest to the specimen, and then illuminate the light element next closest, and so on until the N light elements have been illuminated from the plurality of N incidence angles. In another example, the light elements may be illuminated in a random order. In another example, a sequential column by column order may be followed such as, for example, $(X_1, Y_1)$, $(X_1, Y_2)$, $(X_1, Y_3)$, ... $(X_1, Y_n)$, $(X_2, Y_1)$, $(X_1, Y_2)$, $(X_1, Y_3)$, ... $(X_2, Y_n)$, ... $(X_m, Y_n)$. Alternatively, a row by row order may be followed.

In certain aspects, a variable illuminator of certain systems described herein may provide in an epi-illumination mode and/or in a trans-illumination mode. To be able to function in the epi-illumination mode, the variable illuminator is typically located on the same side of the sample as the collecting optical element of the optical system. To be able to function in the trans-illumination mode, the variable illuminator is typically located on the opposite side of the sample as the collecting optical element of the optical system.

A sample being imaged by the variable-illumination Fourier ptychographic imaging systems described herein can be comprised of one or more objects and/or one or more portions of an object. Each object may be, for example, a biological entity, an inorganic entity, etc. Some examples of biological entities that can be imaged include whole cells, cell components, microorganisms such as bacteria or viruses, and cell components such as proteins. An example of an inorganic entity that can be imaged is a semiconductor wafer. In certain aspects, a thick and/or non-transparent sample can be imaged by certain Fourier ptychographic imaging systems described herein. The sample may be provided in a medium such as a liquid.

In luminescence imaging examples, a reagent (e.g., fluorescence/phosphorescence dye) may be mixed with the sample to mark or tag portions under investigation with fluorophore. A fluorophore can refer to a component of a molecule that causes the molecule to fluoresce or phosphoresce. A fluorophore can absorb energy from excitation light of a specific wavelength(s) and re-emit the energy at a different wavelength(s). In luminescence imaging examples, the illumination source may illuminate the sample with excitation light of predetermined wavelength(s) (e.g., blue light) to activate the fluorophore in the sample. In response, the fluorophore release emissions of a different wavelength(s) (e.g., red light).

The optical system 130 comprises one or more other components such as, for example, lens(es), beam splitter(s), objective(s), tube lens(es), wavelength filter(s), aperture element(s) (e.g., objective, physical iris, etc.), and other like elements. In luminescence imaging example, the optical system 130 may include, for example, a filter (e.g., material that passes emissions and blocks excitation light) between the collection optics and the radiation detector to filter out excitation light and pass emissions. The optical system 130 may include, for example, certain microscope optical components or camera optical components. Generally, the optical system 130 comprises a collection optical element or first optical element that collects light issuing from the sample 20. The optical system 130 also comprises a filtering optical element for filtering light issuing from the sample. The filtering optical element may be the collection optical element. In certain cases, the filtering optical element may be a lens (e.g., an objective lens). In certain ultra-high NA examples, the high NA of the lens may be about 0.50. In other ultra-high NA examples, the high NA of the lens may be in the range of about 0.50 to about 0.75. In another ultra-high NA example, the high NA of the lens may be about 0.60.

In certain variable-illumination Fourier ptychographic imaging systems described herein, the radiation detector (e.g., radiation detector 140 in FIG. 1) is configured to acquire a plurality of intensity images of a sample by measuring/recording an intensity distribution of incident radiation at a detector plane at a particular sample (acquisition) time. During an image measurement process, for example, the radiation detector may acquire a plurality of M intensity images at M sample times, $t_{q=1\ to\ M}$. If visible light radiation is being measured, the radiation detector may be in the form of a charge coupled device (CCD), a CMOS imaging sensor, an avalanche photo-diode (APD) array, a photo-diode (PD) array, a photomultiplier tube (PMT) array, or like device. If using THz radiation, the radiation detector may be, for example, an imaging bolometer. If using microwave radiation, the radiation detector may be, for example, an antenna. If X-ray radiation is used, the radiation detector may be, for example, an x-ray sensitive CCD. If acoustic radiation is used, the radiation detector may be, for example, a piezoelectric transducer array. These examples of radiation detectors and others are commercially available. In some cases, the radiation detector may be a color detector e.g. an RGB detector. In other cases, the radiation detector need not be a color detector. In certain cases, the radiation detector may be a monochromatic detector.

In certain aspects, a variable-illumination Fourier ptychographic imaging system comprises a variable illuminator configured to illuminate the sample from a plurality of N illumination incidence angles and radiation detector configured to capture a plurality of M intensity images based on different incidence angles of the plurality of N incidence angles. In certain cases, N=M (i.e. an intensity image is acquired for each illumination angle).

In certain aspects, the radiation detector may have discrete elements (e.g., pixels). The discrete detecting elements may be of any suitable size (e.g., 1-10 microns) and any suitable shape (e.g., circular, rectangular, square, etc.). For example, a CMOS or CCD element may be 1-10 microns and an APD or PMT light detecting element may be as large as 1-4 mm. In one example, the radiation detecting element is a square pixel having a size of 5.5 um.

A sample time or acquisition time can refer to a time that the radiation detector 130 captures an intensity image of the sample. During certain image measurement processes described here, the radiation detector captures a plurality of M intensity images (e.g., M=1, 2, 5, 10, 20, 30, 50, 100, 1000, 10000, etc.). At each sample time, $t_q$ that an intensity image is captured, light is being provided to the sample at a different incidence angle of the plurality of N incidence angles. In certain cases, the sampling rates may range from 0.1 to 1000 frames per second.

Fourier space may refer to a mathematical space spanned by wave vectors kx and ky being the coordinate space in which the two-dimensional Fourier transforms of the spatial images created by the aperture-scanning Fourier ptychographic imaging system reside. Fourier space may also refer to the mathematical space spanned by wavevectors kx and ky in which the two-dimensional Fourier transforms of the spatial images collected by the radiation sensor reside.

During the measurement process, the radiation detector 130 captures image data comprising the plurality of M intensity images. The radiation detector 130 may also generate other image data such as the sample times and other related sample data. Each of the plurality of M intensity images captured by the radiation detector is associated with a region in Fourier space. In Fourier space, neighboring regions may share an overlapping area over which they sample the same Fourier domain data. This overlapping area in Fourier space corresponds to the overlapping area of neighboring incidence angles of the illumination provided by the variable illuminator. In certain aspects, the variable illuminator is configured to provide illumination at a plurality of incidence angles that are spaced to provide a certain amount of overlapping area in the Fourier domain data. In one case, the variable illuminator is configured to provide illumination at a plurality of incidence angles to generate an overlapping area in the Fourier domain data in the range of about 2% to about 99.5% of the area of one of the regions. In another case, the overlapping area between neighboring regions may have an area that is in the range of about 65% to about 75% the area of one of the regions. In another case, the overlapping area between neighboring regions may have an area that is about 65% of the area of one of the regions. In another case, the overlapping area between neighboring regions may have an area that is about 70% of the area of one of the regions. In another case, the overlapping area between neighboring regions may have an area that is about 75% of the area of one of the regions.

Based on the geometry of the system 10, the variable illuminator may be configured to generate illumination from the incidence angles that provide a certain amount of overlap area between overlapping regions in Fourier space. For example, the distance between light elements may be of a certain spacing (e.g., 1 mm, 0.5 mm, etc.). In FIG. 10B, the spacing between light elements is 4 mm.

Certain variable illumination Fourier ptychographic imaging systems described herein can be used for luminescence (e.g., fluorescence, phosphorescence, chemluminescence, bioluminescence, etc.) imaging. For example, certain systems may be adapted to collect emissions directed back toward the illumination source. In fluorescence imaging and other luminescence imaging applications, fluorophores in the sample are excited by excitation illumination of a certain wavelength(s) from the illumination source and emit light of a different wavelength(s) (emissions). These emissions tend to have a weak signal compared to the excitation light so that collection efficiency may be important. Certain systems may be configured to provide epi-illumination so that the radiation detector can receive emissions from the sample and/or light reflected from the sample back toward the illumination source. These systems have optical arrangements that can accommodate an illumination source that directs excitation illumination to the sample and away from next element in the system. In this way, propagation of the excitation illumination through the system may be substantially avoided.

Ultra-High NA Configurations

FIG. 3A depicts an illustration of an orthogonal view of components of a variable-illumination Fourier ptychographic imaging device 100(b), according to certain embodiments. The variable-illumination Fourier ptychographic imaging device 100(b) is an example of an ultra-high NA configuration of the variable-illumination Fourier ptychographic imaging device of the system 10 described with respect to FIG. 1.

In FIG. 3A, the variable-illumination Fourier ptychographic imaging device 100(b) comprises a circular variable illuminator 110(b), an optical system 130(b) having an objective 134 (e.g., microscope objective) and a tube lens 132, and a radiation detector 140(b). In this illustration, the objective 134 is the collection (first) optical element of the optical system 130. The objective 132 has a relatively high NA (e.g., in the range of about 0.60 to about 0.75). A sample 20 is shown on a specimen surface 126 as provided to the variable-illumination Fourier ptychographic imaging device 100(b).

In FIG. 3A, the variable-illumination Fourier ptychographic imaging device 100(b) comprises a circular variable illuminator 110(b) having nine (9) discrete light elements 112(b) arranged in a single ring. In other cases, the circular variable illuminator 110(b) may be in the form of a multiple concentric rings, or in other arrangements. In the illustrated example, the angular spacing between adjacent light elements 112(b) is 40 degrees and the diameter of the ring is 40 mm. In other cases, the angular spacing between adjacent light elements (e.g., LEDs) may be about 2 degrees. In other cases, the angular spacing between adjacent light elements (e.g., LEDs) may be in a range of between about 2 degrees to 40 degrees. In other cases, the diameter of the ring(s) may be in the range of about 20 mm to 40 mm.

In certain aspects, a variable-illumination Fourier ptychographic imaging system may include a circular variable illuminator with light elements arranged in one or more concentric rings (e.g. 1, 2, 3, etc.). In FIG. 3A, for example, the circular variable illuminator 110(b) comprises light elements in the form of a single ring. The diameters of multi-ring arrangements may be in the range of about 10 mm to about 60 mm. In many cases, the light elements in each ring are equi-spaced (separated by a uniform angular difference between adjacent light elements), however, other spacings may be used. In many cases, each ring will have a different number of light elements. In other cases, each ring will have the same number of light elements.

Using a circular variable illuminator with light elements arranged in one or more concentric circles e.g., those with equi-spaced light elements, can help improve uniformity of overlapping information. This uniformity may result in improved image quality as compared with images from systems that use variable illuminators with light elements in other arrangements. For example, in cases where the rectangular array variable illuminator has a rectangular grid arrangement of elements, the expanded region in Fourier space may not be as uniform in the radial direction. An example of an expanded region in Fourier domain from a rectangular grid arrangement of light elements is shown in FIG. 10D. As you can see from the illustrations in FIGS. 3B and 3C associated with the system using light elements arranged in concentric rings, the expanded region 280 in Fourier domain is substantially circular so that the information in the higher frequencies associated with moving out radially will be substantially uniform. In comparison, the expanded region in FIG. 10D associated with a rectangular arrangement of light elements is substantially rectangular so that the information at the higher frequencies will not be as uniform.

In FIG. 3A, each light element 112(b) is illustrated as an LED, although other types of light elements can be used. In this example, each light element 112(b) has a radiation source when illuminated. As denoted by the dotted line, each light element 112(b) sequentially and individually lights up to provide illumination 114 with a wavevector of (kx, ky). In this case, the sample 20 can be illuminated from 9 different incidence angles by illumination provided by the each of the 9 light element 112(b). In one example operation, the sample 20 is illuminated from 9 different incidence angles at different acquisition times, the optical system 130(b) collects light issuing from the illuminated sample 20, the objective lens 134 filters light issuing from the sample based on its acceptance angle, the tube lens focuses the filtered light to the radiation detector 140(b), and the radiation detector 140(b) captures nine (9) intensity images at the acquisition times.

In FIG. 3A, the circular variable illuminator 110(b) is located to provide illumination 114 in a trans-illumination mode i.e. illumination 114 is directed through the sample 20. In another case, the variable illuminator 110(b) may be located to provide illumination in an epi-illumination mode, e.g., located on the same side of the sample 20 as the objective lens 134.

In certain aspects, illumination from a variable illuminator at an incidence angle approximates plane wave illumination. Illumination by an oblique plane wave with a wavevector (kx, ky) is generally equivalent to shifting the center of the sample's spectrum by (kx, ky) in the Fourier domain. Here, $kx=k_0 \cdot \cos x$ (cosine of angle between illumination wavevector and x-axis); $ky=k_0 \cdot \cos y$ (cosine of angle between illumination wavevector and $$k_0 = \frac{2\pi}{\lambda}.$$

The pupil function (i.e. coherent optical transfer function) of the filtering optical element (e.g., objective lens 134 in FIG. 3A) in Fourier space can be described as a circular shape low-pass filter with a radius of $NA_{obj} \cdot k_0$ which is $$NA * \frac{2\pi}{\lambda}$$

in this case, where $NA_{obj}$ is of the filtering optical element. Thus, each intensity image acquired by the radiation detector based on the approximated plane wave illumination with wavevector (kx, ky) from the variable illuminator contains sample's spectrum information centered at about (kx, ky) in the Fourier domain. With illumination having a wavevector of (kx ky) or ($k_0 \cdot \cos x$, $k_0 \cdot \cos y$), the image captured by the system contains spatial frequency information as high as $k_0 \cdot [NA_{obj} + \sqrt{(\cos^2 x + \cos^2 y)}]$, where $\sqrt{(\cos^2 x + \cos^2 y)} = NA_{ill}$ is the numerical aperture of the illumination. The synthesized NA of the system can be described as $NA_{syn} = NA_{obj} + NA_{ill}$.

To exceed unity $NA_{sys}$ in a variable-illumination Fourier ptychographic imaging system, components are configured such that the $NA_{obj} + NA_{ill}$ sums up to greater than 1. For example, by using the ultra-high NA configuration shown in FIG. 3A with a circular variable illuminator having a circular ring of 9 light elements (e.g., LEDs), the $NA_{ill}=0.70$ and with an filtering optical element in the form of an objective lens having $NA_{obj}=0.75$ (e.g., 40×, 0.75 NA microscope objective lens), the resulting dry objective system has a $NA_{syn}=1.45$ while retaining the field-of-view, and working distance of the objective lens. As another example, by using the using the ultra-high NA configuration shown in FIG. 3A with an oil immersion setup having a 100×1.4 NA objective for image acquisition and another 100×1.4NA for illumination (by imaging the light elements at the back focal plane of the objective which could form collimated illumination with $NA_{ill}=1.4$), the $NA_{sys}$ could be as high as 2.8.

In some aspects, an iterative recovery process can be used to stitch the information at each of these regions associated with the plurality of incidence angles to expand the information in the Fourier domain to capture higher frequency information at the outer regions and to capture uniformly overlapping and wider regions of information, which can result in higher resolution images of the sample. This expansion of the intrinsic $NA_{obj}$ of the filtering optical element may generate an expanded synthetic NA of the system.

Figure 3B:
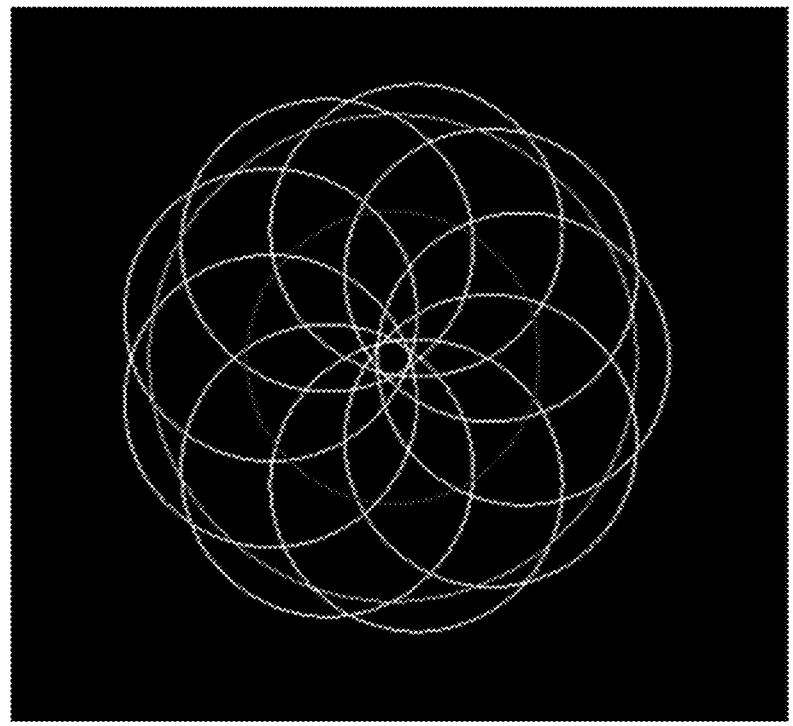
FIGS. 3B and 3C depict an expansion in the Fourier domain for the ultra-high NA configuration shown in FIG. 3A.
Figure 3C:
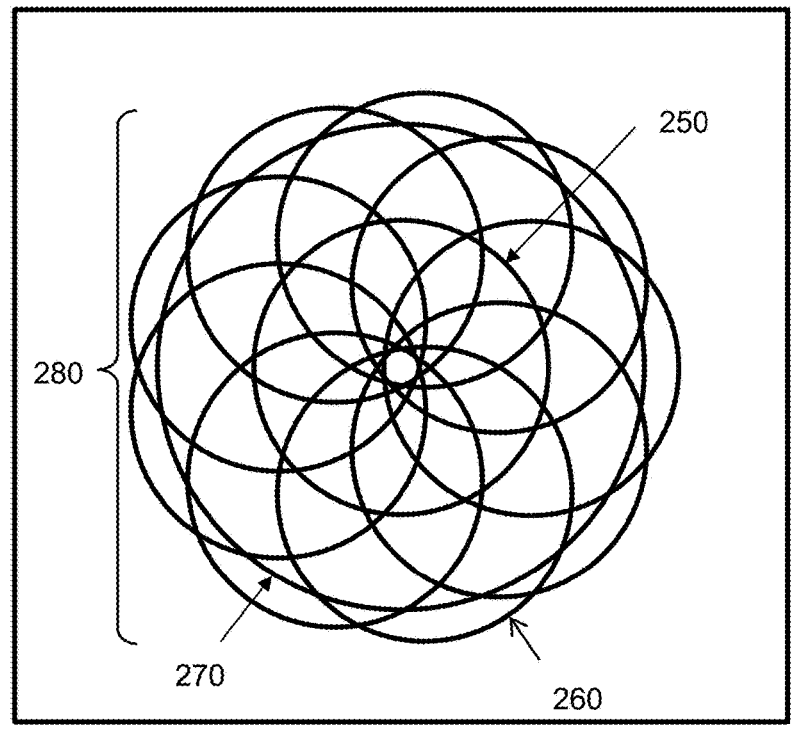

In certain ultra-high NA variable-illumination Fourier ptychographic imaging systems described herein, the filtering optical element has a relatively high NA in order to capture higher frequency information for each incidence angles, which corresponds to a wider circular region for each incidence angle in the Fourier domain, which can result in an image having a better resolution than about 400 nm. For example, a variable-illumination Fourier ptychographic imaging system with the variable-illumination Fourier ptychographic imaging device 110(b) shown in FIG. 3A is a ultra-high NA configuration. In this example, the objective lens 134 has a relatively high NA, for example, in a range of about 0.6 to about 0.75. In addition, the variable illuminator 110(b) has nine (9) light elements (e.g., LEDs) in s ring. FIG. 3B is an illustration depicting the expansion in the Fourier domain for this ultra-high NA configuration shown in FIG. 3A, of an embodiment. FIG. 3C is a the illustration of FIG. 3B shown on a white background for clarification of certain details.

Certain variable-illumination Fourier ptychographic imaging systems described herein use angularly varying illumination to acquire high frequency information about the sample. In certain cases, such as with a system having the ultra-high NA configuration shown in FIG. 3A, the system acquires higher frequency information by using a higher NA filtering optical element and/or by increasing the range of incidence angles used by the variable illuminator. Using an iterative recovery process (e.g. iterative phase retrieval process), the high frequency information about the sample can be "stitched" together in the Fourier domain, such as shown in FIGS. 3B-3C and 3D-3E, which means that an expanded synthesized NA and finer resolution has been generated in the space domain.

In FIGS. 3B and 3C, the center circular region 250 represents the range of information that can be captured by the objective lens 134 (e.g., NA=0.60). Each of the nine (9) overlapping circular regions 260 represents the range of information captured by the same objective lens 134 at oblique angle illumination. Each overlapping circular region 260 corresponds to one of the nine (9) different incidence angles. The circular region 280 shows the range of information captured by the objective 134 at the (9) different incidence angles. For reference, a circular region 270 is illustrated to show the range of information captured by a unity NA objective. As shown, the circular region 280 of the range of information captured by the objective 134 at the (9) different incidence angles is larger than the circle 270 of the unity NA objective i.e. the NA of the configuration shown in FIG. 3B is greater than 1.0. That is, by overlapping circular regions in Fourier space, the combined region can form an NA of more than 1.0. In configurations where the intrinsic NA of the objective 134 may be lower than 0.6, more LEDs can be arranged (either circularly or in a square array) to provide enough illumination angle, such that the area inside NA=1.0 can be fully occupied in the Fourier domain. An example of such a configuration is described with reference to FIGS. 3D and 3E.

With oil immersion technology, a conventional microscope can achieve a maximum NA of 1.0. Using a variable-illumination Fourier ptychographic imaging system in a ultra-high NA configuration, such as with the variable-illumination Fourier ptychographic imaging device 100(b) shown in FIG. 3A, the NA of the filtering optical element is relative high and the resulting expanded NA of the system has been shown to exceed 1.0.

Figure 3D:
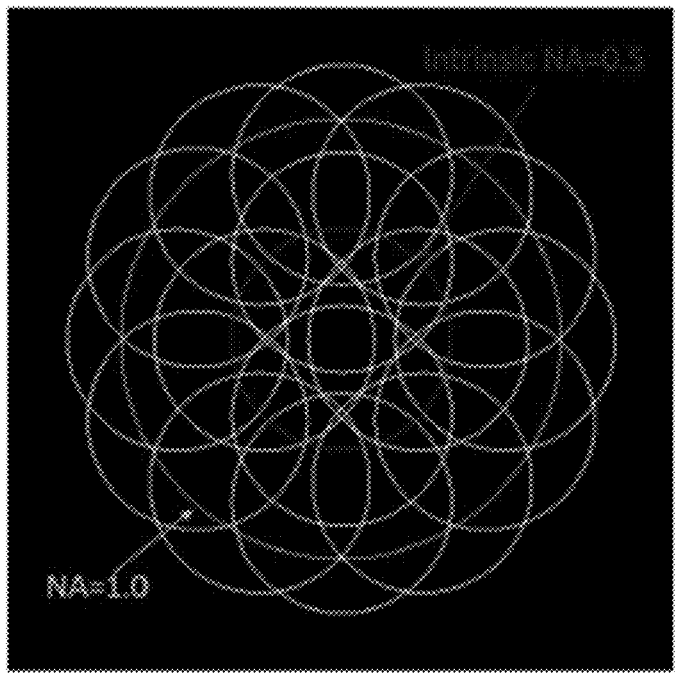
FIGS. 3D and 3E depict an expansion in the Fourier domain for an ultra-high NA configuration shown in FIG. 3A modified with a circular variable illuminator having two concentric rings.
Figure 3E:
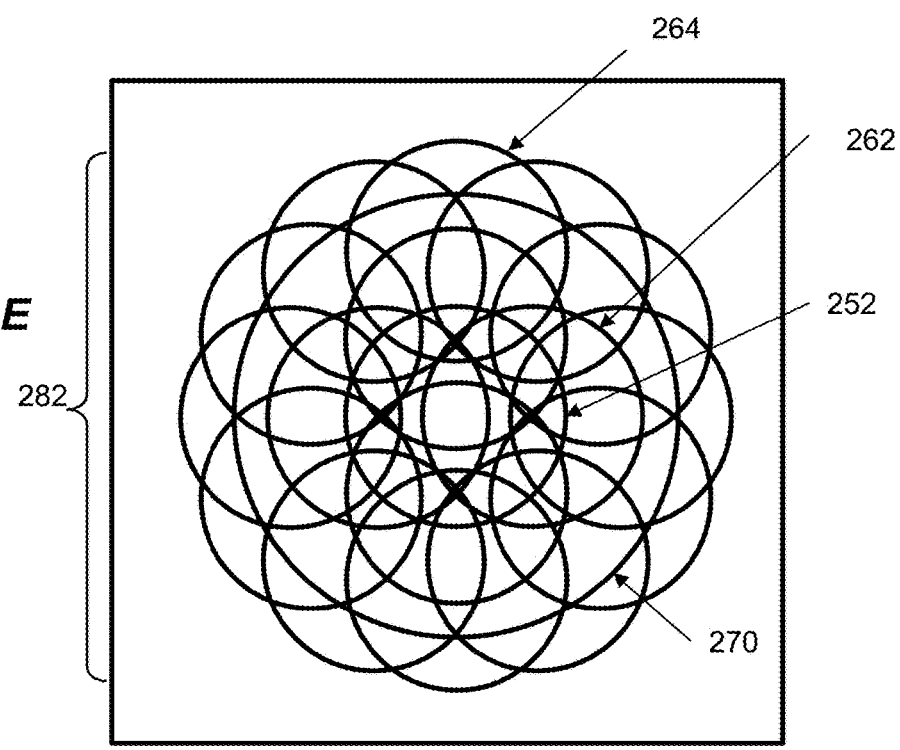

FIG. 3D is an illustration depicting the expansion in the Fourier domain for an ultra-high NA configuration similar to the one shown in FIG. 3A, but with a variable illuminator 110(b) having two concentric circles (rings) of light elements (four elements on an inner ring and 12 light elements on an outer ring) and with an objective having an NA of 0.50, according to an embodiment. The inner ring has four (4) light elements and the outer ring has twelve (12) light elements. FIG. 3E is the illustration of FIG. 3D shown on a white background for clarification of certain details.

In FIGS. 3D and 3E, the center circular region 252 represents the range of information that can be captured by an objective lens having NA=0.50. The four (4) overlapping circular regions 262 (corresponding to the inner ring of the variable illuminator) represent the range of information captured by the objective lens with NA=0.50 at oblique angle illumination at four corresponding incidence angles. Each overlapping circular region 262 corresponds to one of the four (4) different incidence angles. The twelve (12) overlapping circular regions 264 (corresponding to the outer ring of the variable illuminator) represent the range of information captured by the objective lens with NA=0.50 at oblique angle illumination at 12 corresponding incidence angles. Each overlapping circular region 264 corresponds to one of twelve (12) different incidence angles.

The circular region 282 shows the expanded range of information captured by the objective 134 having an NA of 0.50 at 16 different incidence angles. For reference, a circular region 270 is illustrated to show the range of information captured by a unity NA objective. As shown, the circular region 282 of the expanded range of information captured by the objective at the sixteen (16) different incidence angles is larger than the circle 270 of the unity NA objective.

FIG. 4 depicts an illustration of an orthogonal view of components of a variable-illumination Fourier ptychographic imaging device 100(c), according to certain embodiments. The variable-illumination Fourier ptychographic imaging device 100(c) is an example of an ultra-high NA configuration of the variable-illumination Fourier ptychographic imaging device of the system 10 described with respect to FIG. 1.

In FIG. 4, the variable-illumination Fourier ptychographic imaging device 100(c) comprises a rectangular array variable illuminator 110(c), an optical system 130(c) having an objective 134 (e.g., microscope objective) and a tube lens 132, and a radiation detector 140(c). In this illustration, the objective 134 is the collection (first) optical element of the optical system 130. The objective 132 has a relatively high NA (e.g., in the range of about 0.50 to about 0.75). A sample 20 is shown on a specimen surface 126 as provided to the variable-illumination Fourier ptychographic imaging device 100(c).

In FIG. 4, the rectangular array variable illuminator 110(c) is located to provide illumination 114 in a trans-illumination mode i.e. illumination 114 is directed through the sample 20. In another case, the variable illuminator 110(c) may be located to provide illumination in an epi-illumination mode, e.g., located on the same side of the sample 20 as the objective lens 134.

In FIG. 4, the variable-illumination Fourier ptychographic imaging device 100(c) comprises a variable illuminator 110(c) having light elements 112(c) in a rectangular grid arrangement with 225 equi-spaced light elements that corresponds to a 15×15 square array. Other numbers and arrangements of light elements can be used. In the illustrated example, the spacing between adjacent light elements 112(c) is in a range of about 2 degrees to about 40 degrees.

In FIG. 4, each light element 112(c) is illustrated as an LED, although other types of light elements can be used. In this example, each light element 112(c) has a radiation source when illuminated. During operation, each light element 112(c) sequentially and individually lights up to provide illumination 114 with a wavevector of (kx, ky). In this case, the sample 20 can be illuminated from 225 different incidence angles by illumination provided by the each of the 225 light element 112(c). In one example operation, the sample 20 is illuminated from 225 different incidence angles at 225 different acquisition times, the optical system 130(c) collects light issuing from the illuminated sample 20, the objective lens 134 filters light issuing from the sample based on its acceptance angle, the tube lens focuses the filtered light to the radiation detector 140(c), and the radiation detector 140(c) captures 225 intensity images at the 225 acquisition times.

FIGS. 5, 6, and 7A-7B depict schematic diagrams of side views of components of reflection-mode configurations (configurations in epi-illumination mode) of the variable-illumination Fourier ptychographic imaging device of the system 10 described with respect to FIG. 1. Each of the variable-illumination Fourier ptychographic imaging devices shown in FIGS. 5, 6, and 7A-7B is configured to locate a variable illuminator on the same plane (e.g., FIG. 5) or behind the plane (e.g. FIGS. 6 and 7A-B) of the imaging optics. These illustrated devices are shown in epi-illumination mode. Some primary applications for systems with such devices in epi-illumination mode include metal or semiconductor surface inspection, including semiconductor wafer, chip, and/or electronic circuit board inspection, among others. Secondary applications may extend to include any scenario in which the variable-illumination Fourier ptychographic imaging system 10 of FIG. 1 can be applied with epi-illumination such as with hand-held cameras with a modified flash system, or satellite imagery. The examples shown in FIGS. 5, 6, and 7A-7B can include components configured for an ultra-high NA system. For example, the NA of the objective lens in FIGS. 7A-7B can have an NA of about 0.50.

Figure 5:
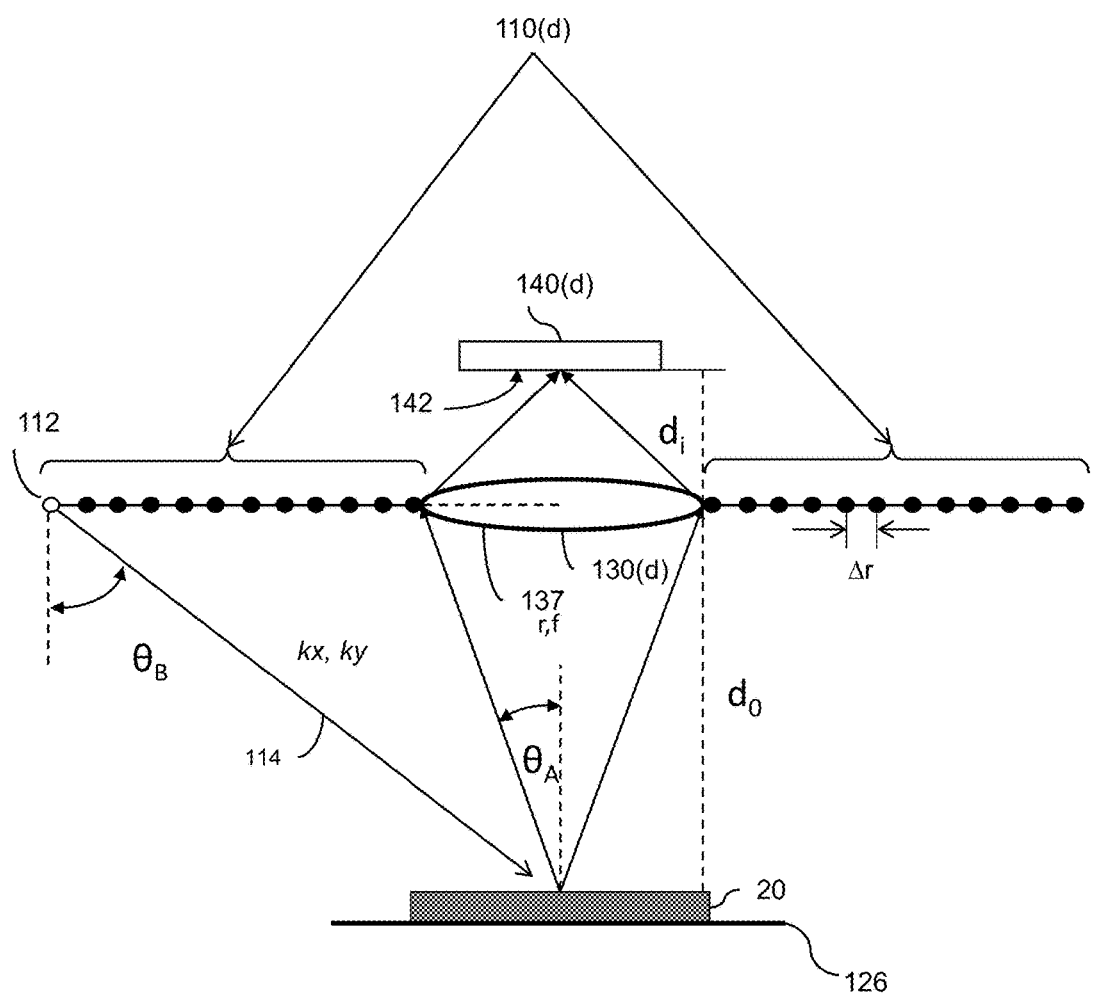
FIG. 5 depicts an orthogonal view of components of a variable-illumination Fourier ptychographic imaging device in epi-illumination mode.

FIG. 5 depicts an illustration of an orthogonal view of components of a variable-illumination Fourier ptychographic imaging device 100(d), according to certain embodiments. The variable-illumination Fourier ptychographic imaging device 100(d) comprises a circular variable illuminator 110(d), an optical system 130(d) comprising a filtering optical element in the form of an imaging lens 137, and a radiation detector 140(d) having a detector plane 142. A sample 20 is shown on a specimen surface 126 as provided to the variable-illumination Fourier ptychographic imaging device 100(d).

In FIG. 5, the imaging lens 137 has a focal length f, a radius r, and an acceptance angle $2\theta_A$. The imaging lens 137 may have an NA in the range of about 0.60 to about 0.75. In the illustrated example, the imaging lens 137 may be similar to a large camera lens so that the working distance $d_o$ is large such as, for example, about 10-20 cm. In other examples, a smaller lens may be uses, such as a microscope lens, in which case the working distance $d_o$ would be smaller such as, for example, 2-3 cm.

In FIG. 5, the cicular array variable illuminator 110(d) comprises light elements 112 (e.g., LEDs) arranged in 12 concentric rings (e.g., circular LED rings) equally spaced between each ring and centered around a central axis and around the imaging lens 137. Other numbers concentric rings may be used in other cases such as 1, 2, 3, 4, 5, 6, etc. In this illustrated example, the light elements 112 are located at the sample plane of the imaging lens 137. In other cases, the light elements 112 may be at an offset plane, but remain on the same side of the sample 20 as the imaging lens 137 in order to provide illumination in a epi-illumination mode. In the illustrated example, the rings are equi-spaced from each other with a radial spacing defined as $\Delta r$. In this illustrated example, the variable-illumination Fourier ptychographic imaging device 100(d) has a variable illuminator 110(d) that is located at a distance, equal to the working distance $d_o$, above the sample 20 to provide epi-illumination mode.

In FIG. 5, the resolution variable-illumination Fourier ptychographic imaging device 100(d) is shown at a single illumination time and/or acquisition time. At this time, a single light element 112 of the variable illuminator 110(d) is activated to provide illumination 114 at an incidence angle of $\theta_B$ with a wavevector of (kx,ky). At other times, the other light elements 112 may be providing illumination. In an example operation of a system comprising the variable illuminator of the variable-illumination Fourier ptychographic imaging device 100(d), the variable illuminator 110(d) generates illumination 114 to the sample 20 at a plurality of N incidence angles. The imaging lens 137 receives light from the sample 20 within its acceptance angle to filter the light. The optical system 130 propagates the filtered light to the radiation detector 140(d), which measures an intensity distribution to capture an intensity image at different incidence angles.

The illustrated example also includes a distance $d_i$ between the imaging lens 137 and the radiation detector 140(d) and a working distance $d_o$ between the imaging lens 137 and the sample 20. In one example, the Fourier ptychographic imaging device 100(d) may have the following relative dimensions: f=5 cm; $d_i$ 7.02 cm; $d_o$=17.3 cm; r=0.25 cm; $\theta_B$=30 degrees; and $\theta_A$=3 degrees.

The variable-illumination Fourier ptychographic imaging device 100(d) of FIG. 5 includes a variable illuminator 110(d) that does not have light elements at the center where the the imaging lens 137 is located. Without light elements at the center, the images generated by the device 110(d) with this illuminator 110(d) will not include low spatial frequencies. In some applications, such as characterization of slowly-varying phase objects, or when accurate knowledge of the reflectance from the entire object surface is required, this low spatial frequency information may be valuable. The configuration shown in FIG. 5 has a large working distance and a simple design with few components. Since the configuration does not collect information at low spatial frequencies, this configuration is ideally suited for imaging of high resolution features or defects, for example, in chip inspection applications.

Figure 6:
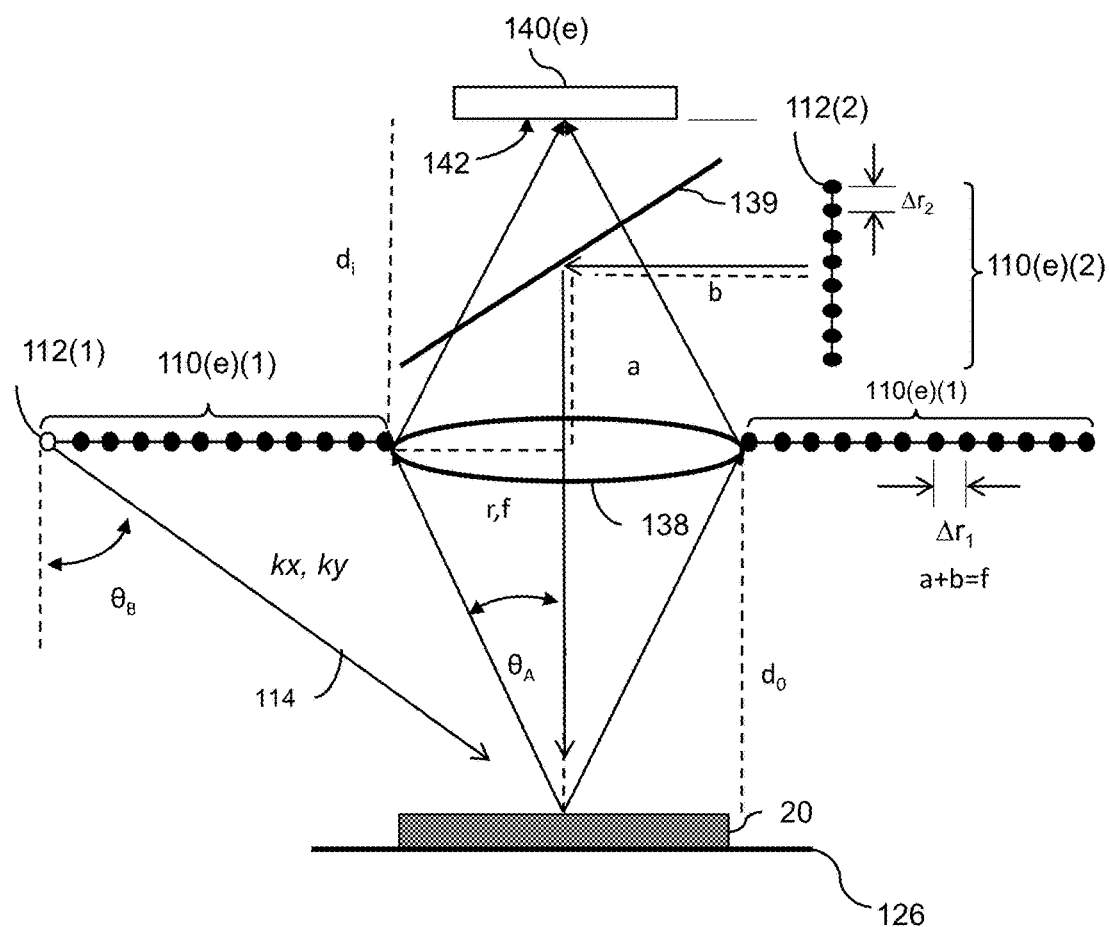
FIG. 6 depicts an orthogonal view of components of a variable-illumination Fourier ptychographic imaging device in epi-illumination mode.

FIG. 6 depicts an illustration of an orthogonal view of components of a variable-illumination Fourier ptychographic imaging device 100(e), according to certain embodiments. Certain components of the variable-illumination Fourier ptychographic imaging device 100(e) are similar to those of the variable-illumination Fourier ptychographic imaging device 100(d) shown in FIG. 5. In FIG. 6, the variable-illumination Fourier ptychographic imaging device 100(e) is configured to capture low spatial frequencies that may be omitted by the configuration shown in FIG. 5. This variable-illumination Fourier ptychographic imaging device 100(e) is configured to capture low spatial frequencies by comprising a beamsplitter 139 and a second smaller set of concentric rings 110(e)(2) of light elements 112(2) on the other side of the imaging lens 138 (imaging optics) so that the light elements 112(2) are directed toward the image plane of the imaging optics. The second set of light elements 112(2) are focused through the imaging optics to illuminate the sample with a plane wave at the sample plane. In certain cases, the configuration shown in FIG. 6 includes a larger aperture than the configuration shown in FIG. 5. The configuration shown in FIG. 6 may provide a large working distance.

In FIG. 6, the variable-illumination Fourier ptychographic imaging device 100(e) comprises a variable illuminator including a first set of concentric rings 110(e)(1) and a second set of concentric rings 110(e)(2), an optical system including comprises an imaging lens 138 and a beam splitter 139, and a radiation detector 140(e) having a detector plane 142. A sample 20 is shown on a specimen surface 126 as provided to the variable-illumination Fourier ptychographic imaging device 100(e). The illustrated example shows a working distance $d_o$ between the imaging lens 138 and the sample 20. The illustrated example also includes a distance $d_i$ between the imaging lens 138 and the radiation detector 140(e).

The beam-splitter 139 is configured to transmit half the illumination incident at a 45 degree angle to the beam-splitter 139 and not absorbed by the beam-splitter 139. The remaining half of the incident illumination (not absorbed) is reflected by the beam-splitter 139. For example, the the beam splitter 139 may be comprised of a sheet of glass or other substrate with a coating designed to control the light accordingly. As another example, a beam splitter may be a half-silvered mirror with a continuous thin coating of reflective material (e.g., metal). Another example is a swiss cheese beam splitter which has a discontinuous coating with holes to obtain the desired ratio of reflection to transmission.

The imaging lens 138 has a focal length f, a radius r, and an acceptance angle of $2\theta_A$. In the illustrated example, the imaging lens 138 is configured to filter light by accepting light within its acceptance angle, $2\theta_A$. An example of values that can be used in the illustrated configuration are: f=6 cm, r=1 cm, and $\theta_A$=5 degrees. Other focal lengths, radii, and acceptance angles can be used. To maintain a large lens-sample distance, the imaging lens 138 has a relatively low NA in the range of about 0.1 to about 0.3. In the illustrated example, the imaging lens 138 has an NA of about 0.16, which is a relatively low NA (e.g., about 0.08, about 0.09, about 0.10, in a range of between about 0.07 to about 0.20, etc.).

In the illustrated example, the imaging lens 138 may be, for example, a large camera lens having a focal length f of 6 cm and a radius r of 2 cm. If using a large camera lens, the variable-illumination Fourier ptychographic imaging device 100(e) will have a corresponding large working distance $d_o$ such as, for example, about 10-20 cm. In other examples, a smaller lens may be uses such as a microscope lens, in which case the working distance $d_o$ would be smaller such as, for example, 2-3 cm. In the illustrated example, $d_o$=12 cm and $d_i$=12 cm; other values may be used.

In FIG. 6, the optical path distance between the beam splitter 139 and the second set of concentric rings 110(e)(2) is designated as b and the optical path distance between the beam splitter 139 and the imaging lens 138 is designated as a. In the illustrated example, the optical system is configured so that the imaging lens 138 is located at a combined optical path distance of a+b=f from the second set of concentric rings 110(e)(2).

In FIG. 6, the variable illuminator of the variable-illumination Fourier ptychographic imaging device 100(e) comprises two sets of concentric rings (e.g., circular LED arrays) of light elements: a first set of twelve (12) equally-spaced concentric rings 110(e)(1) (e.g., a first LED array) and a second set of eight (8) equally-spaced concentric rings 110(e)(2) (e.g., a second LED array). Other numbers of concentric rings may be used in other cases such as 1, 2, 3, 4, 5, 6, etc. The first set of concentric rings 110(e)(1) comprises light elements 112(1) located at the plane of the imaging lens 138 and centered around the imaging lens 138. In other cases, the light elements 112(1) may be at one or more offset planes on the same side of the sample 20 as the imaging lens 138 to be configured for illumination in a epi-illumination mode. The first set of concentric rings 110(e)(1) are equally-spaced with a uniform radial spacing of $\Delta r_1$. The second set of concentric rings 110(e)(1) are equally-spaced with a uniform radial spacing of $\Delta r_2$. The first set of concentric rings 110(e)(1) are located at a distance, equal to the working distance $d_o$, above the sample 20.

In this illustrated example, the first set of concentric rings 110(e)(1) are centered around a central axis of the imaging lens 138 so that the the first set does not have light elements 112(1) across the center of the imaging lens 138. The second set of first set of concentric rings 110(e)(1) has light elements 112(2) configured to provide illumination reflected by the beam splitter 139 through the imaging lens 138. The second set of concentric rings 110(e)(2) comprises light elements 112(2) located at a plane that is at a combined optical path (a+b) of a focal length f from the imaging lens 138.

In FIG. 6, the variable-illumination Fourier ptychographic imaging device 100(e) is shown at a single illumination time and/or acquisition time. At this time, a single light element 112(1) from the from the first set of concentric rings 110(e)(1) is shown providing illumination 114 at an incidence angle of $\theta_B$ with a wavevector of (kx,ky). At other times, the other light elements 112(1) or 112(2) may be providing illumination. If one of the light elements 112(2) is illuminated, incident light is received by the beam splitter 139. Half the incident light received at the beam splitter 139 (and not absorbed) is reflected to the imaging lens 138 which propates illumination to the sample 20. Since the beam splitter 139 passes half the incident illumination, in certain aspects, each of the light elements 112(2) of the second set of concentric rings 110(e)(2) has a light source with about two (2) times (2×) the intensity of the light source of each of the light elements 112(1) of the first set of concentric rings 110(e)(1). In certain cases, the intensity from the light elements 112(2) may be adjusted to provide incident illumination at the sample 20 of about the same intensity as the incident illumination provided by the light elements 112(1).

In an example operation of a system comprising the variable illuminator of the variable-illumination Fourier ptychographic imaging device 100(e), the light elements 112(1) and 112(2) of the variable illuminator generate illumination directed to the sample at a plurality of N incidence angles. Light reflected by the sample 20 is received at the imaging lens 138. The imaging lens 138 receives light within its acceptance angle to filter the light. The imaging lens 138 propagates incident light to the beam splitter 138. Half the incident light from the imaging lens 138 is transmitted through the beam splitter 138 and propated to the radiation detector 140(e), which measures the intensity distribution at different acquisition times to captures a plurality of intensity images at different incidence angles.

Figure 7A:
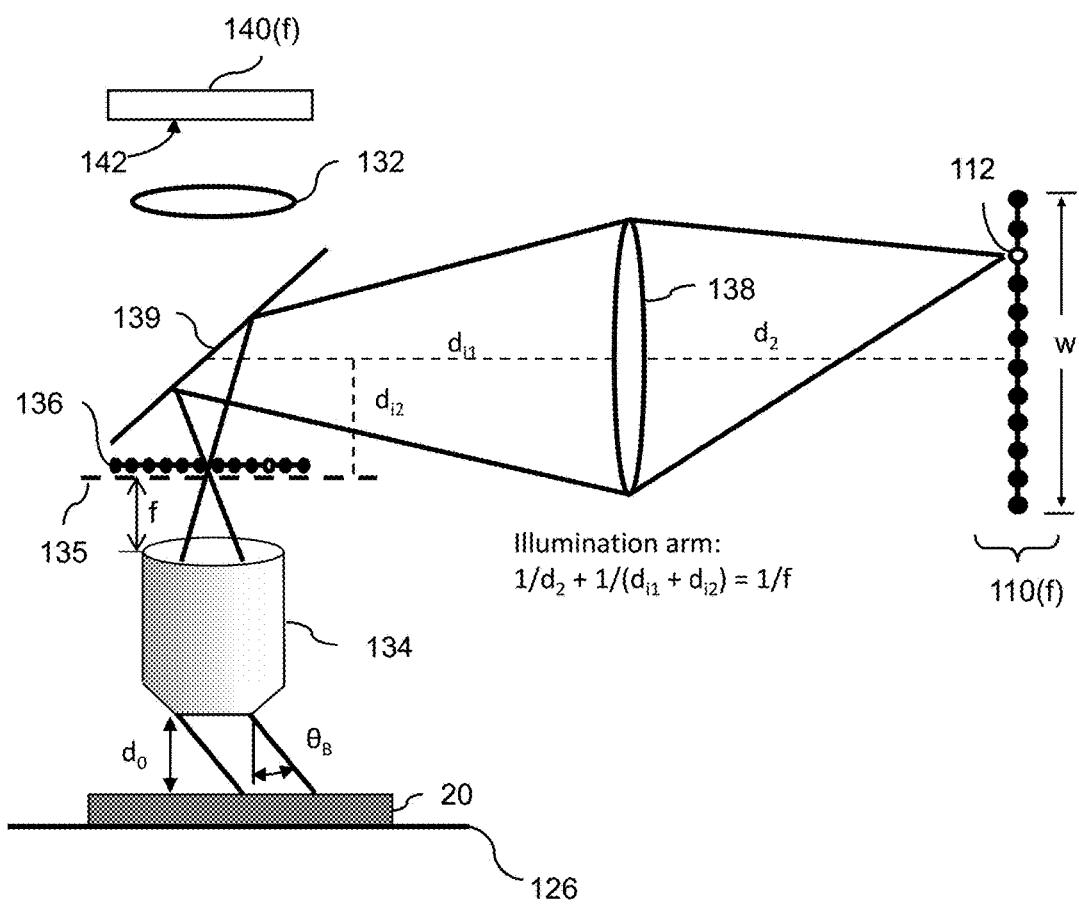
FIGS. 7A and 7B depict an orthogonal view of components of a variable-illumination Fourier ptychographic imaging device in epi-illumination mode.
Figure 7B:
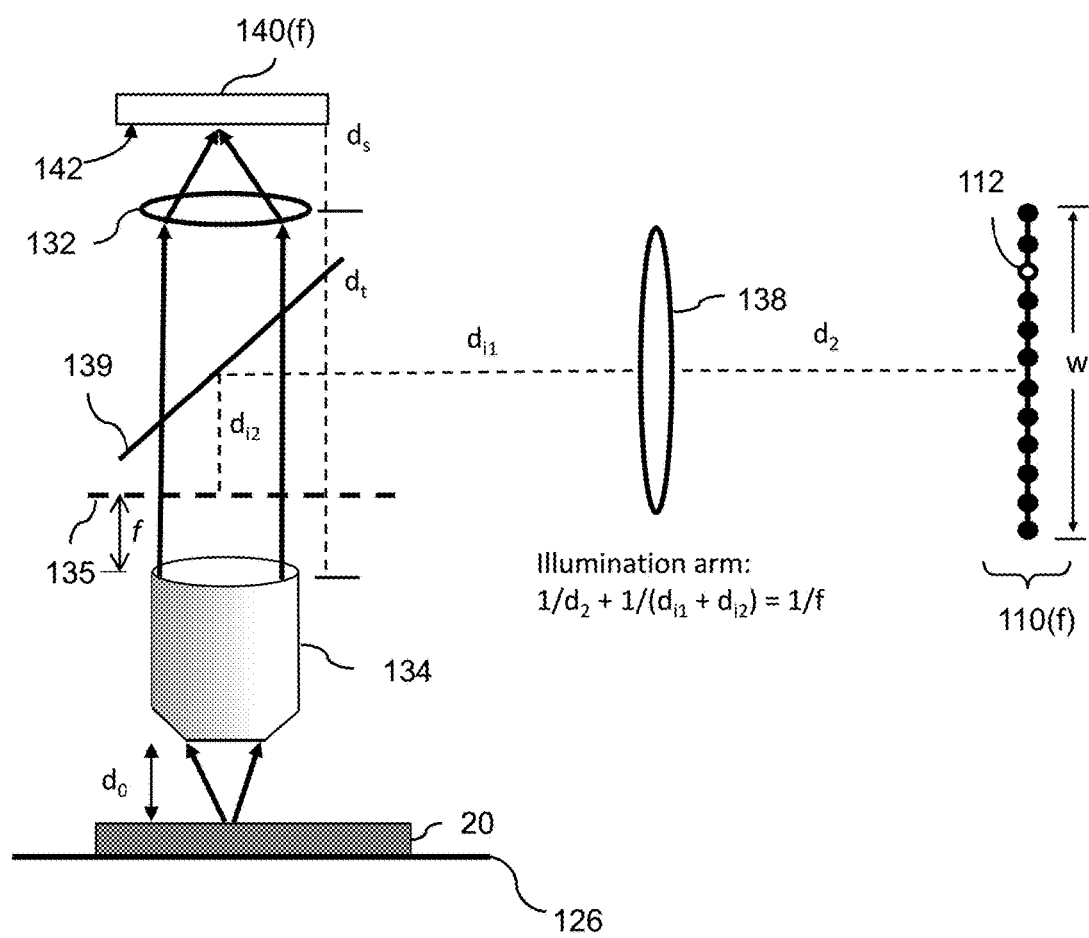

FIGS. 7A and 7B depict illustrations of orthogonal views of components of a variable-illumination Fourier ptychographic imaging device 100(f), according to certain embodiments. FIG. 7A illustrates the illumination scheme and FIG. 7B illustrates the collection scheme of the variable-illumination Fourier ptychographic imaging device 100(f). Certain components of the variable-illumination Fourier ptychographic imaging device 100(f) are similar to components of other variable-illumination Fourier ptychographic imaging devices of other illustrations.

In FIGS. 7A and 7B, the variable-illumination Fourier ptychographic imaging device 100(f) comprises a variable illuminator 110(f) comprises twelve (12) concentric rings 110(e)(1) of light elements 112, an optical system, and a radiation detector 140(e) having a detector plane 142. The variable illuminator 110(f) comprises twelve (12) concentric rings 110(e)(1) of light elements 112. Other numbers of concentric rings may be used such as, for example, 1, 2, 3, 4, 5, 6, 7, 8, 9, . . . 13, 14, 15, etc. The outermost concentric ring has a width w. The optical system comprises a objective 134 (e.g., microscope objective) with a focal length f, a tube lens 132, a secondary lens 138, and a beam splitter 139. Although the objective 134 is illustrated here as a microscope objective, another objective may be used. A sample 20 is shown on a specimen surface 126 as provided to the variable-illumination Fourier ptychographic imaging device 100(f). The illustrated example shows a working distance $d_o$ between the objective 134 and the sample 20. In the illustrated example, a microscope objective may be used so that the configuration has a short working distance such as, for example, 2-3 cm. One operational range could be with a 0.08

NA 2× objective lens with a ~2 cm working distance. Another could be with a 20×0.5 NA objective lens with a ~2 mm working distance.

In the illustrated configuration, the entire variable illuminator $110(f)$ (e.g., LED array) is located behind the objective 134 (primary imaging optics) and a secondary lens 130 is used to image the variable illuminator $110(f)$ to a back focal plane of the objective. In FIGS. 7A and 7B, the optical path distance between the beam splitter 139 and the secondary lens 138 is $d_{i1}$, the optical path distance between the secondary lens 138 is $d_2$, and the optical path distance between the beam splitter 139 and the back focal plane of the objective 134 is $d_{i2}$. In FIG. 7A, an image 136 of the variable illuminator $110(f)$ is shown at the back focal plane 135 an optical distance of a focal length F from the back of the objective 134. To assure that the variable illuminator $110(f)$ image is formed on the back focal plane 135 of the objective 134, the components of the optical system are located so that the optical path distances follow this equation: $1/f=1/d_2+1/(d_{i1}+d_{i2})$. FIG. 7B also shows an optical distance of $d_s$ from the tube lens 132 to the radiation detector $140(f)$ and an $d_t$ between from the tube lens 132 to the back of the objective 134. The illustrated example includes an objective 134 that is a 2× microscope objective. In other examples, other objectives may be used. An example of values that can be used in the illustrated configuration are w=10 cm, the $d_2$=20 cm, the $d_{i1}+d_{i2}$=2 cm, and the f=1.9 cm. Other values can be used.

The beam-splitter 139 is configured to transmit half the illumination incident at a 45 degree angle to the beam-splitter 139 and not absorbed by the beam-splitter 139. The remaining half of the incident illumination (not absorbed) is reflected by the beam-splitter 139. For example, the the beam splitter 139 may be comprised of a sheet of glass or other substrate with a coating designed to control the light accordingly. As another example, a beam splitter may be a half-silvered mirror with a continuous thin coating of reflective material (e.g., metal). Another example is a swiss cheese beam splitter which has a discontinuous coating with holes to obtain the desired ratio of reflection to transmission.

In FIG. 7A, the resolution variable-illumination Fourier ptychographic imaging device $100(f)$ is shown at a single illumination time. At this time, a single light element 112 of the variable illuminator $110(f)$ is activated to provide illumination at an incidence angle of $\theta_B$ with a wavevector of (kx,ky). At other times, other light elements 112 may be providing illumination at other incidence angles. Each light element 112 includes a light source that can provide illumination (e.g., approximately plane wave illumination) at a particular incidence angle to the sample 20.

As shown in FIG. 7A, during an operation of a system comprising the variable illuminator of the variable-illumination Fourier ptychographic imaging device $100(f)$, different light elements 112 of the variable illuminator $110(f)$ are illuminated at different times. The secondary lens 138 receives illumination from the illuminated light element(s) 112 and propagates the illumination to the beam splitter 139. The beam splitter 139 transmits half the incident light and reflects half the incident light. The objective 134 propagates incident light to the sample to illuminate it at a plurality of N incidence angles at different times. As shown in FIG. 7B, during the operation of the system, light issuing from the sample 20 is received by the objective 134 acting as the filtering optical element of the optical system. The objective 134 propagates light to the beam splitter 139, which transmits half the light, not absorbed, and reflects the remainder. The tube lens 132 receives light passing through the beam splitter 139 and propages light to the radiation detector $140(f)$. The radiation detector $140(w)$ measures the intensity distribution at different acquisition times to capture a plurality of intensity images at different incidence angles.

II. Variable-illumination Fourier Ptychographic Imaging Methods

In certain aspects, a variable-illumination Fourier ptychographic imaging method comprises a measurement process, a recovery process, and an optional display process. During the measurement process, the sample is illuminated from a plurality of N incidence angles $(\theta x_{i,j}, \theta y_{i,j})$, i=1 to n, j=1 to m, (N=n×m) using a variable illuminator. During this process, the optical system filters the light issuing from the illuminated sample to propagate filtered light to the radiation detector and the radiation detector receives the filtered light and acquires a plurality of M intensity images, $k_{k,l}$, k=1 to o and j=1 to p, where M=o×p. In certain cases, an intensity image is captured at each incidence angle. In certain aspects, the variable illuminator may be designed to generate illumination at certain incidence angles that generate intensity data that corresponds to regions that overlap in the Fourier domain by a certain amount and also cover outer higher frequency area. During the recovery process, the M intensity images are iteratively combined in the Fourier domain to generate higher-resolution image data (intensity and/or phase). At each iteration, a filter is applied in the Fourier domain for a particular plane wave incidence angle, an inverse Fourier transform is applied to generate a lower resolution image, the intensity of the lower resolution image is replaced with an intensity measurement from the radiation detector, a Fourier transform is applied, and the corresponding region in Fourier space is updated. During the optional display process, an image (e.g., higher-resolution image, acquired intensity image, etc.) and/or other output may be provided on a display. Generally, these methods alternate between two working domains: the spatial (x-y) domain and the Fourier (kx-ky) domain, where k represents the wavenumber.

In certain aspects, variable-illumination Fourier ptychographic imaging methods may comprise a phase retrieval technique that uses angular diversity to recover complex sample images. The recovery process alternates enforcement of known image data acquired in the spatial domain and a fixed constraint in the Fourier domain. This phase retrieval recovery can be implemented using various methods such as, for example, an alternating projections procedure, a convex reformulation of the problem, or any non-convex variant in-between. Instead of needing to translate a sample laterally (i.e. applying translational diversity), variable-illumination Fourier ptychographic imaging systems use methods that vary the spectrum constraint in the Fourier domain to expand the Fourier passband beyond that of a single captured image to recover a higher-resolution sample image.

In some cases, variable-illumination Fourier ptychographic imaging methods may also comprise an optional aberration correction process. An example of an aberration correction process is a re-focusing (propagating) process. Such a refocusing process may be useful where the sample was placed at a sample plane at $z=z_0$ where the in-focus plane of the optical element is located at position z=0. In other words, the image captured of the sample is not the image at the sample plane, but is the sample profile propagated by a distance of $-z_0$ from the in-focus plane of the optical element. In these cases, the method may re-focus the sample by propagating the image data by the $z_0$ distance back to the sample plane, without having to mechanically move the sample in the z-direction. The re-focusing (propagating) step(s) can be performed by multiplying a phase factor in Fourier space.

With reference to certain illustrated examples, subscript "h" refers to higher-resolution, subscript "l" refers to lower resolution intensity, subscript "f" refers to focused position, subscript "m" refers to measured, and subscript "s" refers to sampled.

Figure 8:
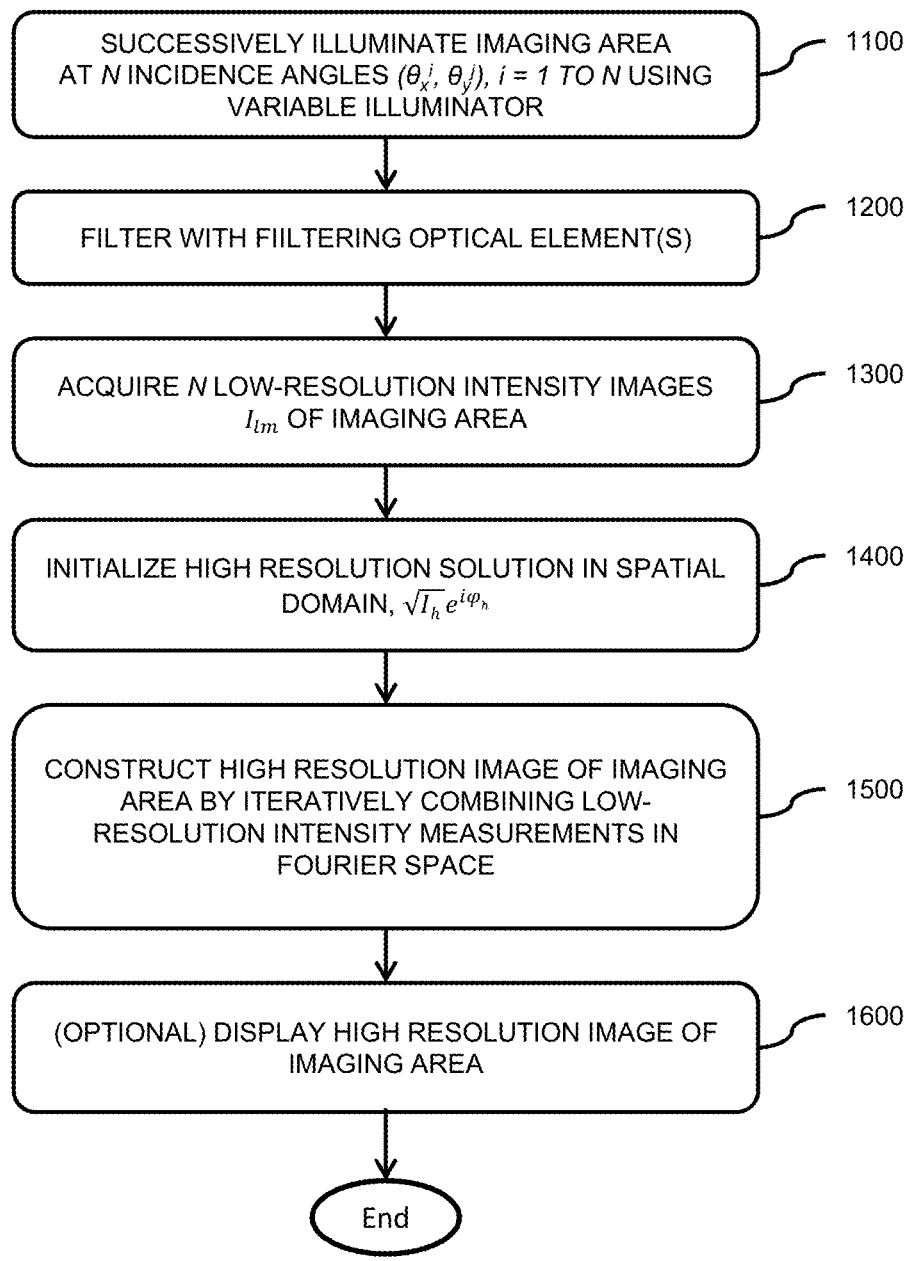
FIG. 8 is a flowchart of a variable-illumination Fourier ptychographic imaging method.

FIG. 8 is a flowchart depicting steps of a variable-illumination Fourier ptychographic imaging method, according to certain embodiments. This method is performed by a variable-illumination Fourier ptychographic imaging system such as, for example, the system 10 described with reference to FIG. 1. The variable-illumination Fourier ptychographic imaging method comprises a measurement process (steps 1100, 1200, and 1300), a recovery process (steps 1400 and 1500), and an optional display process (step 1600).

At step 1100, a variable illuminator provides illumination to a sample from a plurality of N incidence angles ($\theta x_{i,j}$, $\theta y_{i,j}$), i=1 to n, j=1 to m, at N sample times. In some cases, the variable illuminator controls the illumination provided to the sample based on illumination instructions. The illumination instructions may define the order of the illumination angles and the associated illumination time. The wave vector in x and y directions can be denoted as wavevector $kx_{i,j}$, $ky_{i,j}$.

In certain aspects, the variable illuminator may provide illumination of different wavelengths at different sample times. For example, the variable illuminator may provide RGB illumination of three wavelengths $\lambda_1$, $\lambda_2$, and $\lambda_3$ corresponding to red, green, blue colors, respectively, at different sample times, for example, in a color imaging embodiment.

In some cases, the variable illuminator is configured to provide plane wave illumination. Plane wave illumination with a wavevector, kx, ky, in the spatial domain, is equivalent to shifting the center of the image spectrum by (kx, ky) in the Fourier domain. In this respect, the intensity image data in the Fourier domain is shifted from normal incidence image data by (kx, ky), which corresponds to the incidence angle ($\theta x$, $\theta y$) applied by the variable illuminator.

At step 1200, the optical system collects light issuing from the sample and propagates it to the radiation detector. The optical system comprises a filtering optical element(s) that filters the light. For example, a filtering optical element may be an objective lens collecting light issuing from an illuminated sample. In this case, the objective lens filters the light issuing from the sample by only accepting light incident at a range of angles within its numerical aperture (NA). In Fourier space, the filtering function of a filtering optical element such as an objective lens may be represented by a circular pupil with radius of $NA \times k_0$, where $k_0 = 2\pi/\lambda$ is the wave number in vacuum. That is, the variable-illumination Fourier ptychographic imaging method may update in Fourier space circular regions defined by this filtering function and the different incidence angles. In certain cases, the filtering optical element and its associated filtering function omits data outside the circular pupil region.

At step 1300, the radiation detector receives light propagated by the optical system and captures a snapshot intensity distribution measurement at each of the M sample times, $t_k$, k=1 to M, to acquire a plurality of M intensity images, $I_{k,l,k}$=1 to o and j=1 to p, associated with different incidence angles. Each intensity image sampled by the radiation detector is associated with a region in Fourier space. In many aspects, the variable illuminator is configured to provide illumination from incidence angles that will generate overlapping areas between neighboring (adjacent) regions (e.g., circular pupil regions) in Fourier space. In one aspect, the variable illuminator is designed to provide an overlapping area between neighboring regions of 2% to 99.5% of the area of one of the regions. In another aspect, the variable illuminator is designed to provide an overlapping area between neighboring regions of 65% to 75% of the area of one of the regions. In one aspect, the variable illuminator is designed to provide an overlapping area between neighboring regions of about 65% of the area of one of the regions.

In steps 1400 and 1500, a higher-resolution image of the sample may be generated from the M intensity distribution measurements acquired at step 1300. The M intensity images, $I_{k,l}$, k=1 to o and j=1 top correspond to different incidence angles indexed by illumination wavevector $kx_{i,j}$, $ky_{i,j}$, i=1 to n, j=1 to m. At step 1400, a higher-resolution image: $\sqrt{I_h} e^{i\varphi_h}$ is initialized in the spatial domain, and a Fourier transform is applied to the initial value to obtain an initialized Fourier transformed image $\tilde{I}_h$. The initialized higher-resolution solution may be an initial guess. This initial guess may be determined based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any lower-resolution image of the sample area. Another example of an initial guess is a constant value. The Fourier transform of the initial guess can be a broad spectrum in the Fourier domain. At step 1500, the higher-resolution image of the sample is constructed by iteratively combining low-resolution intensity measurements in Fourier space. In many cases, portions of step 1500 may be implemented using a processor (e.g., processor 210 of the system 10).

At optional step 1600, the display may receive image data such as the higher-resolution image data and/or other data from the processor, and display the data on a display (e.g., display 230 in FIG. 1).

Aberration Correction

Figure 9:
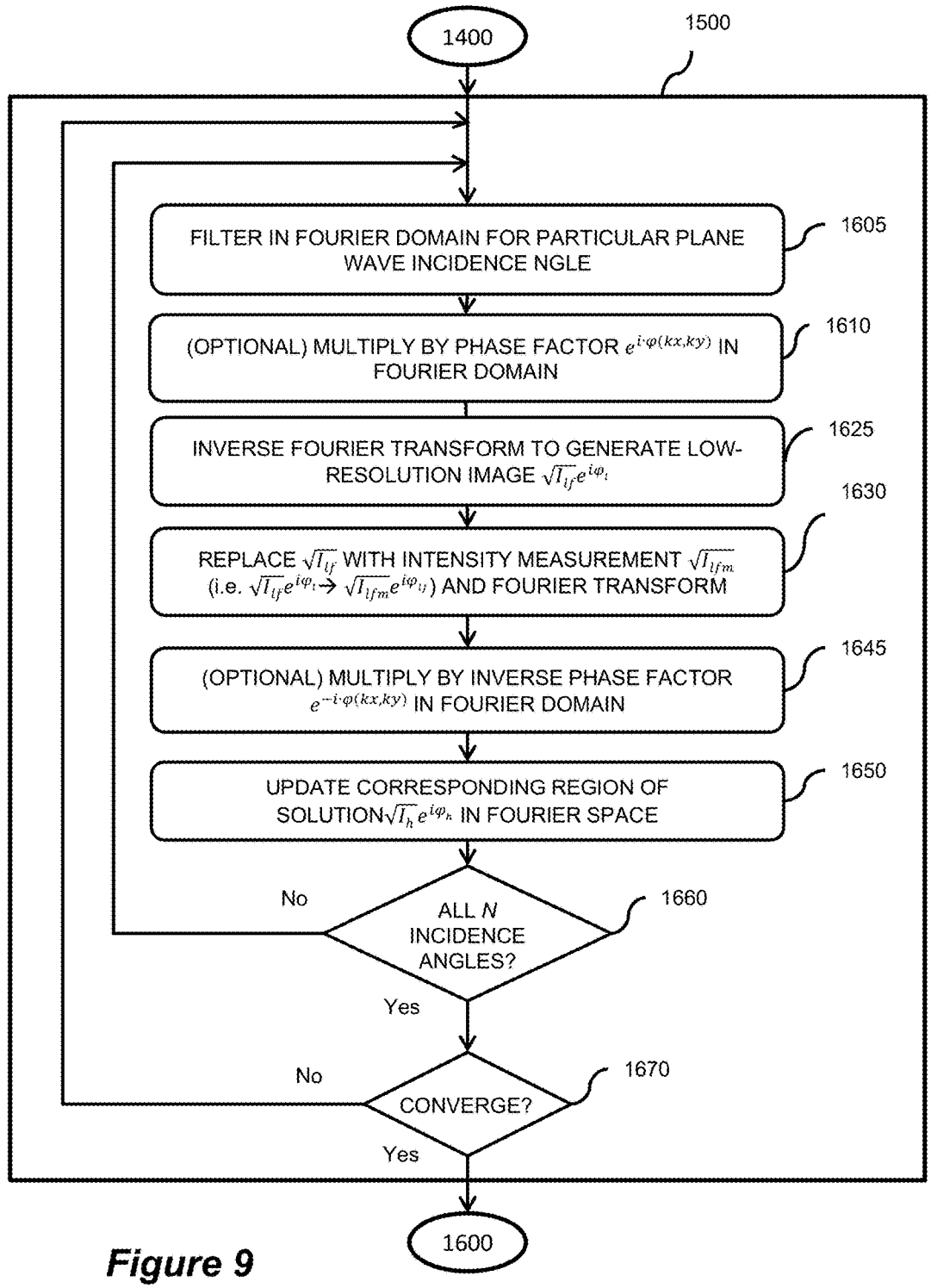
FIG. 9 is a flowchart of an example of certain sub-steps of one of the steps of the method of FIG. 8.

In certain aspects, the recovery process step 1500 may comprise an aberration correction process that introduces a phase map to the filtering function to compensate for aberrations at the pupil plane during the iterative image recovery process. FIG. 9 is a flowchart depicting an example of sub-steps of step 1500 of the variable-illumination Fourier ptychographic imaging method of FIG. 8 that optionally comprises an aberration correction process, according to certain aspects. In the illustrated flowchart, the optional aberration correction process comprises incorporating compensation at the two multiplication steps 1610 and 1645. Step 1610 models the connection between the actual sample profile and the captured intensity data (with includes aberrations) through multiplication with a pupil function: $e^{i \cdot \varphi(k_x, k_y)}$. Step 1645 inverts such a connection to achieve an aberration-free reconstructed image. For example, aberration correction can correct sample defocus. In certain cases, sample defocus may be essentially equivalent to introducing the following defocus phase factor to the pupil plane (i.e., a defocus aberration):

$$e^{i \cdot \varphi(k_x, k_y)} = e^{i \sqrt{(2\pi/\lambda)^2 - k_x^2 - k_y^2} \cdot z_0}, \quad k_x^2 + k_y^2 < (NA \cdot 2\pi/\lambda)^2 \quad (1)$$

where kx and ky are the wavenumbers at the pupil plane, $z_0$ is the defocus distance, and NA is the numerical aperture of the filtering optical element.

At step 1605, a processor performs filtering of the higher-resolution image $\sqrt{I_h}e^{i\varphi_h}$ in the Fourier domain to generate a lower-resolution image $\sqrt{I_l}e^{i\varphi_l}$ for a particular plane wave incidence angle $(\theta_x{}^i, \theta_y{}^i)$ with a wave vector $(kx_{i,j}, ky_{i,j})$. The Fourier transform of the higher-resolution image is $\tilde{I}_h$ and the Fourier transform of the lower-resolution image for a particular plane wave incidence angle is $\tilde{I}_l$. In the Fourier domain, the method filters a region from the spectrum $\tilde{I}_h$, of the higher-resolution image $\sqrt{I_h}e^{i\varphi_h}$. In cases with a filtering optical element in the form of an objective lens, this region is a circular pupil aperture with a radius of $NA*k_0$, where $k_0$ equals $2\pi/\lambda$ (the wave number in vacuum), given by the coherent transfer function of an objective lens. In Fourier space, the location of the region (e.g., location of center of circular region) corresponds to the corresponding incidence angle. For an oblique plane wave incidence with a wave vector $(kx_{i,j}, ky_{i,j})$, the region is centered about a position $(kx_{i,j}, ky_{i,j})$ in the Fourier domain of $\sqrt{I_h}e^{i\varphi_h}$.

At optional step 1610, the processor may multiply by a phase factor $e^{i\cdot\varphi(k_x,k_y)}$ in the Fourier domain as part of aberration compensation.

At step 1625, an inverse Fourier transform is taken to generate the lower resolution image region $\sqrt{I_{lf}}e^{i\varphi_l}$.

At step 1630, the computed amplitude component $\sqrt{I_{lf}}$ of the lower-resolution image region at the in-focus plane, $\sqrt{I_{lf}}e^{i\varphi_{lf}}$, is replaced with the low-resolution intensity measurement $\sqrt{I_{lfm}}$ captured by the radiation detector. This forms an updated lower resolution image: $\sqrt{I_{lfm}}e^{i\varphi_{lf}}$. A Fourier transform is then applied to the updated lower resolution image data.

At optional step 1645, an inverse phase factor $e^{-i\cdot\varphi(k_x,k_y)}$ is applied in the Fourier domain.

At step 1650, the corresponding region of the higher-resolution solution $\sqrt{I_h}e^{i\varphi_h}$ in the Fourier domain corresponding to incidence wave vector (kx, ky) is updated with the updated lower resolution image data.

At step 1660, it is determined whether steps 1605 through 1650 have been completed for the different incidence angles associated with the captured images. If steps 1605 through 1650 have not been completed for these different incidence angles, steps 1605 through 1650 are repeated for the next incidence angle. The next incident angle is typically the next adjacent angle. In certain aspects, the neighboring (adjacent) regions are overlapping in Fourier space and are iteratively updated (e.g., by repeating steps 1605 through 1650 for each adjacent incidence angle). At the overlapping area between adjacent regions, there is data based on multiple samplings over the same Fourier space. The incidence angles of the illumination from the variable illuminator determine the overlapping area between the regions. In one example, the overlapping area between neighboring regions is in the range of about 2% to 99.5% of the area of one of the corresponding neighboring regions. In another example, the overlapping area between neighboring regions is in the range of about 65% to 75% of the area of one of the corresponding neighboring regions. In another example, the overlapping area between neighboring regions is about 65% of the area of one of the corresponding neighboring regions. In another example, the overlapping area between neighboring regions is about 70% of the area of one of the corresponding neighboring regions. In another example, the overlapping area between neighboring regions is about 75% of the area of one of the corresponding neighboring regions. In certain embodiments, each overlapping region has the same area.

At step 1670, it is determined whether a higher-resolution image data has converged. For example, a processor may determine whether the higher-resolution image data may have converged to be self-consistent. In one case, a processor compares the previous higher-resolution image data of the previous iteration or initial guess to the present higher-resolution data, and if the difference is less than a certain value, the image data may have converged to be self-consistent. If it is determined that the image data has not converged, then steps 1605 through 1670 are repeated. In one case, steps 1605 through 1670 are repeated once. In other cases, steps 1605 through 1670 are repeated twice or more.

If the image data has converged, the converged image data in Fourier space is transformed using an inverse Fourier transform to the spatial domain to recover a higher-resolution image $\sqrt{I_h}e^{i\varphi_h}$. If it is determines that the solution has converged at step 1670, then the method may proceed to optional step 1600 or the method may end.

Figure 10A:
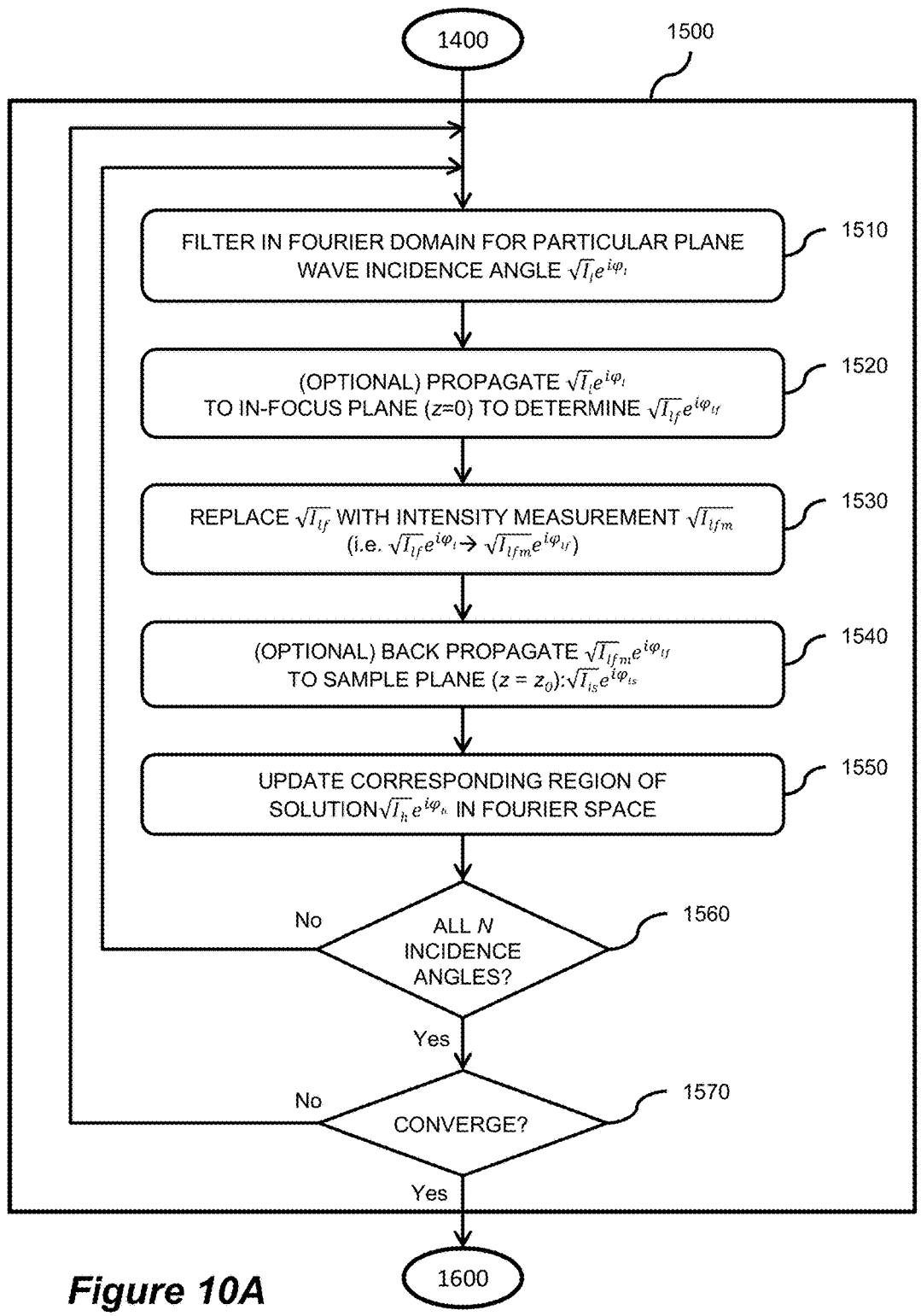
FIG. 10A is a flowchart of an example of certain sub-steps of one of the steps of the method of FIG. 8.
Figure 10B:
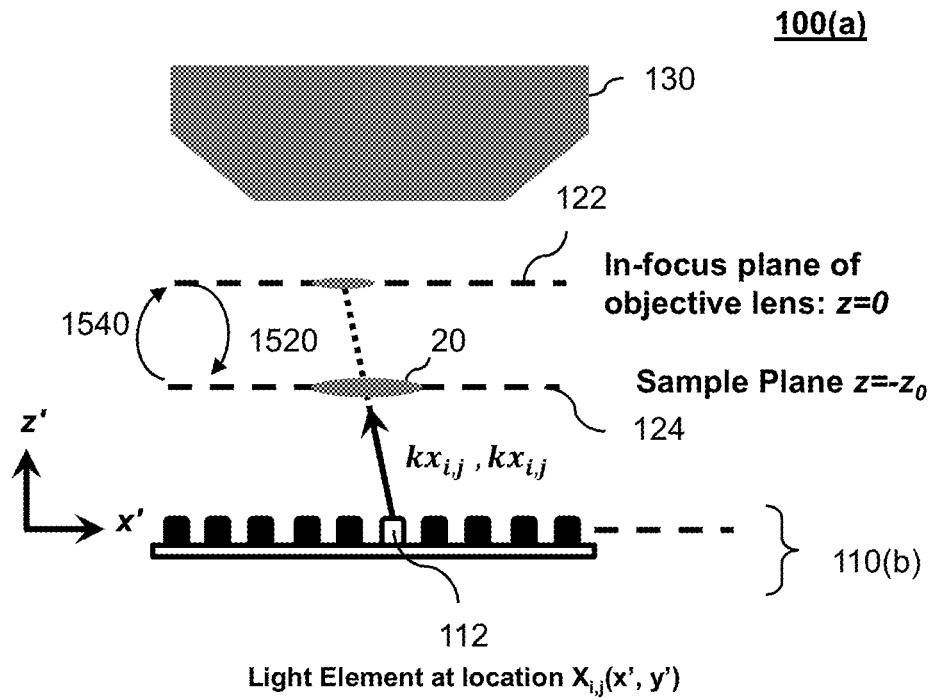
FIGS. 10B and 10C are schematic illustrations depicting components of a variable-illumination Fourier ptychographic imaging device in trans-illumination mode.

FIG. 10A is a flowchart depicting an example of sub-steps of step 1500 shown in FIG. 8, according to an embodiment. These sub-steps comprise an optional aberration correction process that corrects for defocus. In FIG. 10, step 1500 comprises step 1510, step 1530, step 1550, step 1560, step 1570, step 1580, and step 1590. In aspects that include aberration correction, step 1500 may further incorporate compensation at the two multiplication optional steps 1520 and 1540. For example, optional steps 1520 and 1540 can be used to focus an out-of focus sample that is out-of-focus by the amount of $z_0$.

At step 1510, a processor performs filtering of the higher-resolution image $\sqrt{I_h}e^{i\varphi_h}$ in the Fourier domain to generate a lower-resolution image $\sqrt{I_l}e^{i\varphi_l}$ for a particular plane wave incidence angle $(\theta x_{i,j}, \theta y_{i,k})$ with a wave vector $(kx_{i,j}, ky_{i,k})$. The Fourier transform of the higher-resolution image is $\tilde{I}_h$ and the Fourier transform of the lower-resolution image for a particular plane wave incidence angle is $\tilde{I}_l$. In the Fourier domain, the method filters a region from the spectrum $\tilde{I}_h$ of the higher-resolution image $\sqrt{I_h}e^{i\varphi_h}$. In cases with a filtering optical element in the form of an objective lens, this region is a circular pupil aperture with a radius of $NA*k_0$, where $k_0$ equals $2\pi/\lambda$ (the wave number in vacuum), given by the coherent transfer function of an objective lens. In Fourier space, the location of the region (e.g., location of center of circular region) corresponds to the corresponding incidence angle. For an oblique plane wave incidence with a wave vector $(kx_{i,j}, ky_{i,j})$, the region is centered about a position $(kx_{i,j}, ky_{i,j})$ in the Fourier domain of $\sqrt{I_h}e^{i\varphi_h}$.

At optional step 1520, the low-resolution image, $\sqrt{I_l}e^{i\varphi_l}$ is propagated in the Fourier domain to an in-focus plane at z=0 of the optical system to determine the lower-resolution image at the focused position: $\sqrt{I_{lf}}e^{i\varphi_{lf}}$. In one case, optional step 1520 can be performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another case, optional step 1520 can be performed by the mathematically equivalent operation of convolving the low-resolution image $\sqrt{I_l}e^{i\varphi_l}$ with the point-spread-function for the defocus. In another case, optional step 1520 can be performed as an optional sub-step of step 1510 by multiplying $\tilde{I}_l$ by a phase factor in the Fourier domain before performing the inverse Fourier transform to produce $\sqrt{I_{lf}}e^{i\varphi_{lf}}$. In certain instances, optional step 1520 need not be included if the sample is located at the in-focus plane (z=0) of the filtering optical element.

At step 1530, the computed amplitude component $\sqrt{I_{lf}}$ of the lower-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector. This forms an updated low resolution target: $\sqrt{I_{lfm}}e^{i\varphi_{lf}}$.

At optional step 1540, the updated low-resolution image $\sqrt{I_{lfm}}e^{i\varphi_{lf}}$ may be back-propagated to the sample plane ($z=z_0$) to determine $\sqrt{I_{ls}}e^{i\varphi_{ls}}$. In certain instances, optional step 1540 need not be included if the sample is located at the in-focus plane of the filtering optical element, that is, where $z_0=0$. In one case, step 1540 can be performed by taking the Fourier transform of the updated low-resolution image $\sqrt{I_{lfm}}e^{i\varphi_{lf}}$ and multiplying in the Fourier space by a phase factor, and then inverse Fourier transforming it. In another case, step 1540 can be performed by convolving the updated low-resolution image $\sqrt{I_{lfm}}e^{i\varphi_{lf}}$ with the point-spread-function of the defocus. In another case, step 1540 can be performed as a sub-step of step 1550 by multiplying by a phase factor after performing the Fourier transform onto the updated target image.

At step 1550, a Fourier transform is applied to the updated target image propagated to the sample plane: $\sqrt{I_{ls}}e^{i\varphi_{ls}}$, and this data is updated in the corresponding region of higher-resolution solution $\sqrt{I_h}e^{i\varphi_h}$ in the Fourier space corresponding to the corresponding to the incidence wave vector $kx_{i,j}$, $ky_{i,j}$.

At step 1560, it is determined whether steps 1510 through 1560 have been completed for the different incidence angles associated with the captured images. If steps 1605 through 1650 have not been completed for these different incidence angles, steps 1510 through 1560 are repeated for the next incidence angle. The next incident angle is typically the next adjacent angle. In certain aspects, the neighboring (adjacent) regions are overlapping in Fourier space and are iteratively updated (e.g., by repeating steps 1510 through 1560 for each adjacent incidence angle). At the overlapping area between adjacent regions, there is data based on multiple samplings over the same Fourier space. The incidence angles of the illumination from the variable illuminator determine the overlapping area between the regions. In one example, the overlapping area between neighboring regions is in the range of about 2% to 99.5% of the area of one of the corresponding neighboring regions. In another example, the overlapping area between neighboring regions is in the range of about 65% to 75% of the area of one of the corresponding neighboring regions. In another example, the overlapping area between neighboring regions is about 65% of the area of one of the corresponding neighboring regions. In another example, the overlapping area between neighboring regions is about 70% of the area of one of the corresponding neighboring regions. In another example, the overlapping area between neighboring regions is about 75% of the area of one of the corresponding neighboring regions. In certain embodiments, each overlapping region has the same area.

At step 1570, it is determined whether a higher-resolution image data has converged. For example, a processor may determine whether the higher-resolution image data may have converged to be self-consistent. In one case, a processor compares the previous higher-resolution image data of the previous iteration or initial guess to the present higher-resolution image data, and if the difference is less than a certain value, the image data may have converged to be self-consistent. If it is determined that the image data has not converged, then steps 1510 through 1560 are repeated. In one case, steps 1510 through 1560 are repeated once. In other cases, steps 1510 through 1560 are repeated twice or more. If the image data has converged, the converged image data in Fourier space is transformed using an inverse Fourier transform to the spatial domain to recover a higher-resolution image $\sqrt{I_h}e^{i\varphi_h}$. If it is determines that the solution has converged at step 1570, then the method may proceed to optional step 1600 or the method may end.

In certain aspects, the variable-illumination Fourier ptychographic imaging method described with reference to FIG. 8 can include an optional aberration correction process described with reference to either FIG. 9 or FIG. 10A. In one aspect, the variable-illumination Fourier ptychographic imaging method includes the optional aberration correction process for refocusing described in optional steps 1520 and 1540 of FIG. 1 to refocus. The refocusing feature of optional steps 1520 and 1540 propagates the image from the in-focus plane $z=0$ to the sample plane at $z=z_0$. Refocusing may be needed when the sample is located at the sample plane at $z=z_0$, while the in-focus plane of the filtering optical element (e.g., objective lens) is located at position $z=0$. In other words, refocusing may be needed when the sample is out-of-focus by the amount of $z_0$.

Figure 10C:
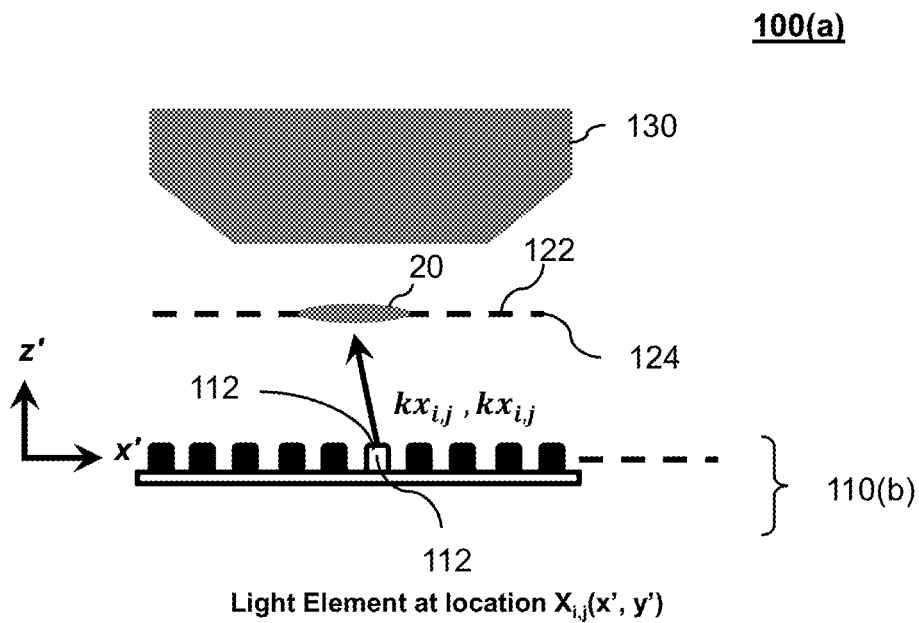
Figure 10D:
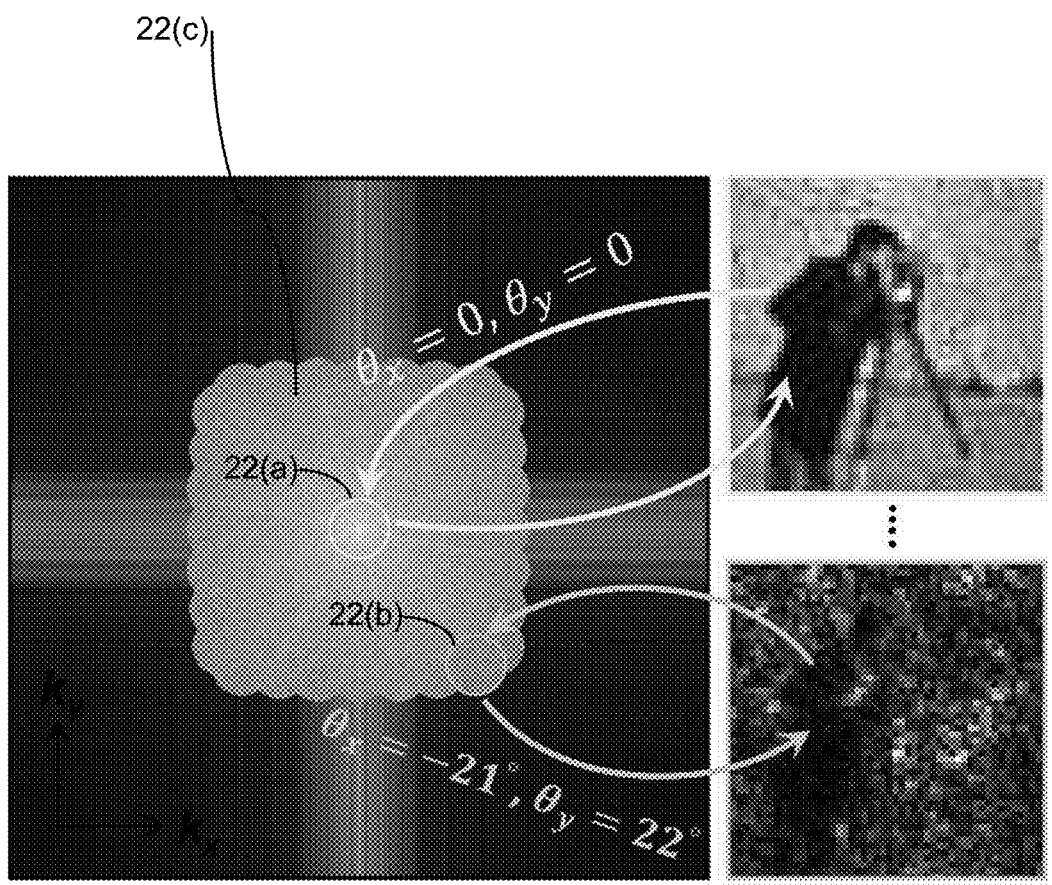
FIG. 10D is an illustration of certain steps of the variable-illumination Fourier ptychographic imaging method described with reference to FIGS. 8 and 10A.

FIGS. 10B and 10C are schematic illustrations depicting components of a variable-illumination Fourier ptychographic imaging device 100(*a*) in trans-illumination mode, according to an embodiment. The Fourier ptychographic imaging device 100(*a*) comprises a variable illuminator 110(*b*) is in the form of a two-dimensional matrix of light elements (e.g. an LED matrix). In FIGS. 10B and 10C, a single light element 112 of the variable illuminator 110(*b*) at $X_{i,j}$ (x',y') is shown as illuminated at the sample time illustrated. The Fourier ptychographic imaging device 100(*a*) further comprises an optical system 130.

In FIG. 10C, the sample 20 is depicted as out-of-focus by an amount of $-z_0$, and optional steps 1520 and 1540 (depicted here as arrows) can be used to digitally refocus the sample 20 to the in-focus plane 122 as depicted by the dottily line to the in-focus plane 122. In FIG. 6D, the sample 20 is located at in-focus plane 122. In this case, optional steps 1520 and 1540 may not be needed.

FIG. 10D is an illustration of steps of the variable-illumination Fourier ptychographic imaging method described with reference to FIGS. 8 and 10A, according to an embodiment. The left-hand-side image in FIG. 6E includes two circular regions 22(*a*) and 22(*b*) in Fourier space used to generate the higher-resolution image region. The circular regions 22(*a*) and 22(*b*) may be defined NA of the filtering optical element based on approximating as circular pupil function with a radius of NA*$k_0$, where $k_0$ equals $2\pi/\lambda$, (the wave number in vacuum). For example, each circular region 22(*a*) and 22(*b*) may be defined by the optical transfer function of a 2× objective lens 0.08 NA. In FIG. 10D, region 22(*a*) is of a circular low-pass filter shape associated with a plane wave incidence angle: $\theta_x=0$; $\theta_y=0$, i=1 and Region 22(*b*) is of a circular low-pass filter shape associated with a plane wave incidence angle: $\theta_x=-21°$; $\theta_y=22°$. To perform filtering at each incidence angle, data outside the circular region in the Fourier domain is omitted, which results in a low-resolution data. The low-resolution image resulting from filtering based on plane wave incidence angle of $\theta_x=-21$; $\theta_y=22°$ is shown at the top right-hand-side of FIG. 10D. The low-resolution image resulting from filtering based on plane wave incidence angle of $\theta_x=-21°$; $\theta_y=22°$ is shown at the bottom right-hand-side of FIG. 10D. The wave vectors of the incidence angles in the x-direction and y-direction are denoted as kx and ky respectively.

When implementing the updating step 1550 of FIG. 10A or the updating step 1650 of FIG. 9, the method updates the data within the region 22(*a*) of the higher-resolution reconstruction 22(*c*) corresponding to the normal incidence $\theta_x=0$, $\theta_y=0$. The method also updates the data within the region 22(*b*) of the higher-resolution reconstruction corresponding to the n$^{th}$ incidence angle $\theta_x=-21°$; $\theta_y=22°$. The regions are updated with low-resolution image measurement data.

Tile Imaging

In certain aspects, a variable-illumination Fourier ptychographic imaging method may comprise tile imaging to divide the captured intensity images into a plurality of tile images, independently acquire a higher-resolution image for each of the tiles, and then combine the higher-resolution tile images to generate a full field-of-view higher-resolution image. In some cases, the higher-resolution tile images may be combined with an image blending process. An example of an image blending process is alpha blending which can be found in PCT publication WO1999053469, entitled "A system and method for performing blending using an over sampled buffer," filed on Apr. 7, 1999, which is hereby incorporated by reference in its entirety. Since higher-resolution images of the tiles may be acquired independently, this method may be well suited for parallel computing, which may reduce computational time, and may also reduce memory requirements. Moreover, the light from each light element may be accurately treated as a plane wave for each tile. The incident wavevector for each tile can be expressed as:

$$(k_x^i, k_y^i) = \frac{2\pi}{\lambda} \left( \frac{(x_c - x_i)}{\sqrt{(x_c - x_i)^2 + (y_c - y_i)^2 + h^2}}, \frac{(y_c - y_i)}{\sqrt{(x_c - x_i)^2 + (y_c - y_i)^2 + h^2}} \right)$$ (Eqn. 2)

where $(x_c, y_c)$ is the central position of each tile of the full field-of-view low-resolution image, $(x_i, y_i)$ is the position of the i$^{th}$ light element, and h is the distance between the variable illuminator and the sample. Furthermore, this method can assign a specific aberration-correcting pupil function to each tile in some cases.

Figure 11:
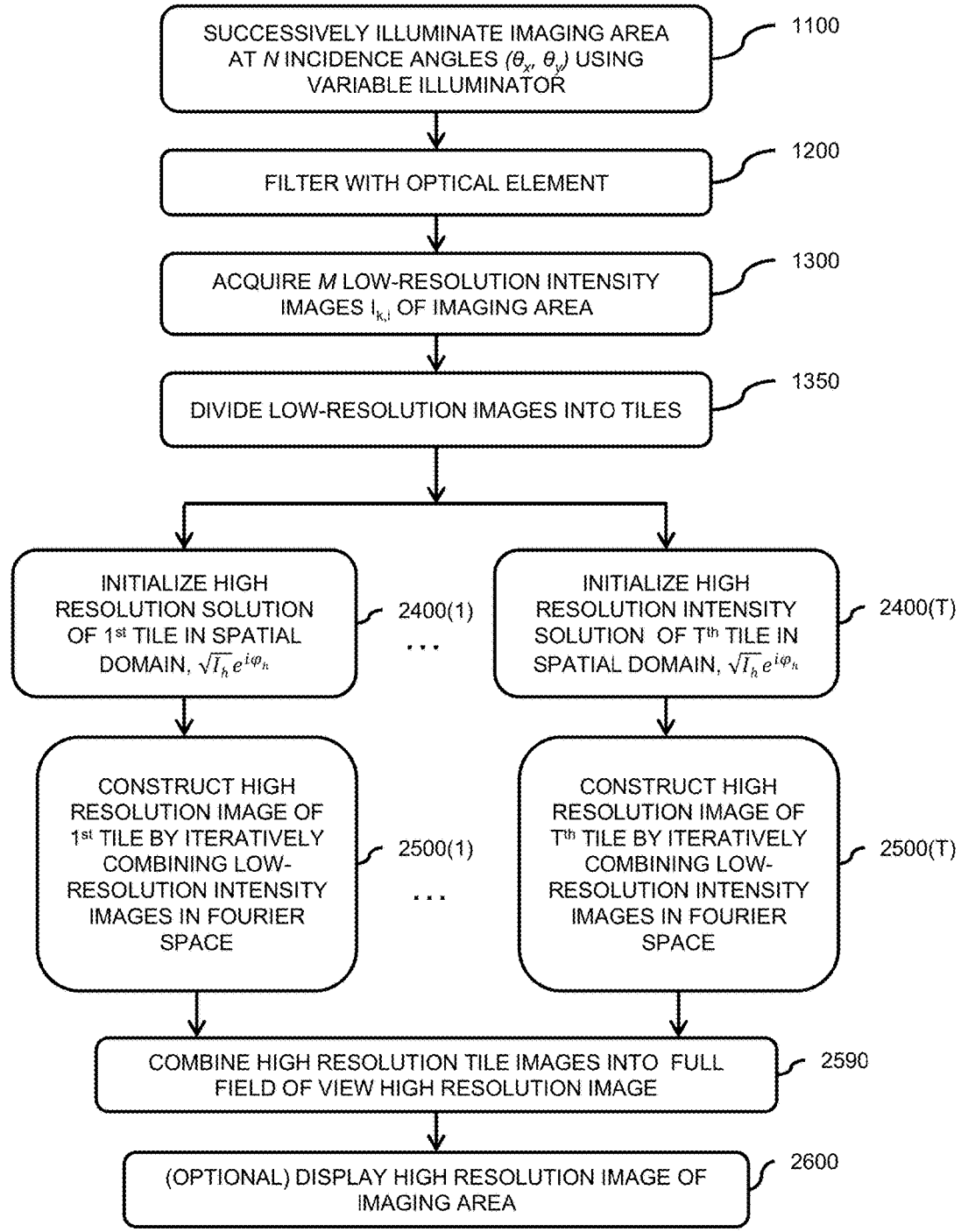
FIG. 11 is a flowchart of a variable-illumination Fourier ptychographic imaging method with tile imaging.

FIG. 11 is a flowchart depicting a variable-illumination Fourier ptychographic imaging method which includes tile imaging, according to an embodiment. This method can be performed by variable-illumination Fourier ptychographic imaging system such as the system 10 illustrated in FIG. 1. To take advantage of parallel processing capabilities, the processor of the system should be configured with parallel processing capabilities such as, for example, the GPU unit or a processor having multiple cores (i.e. independent central processing units).

In FIG. 11, the variable-illumination Fourier ptychographic imaging method comprises a measurement process (steps 1100, 1200, and 1300), a recovery process (steps 1350, 2400 (*i*-M), 2500(*i*-M), 2590), and an optional display process (step 1600). The measurements process (steps 1100, 1200, and 1300) and optional display process (step 1600) are described with reference to FIG. 8.

At step 1350, the processor divides the full field-of-view into a plurality of tiles such as, for example, a two-dimensional matrix of tiles. The dimensions of a two-dimensional square matrix of tiles may be in powers of two such as, for example, a 256 by 256 matrix, a 64×64 matrix, etc. In one example, the processor may divide up a full field of view of 5,280×4,380 pixels into tiles having an area of 150×150 pixels.

Next, the processor initializes the higher-resolution image: $\sqrt{I_h}e^{i\varphi_h}$ in the spatial domain for each tile (1 to T) independently using parallel computing (step 2400(1) . . . step 2400(T)). A Fourier transform is applied to the initial guess. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_{h,l}$ of any low-resolution image of the sample area. Another example of an initial guess is a constant value. The Fourier transform of the initial guess can be a broad spectrum in the Fourier domain.

At step 2500(1) . . . step 2500(T), the processor reconstructs a higher-resolution image of each tile (1 to T) independently using parallel computing. The processor reconstructs the higher-resolution image of each tile by iteratively combining low-resolution intensity images in Fourier space as described with reference to steps 1510, 1530, 1550, 1560, and 1570 shown in FIG. 6B, and described herein. Steps 1520 and 1540 may be included if the sample is out of focus.

At step 2590, the processor combines the higher-resolution tile images into a full field-of view higher-resolution image. In some cases, combining tile images comprises an imaging-blending process such as, for example, alpha blending.

At optional step 2600, the image data of the recovered higher-resolution two-dimensional image of the sample area is displayed on a display (e.g., display 230). In one aspect, the method with tile imaging may further comprise a procedure that accounts for differences in incident angles between different tiles based on the distance between the tiles and each light element.

Refocusing and Auto-Focusing

Conventional high NA microscopes and other imaging devices typically have a limited depth of field. For example, the depth-of-field of a conventional microscope with a 20× objective lens with 0.4 NA is about 5 µm. With a conventional microscope, resolution degrades as the sample moves away from the in-focus plane due to its limited depth-of-field. To improve resolution using a conventional microscope, the operator typically moves the stage to mechanically bring the sample back into focus. In this regard, a precise mechanical stage is needed to bring a sample into the in-focus position with sub-micron accuracy.

In certain aspects, a variable-illumination Fourier ptychographic imaging system can refocus the sample without mechanically moving the sample. For example, the variable-illumination Fourier ptychographic imaging method may comprise steps that refocus an out-of-focus sample during the recovery process. With this refocusing procedure, the variable-illumination Fourier ptychographic imaging system can expand its depth-of focus beyond the physical limitations of its filtering optical element. In certain cases, a variable-illumination Fourier ptychographic imaging system may be able auto-focus the sample.

During operation of a variable-illumination Fourier ptychographic imaging system, the z-position of the sample plane may not be known a priori. In certain aspects, a variable-illumination Fourier ptychographic imaging method may include one or more auto-focusing steps that determines the z-position of the sample plane and uses this z-position to digitally refocus the sample. For example, the a variable-illumination Fourier ptychographic imaging method described with respect to FIG. 10A may further comprise a step during or before step 1520 that computes the z-position of the sample plane. The variable-illumination Fourier ptychographic imaging system may the perform autofocusing by using the processor to perform steps 1520 and 1540 in FIG. 10A using the computed z-position of the sample. To compute the z-position of the sample plane, the method may determine an auto-focusing index parameter. The auto-focusing index is defined by the following equation:

$$\text{Auto-focusing index: } 1/\Sigma \text{abs}(\sqrt{I_{lf}} - \sqrt{I_{lfm}}) \quad (4)$$

Where: $\sqrt{I_{lf}}$ is the amplitude image from the low-pass filtering, and is the actual low-resolution measurement The summation in Eqn. 4 is for all oblique incidence angles. After the variable-illumination Fourier ptychographic imaging method computes the estimated z-position of the sample plane, the variable-illumination Fourier ptychographic imaging method can digitally refocus to the estimated z-position. In some cases, the higher-resolution image solution has been found to converge better when using an accurate z-position.

III. Subsystems

Figure 12:
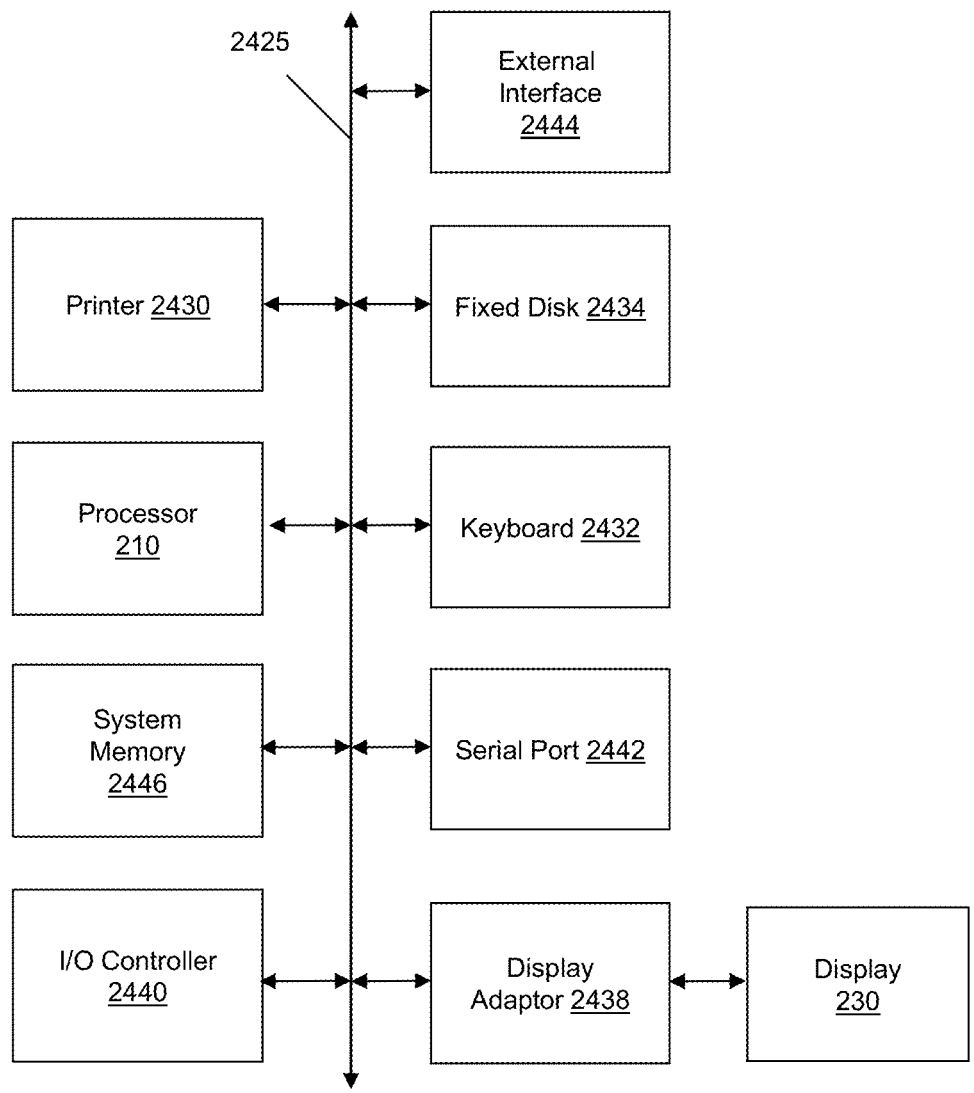
FIG. 12 is a block diagram of subsystems that may be present in a variable-illumination Fourier ptychographic imaging system.

FIG. 12 is a block diagram of subsystems that may be present in certain variable-illumination Fourier ptychographic imaging system described herein. For example, a variable-illumination Fourier ptychographic imaging system may include a processor. The processor may be a component of the variable-illumination Fourier ptychographic imaging system in some cases. The processor may be a component of the radiation detector in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 12. The subsystems shown in FIG. 12 are interconnected via a system bus 2425. Additional subsystems such as a printer 2430, keyboard 2432, fixed disk 2434 (or other memory comprising computer readable media), display 230, which is coupled to display adapter 2438, and others are shown. Peripherals and input/output (I/O) devices, which couple to I/O controller 2440, can be connected by any number of means known in the art, such as serial port 2442. For example, serial port 2442 or external interface 2444 can be used to connect the computing device 200 to a wide area network such as the Internet, a mouse input device, or a scanner. The interconnection via system bus 2425 allows the processor to communicate with each subsystem and to control the execution of instructions from system memory 2446 or the fixed disk 2434, as well as the exchange of information between subsystems. The system memory 2446 and/or the fixed disk 2434 may embody the CRM 220 in some cases. Any of these elements may be present in the previously described features.

In some embodiments, an output device such as the printer 2430 or display 230 of the aperture scanning Fourier ptychographic system can output various forms of data. For example, the aperture scanning Fourier ptychographic system can output 2D color/monochromatic images (intensity and/or phase), data associated with these images, or other data associated with analyses performed by the aperture scanning Fourier ptychographic system.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that certain features of embodiments of the disclosure described above can be implemented in the form of control logic using computer software in a modular or integrated manner. Based on the disclosure and teachings provided herein, a person of ordinary skill in the art will know and appreciate other ways and/or methods to implement certain features using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A Fourier ptychographic imaging system, comprising:
   one or more rings of light elements configured to sequentially illuminate a sample being imaged at each of a plurality of incidence angles, each light element comprising at least one light source;
   an optical system configured to receive light issuing from the sample; and
   a light detector configured to acquire a plurality of intensity measurements based on light issuing from the sample received via the optical system, the light detector configured to acquire each of the intensity measurements while one or more of the light elements provides illumination incident the sample at one of the plurality of incidence angles.

2. The Fourier ptychographic imaging system of claim 1, wherein the optical system comprises an imaging lens configured to receive light issuing from the sample.

3. The Fourier ptychographic imaging system of claim 1, wherein the optical system comprises collection optics configured to receive light issuing from the sample.

4. The Fourier ptychographic imaging system of claim 3, wherein the optical system further comprises a focusing lens configured to receive light from the collection optics and to focus the light to the light detector.

5. The Fourier ptychographic imaging system of claim 1, wherein the optical system comprises a lens configured to receive light issuing from the sample, the lens having a numerical aperture, wherein the plurality of incidence angles and the numerical aperture correspond to a plurality of overlapping regions in the Fourier domain.

6. The Fourier ptychographic imaging system of claim 5, wherein the one or more rings of light elements and the lens are located to the same side of the sample in a reflective mode.

7. The Fourier ptychographic imaging system of claim 5, wherein the lens is located along a central axis of the rings of light elements.

8. The Fourier ptychographic imaging system of claim 1, further comprising a central light element located along a central axis of the one or more rings of light elements.

9. The Fourier ptychographic imaging system of claim 1, wherein the one or more rings comprise concentric rings of light elements.

10. The Fourier ptychographic imaging system of claim 9, wherein each ring outside an adjacent inner ring has a larger number of light elements than the adjacent inner ring.

11. The Fourier ptychographic imaging system of claim 9, wherein each concentric ring has a diameter in the range of about 10 mm to about 60 mm.

12. The Fourier ptychographic imaging system of claim 9, wherein each concentric ring has a diameter in the range of about 20 mm to about 40 mm.

13. The Fourier ptychographic imaging system of claim 9, wherein each concentric ring has a diameter of about 10 mm.

14. The Fourier ptychographic imaging system of claim 9, wherein each concentric ring has light elements separated by at least about 30 degrees.

15. The Fourier ptychographic imaging system of claim 9, wherein each concentric ring has light elements separated by about 2 degrees to about 40 degrees.

16. The Fourier ptychographic imaging system of claim 1, wherein the one or more rings comprise an outer ring of light elements and an inner ring of light elements, the outer ring having light elements including light sources with higher intensity than the light sources of the light elements of the inner ring.

17. The Fourier ptychographic imaging system of claim 1, wherein:
the optical system comprises a lens configured to receive light issuing from the sample;
the one or more rings of light elements comprise a first ring of light elements and a second ring of light elements;
the optical system further comprises a beam splitter configured to propagate light from the second ring of light elements to the lens; and
the lens is further configured to propagate light from the second ring of light elements to the sample being imaged.

18. The Fourier ptychographic imaging system of claim 1, wherein the light elements of each of the one or more rings are equally-spaced.

19. The Fourier ptychographic imaging system of claim 1, wherein the optical system comprises a lens configured to receive light issuing from the sample;
further comprising an illumination source configured to provide excitation light incident the sample being imaged during operation;
further comprising a filter configured to filter excitation light, the filter located in an optical path between the lens and the light detector; and
wherein the light detector is further configured to acquire one or more fluorescence images of the sample based on emissions from the sample.

20. The Fourier ptychographic imaging system of claim 1, further comprising a processor configured to generate one or both of intensity and phase image data with higher resolution than a resolution of the intensity measurements by iteratively updating the overlapping regions in the Fourier domain with the plurality of intensity measurements.

21. The Fourier ptychographic imaging system of claim 1, further comprising a processor configured to generate color image data with higher resolution than a resolution of the intensity measurements by iteratively updating the overlapping regions in the Fourier domain with the plurality of intensity measurements.

22. The Fourier ptychographic imaging system of claim 1, further comprising a processor configured to:
generate image data with higher resolution than the resolution of the intensity measurements by iteratively updating overlapping regions in the Fourier domain with the plurality of intensity measurements; and
perform an aberration correction process to remove aberration from the image data.

23. The Fourier ptychographic imaging system of claim 1, wherein each of the light elements of the one or more rings is a light-emitting diode or a liquid crystal display pixel.

24. The Fourier ptychographic imaging system of claim 2, wherein the difference in illumination angles of two opposing light elements on one of the rings corresponds to the acceptance angle of the imaging lens.

* * * * *